(12) United States Patent
Miller

(10) Patent No.: US 10,690,625 B2
(45) Date of Patent: Jun. 23, 2020

(54) MEASURING ELECTROPHORETIC MOBILITY

(71) Applicant: John F. Miller, Hillsborough, NC (US)

(72) Inventor: John F. Miller, Hillsborough, NC (US)

(*) Notice: Subject to any disclaimer, the term of this patent is extended or adjusted under 35 U.S.C. 154(b) by 55 days.

(21) Appl. No.: 15/999,077

(22) Filed: Aug. 17, 2018

(65) Prior Publication Data

US 2019/0011398 A1 Jan. 10, 2019

Related U.S. Application Data

(63) Continuation-in-part of application No. PCT/US2018/019477, filed on Feb. 23, 2018.
(Continued)

(51) Int. Cl.
*G01N 27/447* (2006.01)
*G01N 21/51* (2006.01)
(Continued)

(52) U.S. Cl.
CPC ....... *G01N 27/44721* (2013.01); *G01N 15/00* (2013.01); *G01N 15/0211* (2013.01);
(Continued)

(58) Field of Classification Search
CPC ............. G01N 27/44721; G01N 15/00; G01N 15/0211; G01N 21/51; G01N 2015/0003;
(Continued)

(56) References Cited

U.S. PATENT DOCUMENTS 4,351,709 A * 9/1982 Goetz .............. G01N 27/44721
204/549
5,581,349 A * 12/1996 Halaka .................. G01J 3/4412
250/222.2
(Continued)

FOREIGN PATENT DOCUMENTS

EP  2735870  5/2014
GB  2368904  5/2002
(Continued)

OTHER PUBLICATIONS

International Search Report and Written Opinion in PCT/US18/19477 dated Jun. 26, 2018.

*Primary Examiner* — Jamil Ahmed
(74) *Attorney, Agent, or Firm* — Licata & Tyrrell P.C.

(57) ABSTRACT

An apparatus and method to obtain electrophoretic mobility information from a dilute colloidal dispersion using electrophoretic light scattering (ELS) is disclosed. Both laser Doppler electrophoresis and phase analysis light scattering data analysis methods may be applied to a scattered light signal simultaneously. Unlike previous ELS apparatuses and methods, the disclosed apparatus and method can measure electrophoretic mobility distributions in high ionic strength media. It can detect the presence of electrochemical phenomena such as electrode polarization and electrolysis, and apply corrections to the measured electrophoretic mobility values thus providing electrophoretic mobility information about samples with greater accuracy, precision, and reliability than prior ELS implementations. Improvements to the optical configuration of the apparatus are also disclosed that increase the robustness of the apparatus. Many of the aspects of the disclosure may be applied to the measurement of electrophoretic mobilities of particles in low polarity media and also particles with low surface charge in polar or non-polar media with greater accuracy, precision, and reliability than prior ELS implementations.

8 Claims, 37 Drawing Sheets

Related U.S. Application Data

(60) Provisional application No. 62/574,292, filed on Oct. 19, 2017, provisional application No. 62/473,569, filed on Mar. 20, 2017.

(51) Int. Cl.
*G02F 1/11* (2006.01)
*G01N 15/02* (2006.01)
*G01N 15/00* (2006.01)

(52) U.S. Cl.
CPC ............. *G01N 21/51* (2013.01); *G02F 1/113* (2013.01); *G01N 2015/0003* (2013.01); *G01N 2015/0053* (2013.01); *G01N 2015/03* (2013.01); *G01N 2021/513* (2013.01)

(58) Field of Classification Search
CPC ....... G01N 2015/0053; G01N 2015/03; G01N 2021/513; G02F 1/113
See application file for complete search history.

(56) References Cited

U.S. PATENT DOCUMENTS

| | | | |
|---|---|---|---|
| 2006/0114467 A1* | 6/2006 | Nicoli | G01N 21/51 356/450 |
| 2009/0004757 A1 | 1/2009 | Yguerabide et al. | 436/501 |
| 2011/0210002 A1* | 9/2011 | Hsieh | G01N 27/44721 204/549 |
| 2014/0027286 A1 | 1/2014 | Ikegami et al. | 204/549 |
| 2015/0226683 A1* | 8/2015 | Feldman | A01J 5/0133 324/640 |

FOREIGN PATENT DOCUMENTS

| | | | | |
|---|---|---|---|---|
| GB | 2368904 A | * | 5/2002 | ........... G01N 27/447 |
| JP | 2014/006173 | | 1/2014 | |
| JP | 2014006173 A | * | 1/2014 | ............. G01N 15/02 |
| WO | WO 2007/065879 | | 6/2007 | |
| WO | WO-2007065879 A1 | * | 6/2007 | ............. G16B 25/00 |

\* cited by examiner

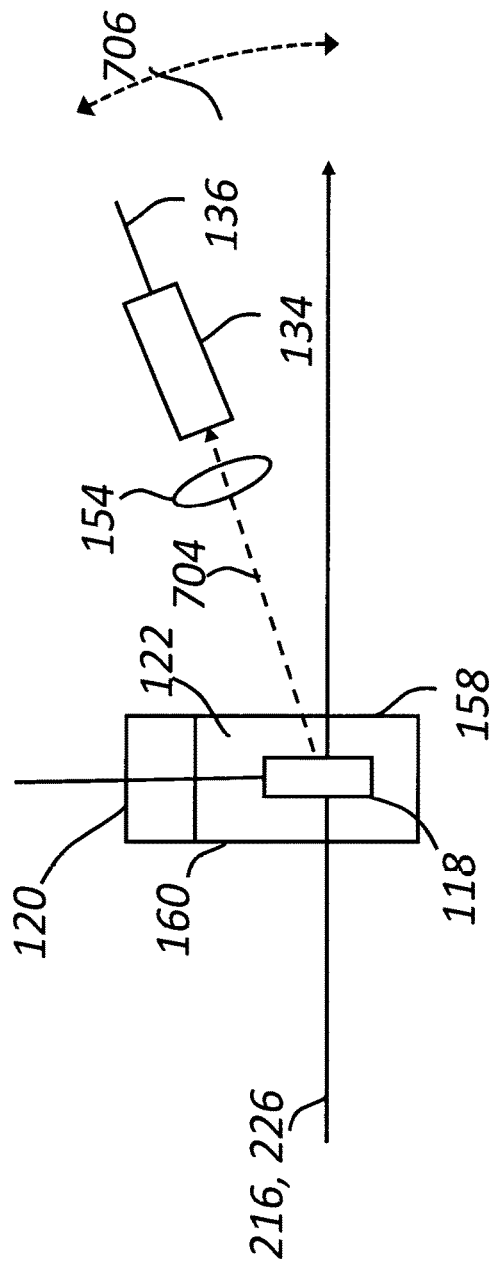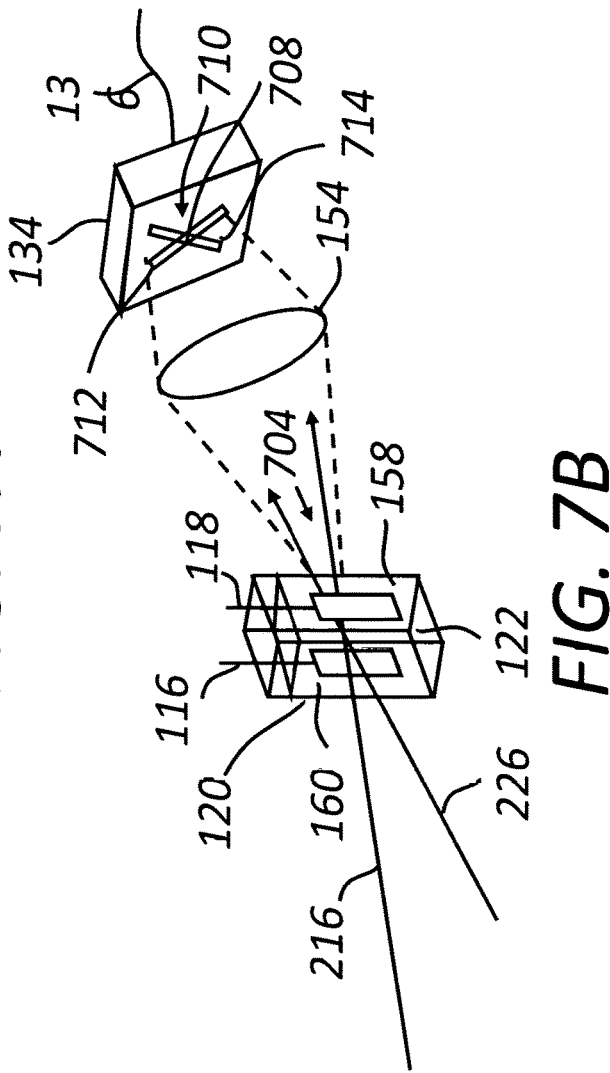
FIG. 7A
FIG. 7B

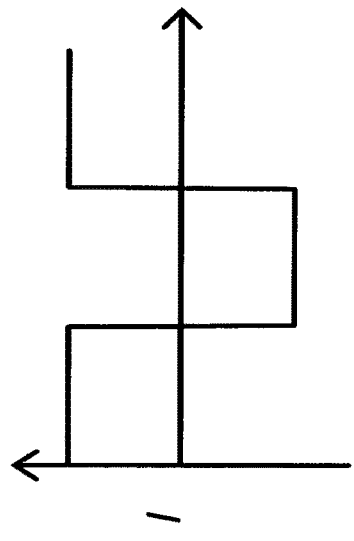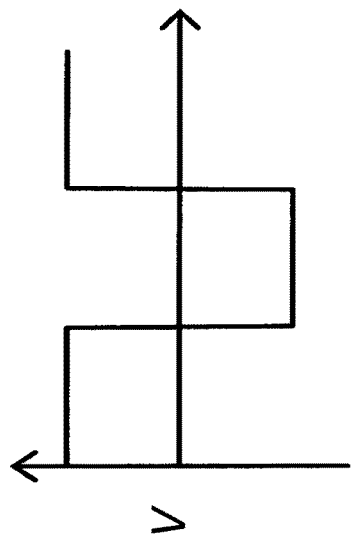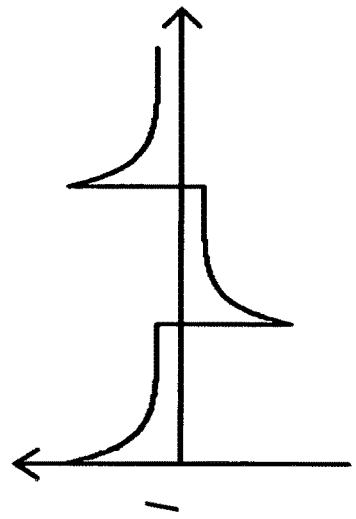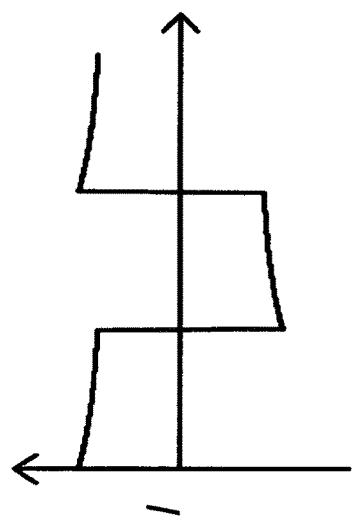
FIG. 9A
FIG. 9B
FIG. 9C
FIG. 9D

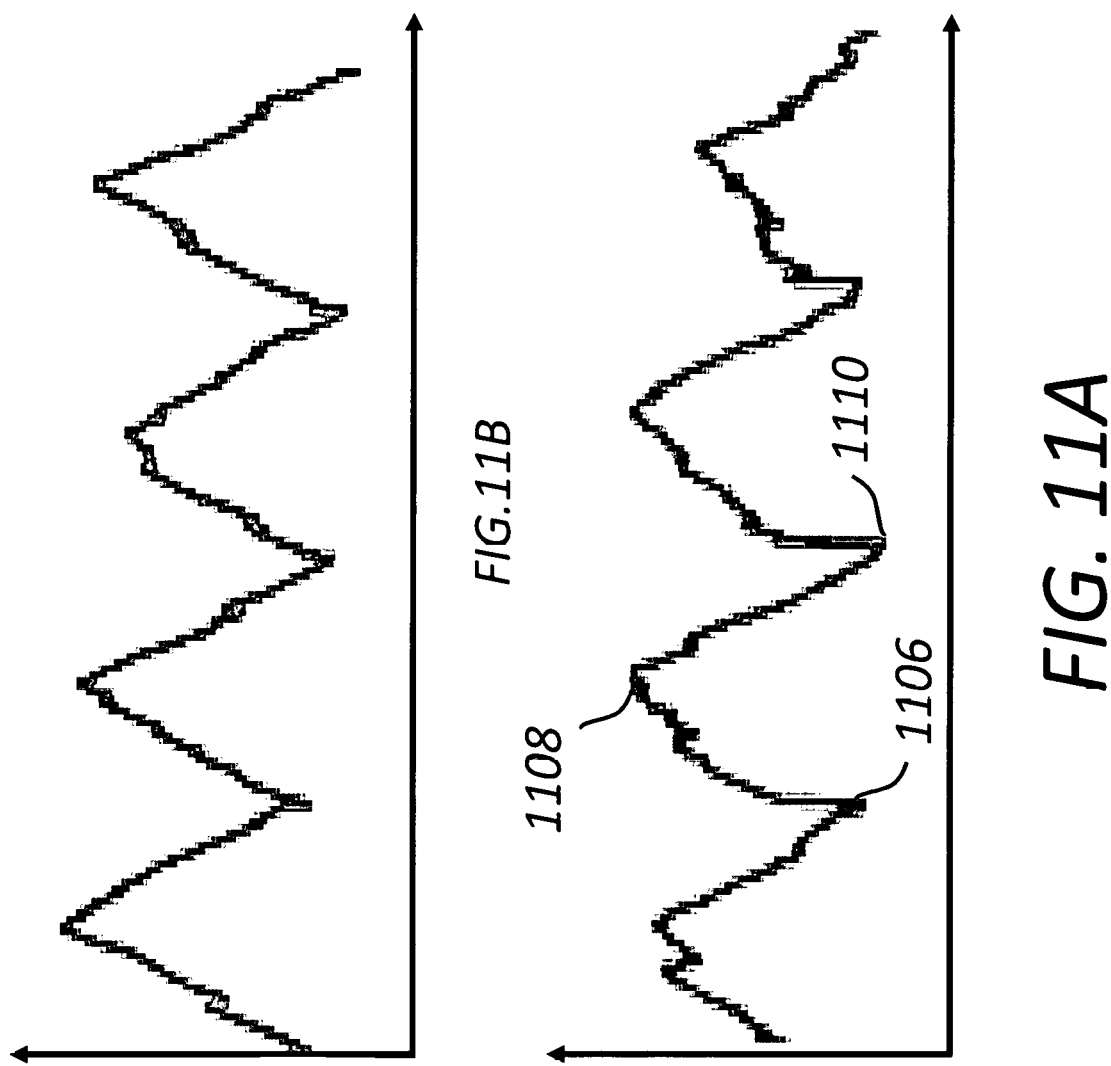

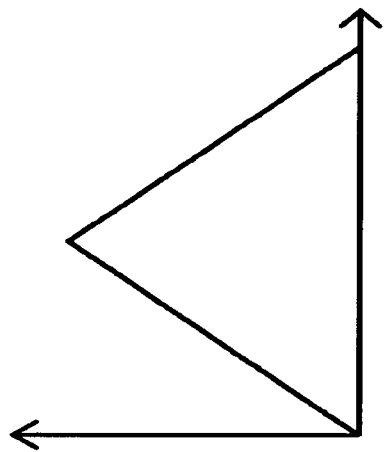
FIG. 12B
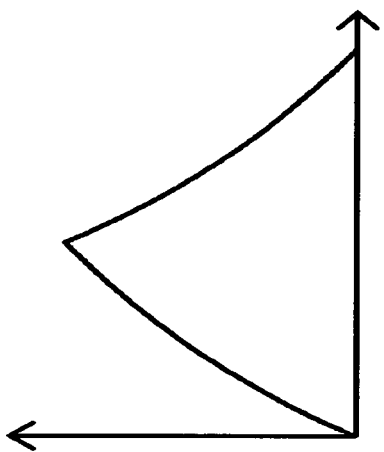
FIG. 12D
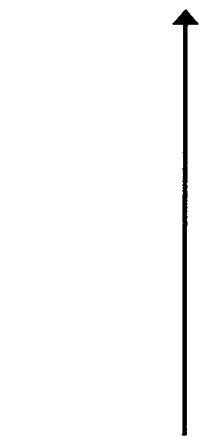
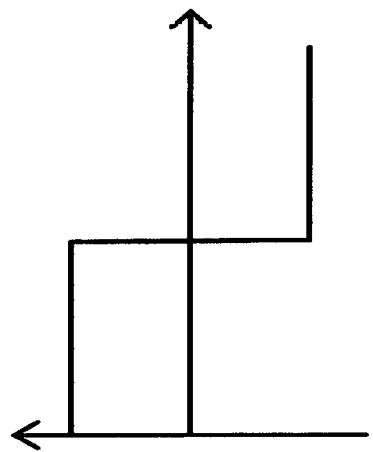
FIG. 12A
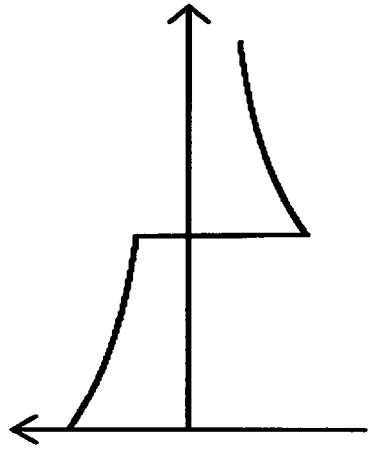
FIG. 12C

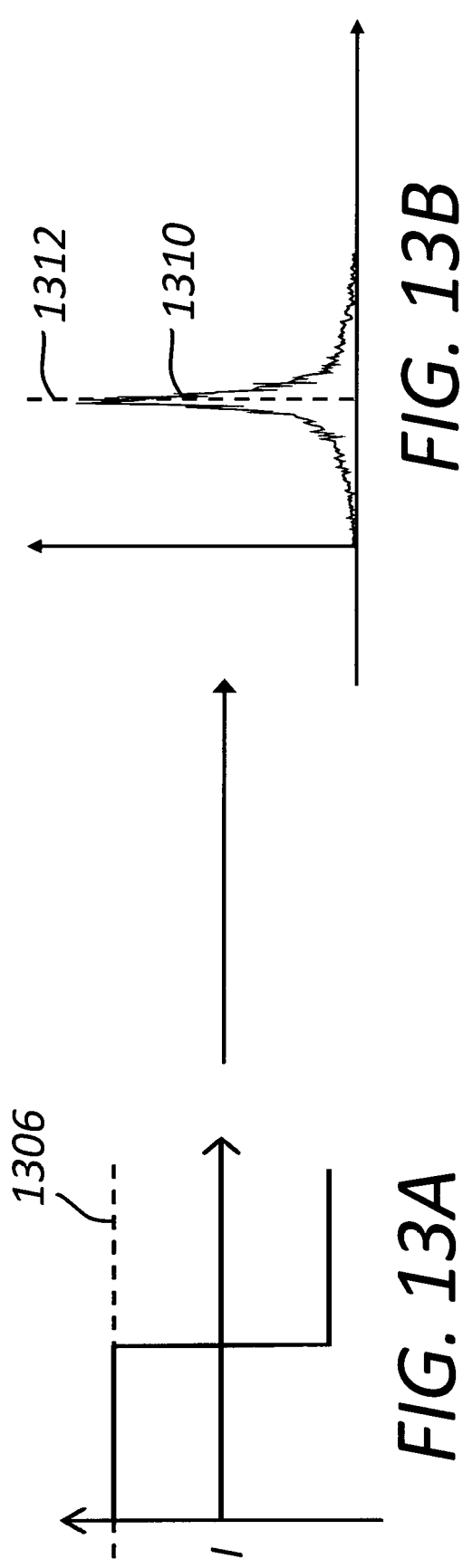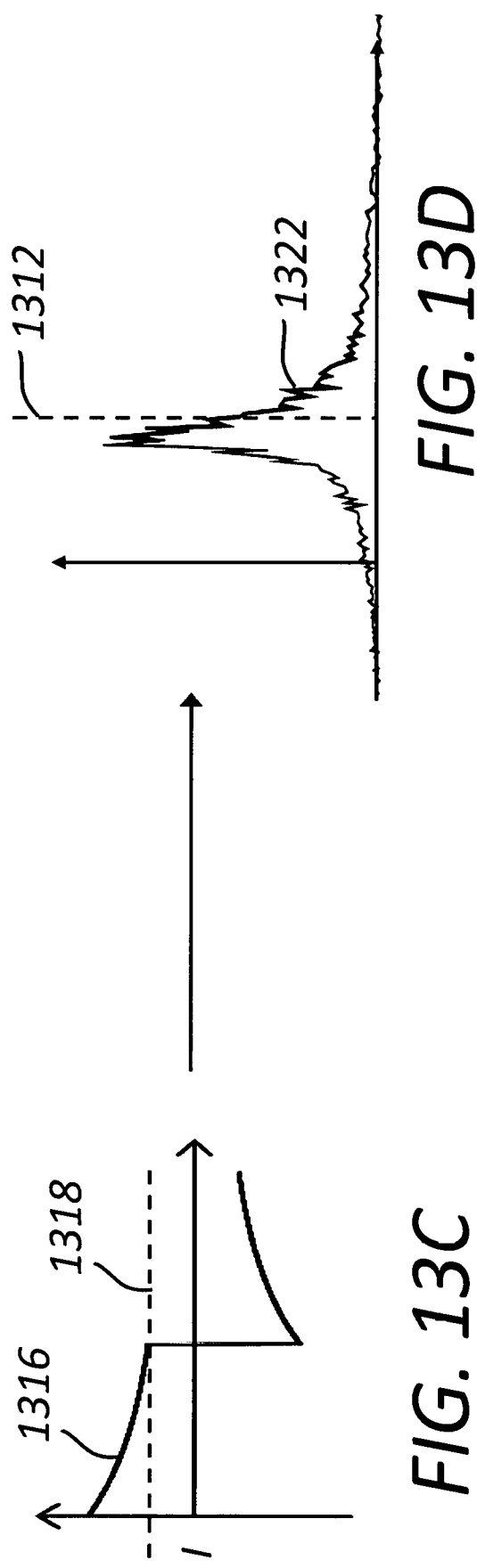

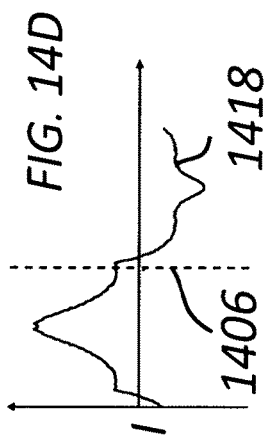
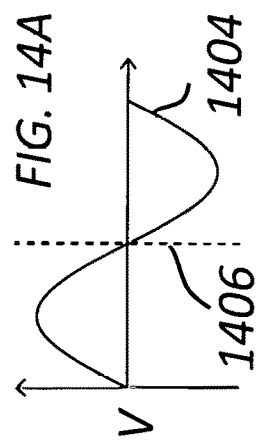
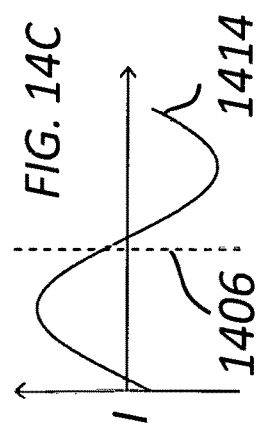
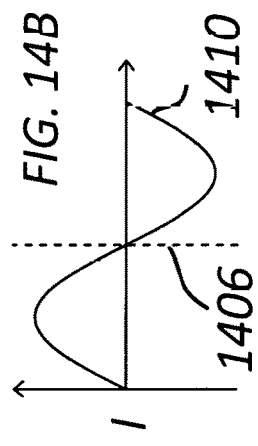
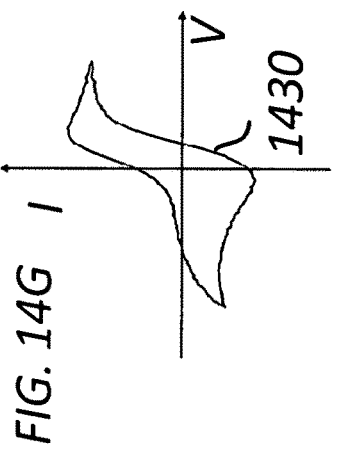
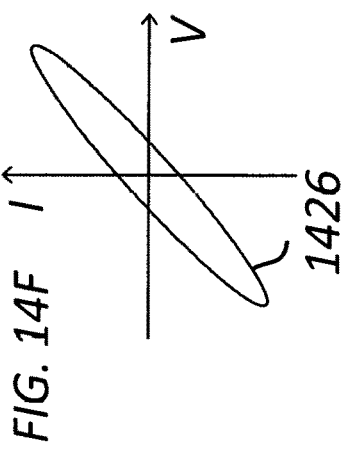
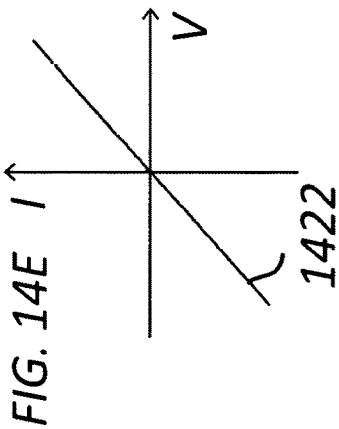

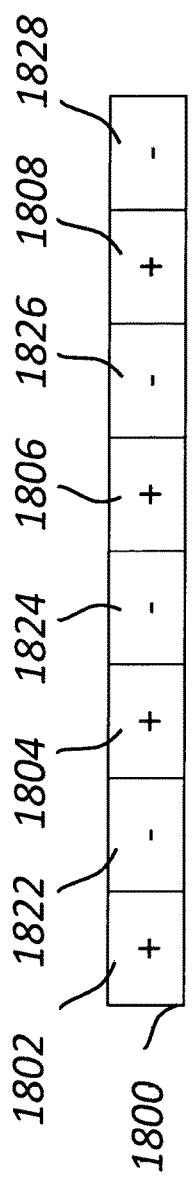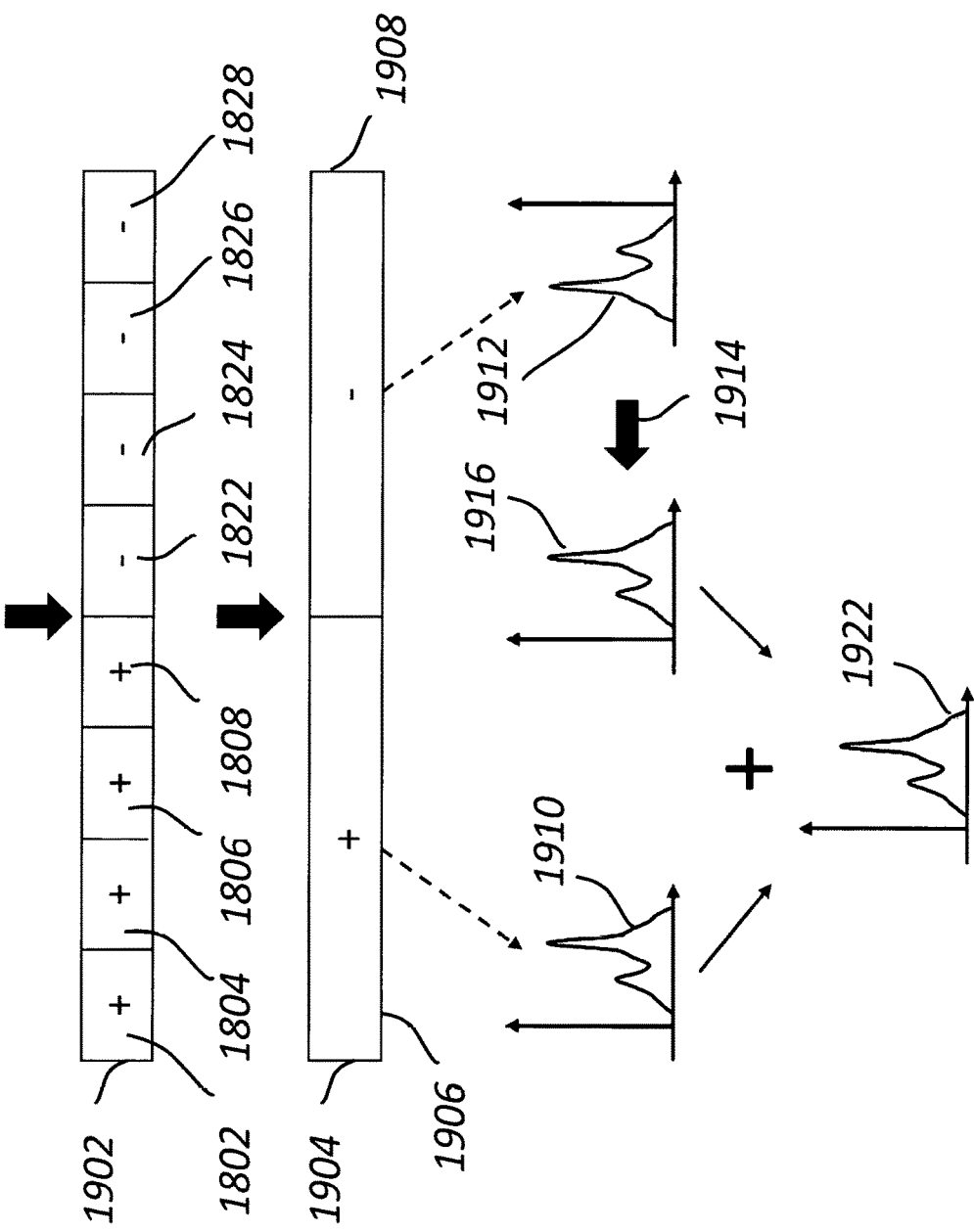
FIG. 19

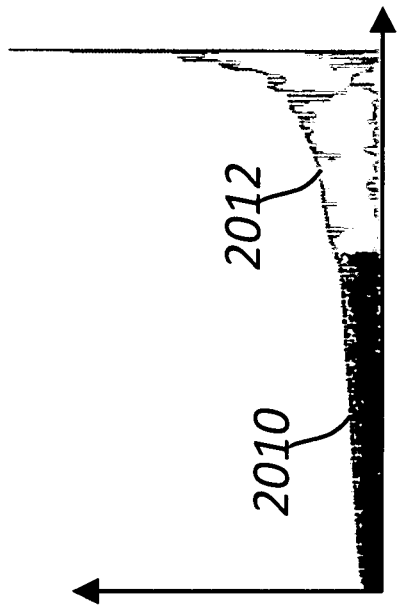
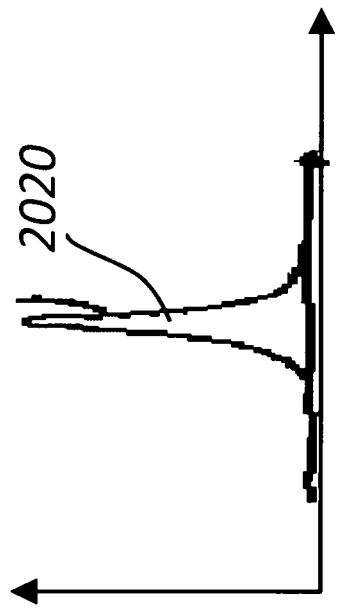
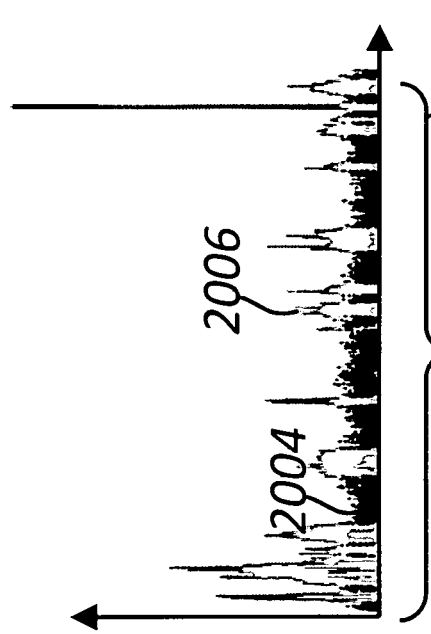
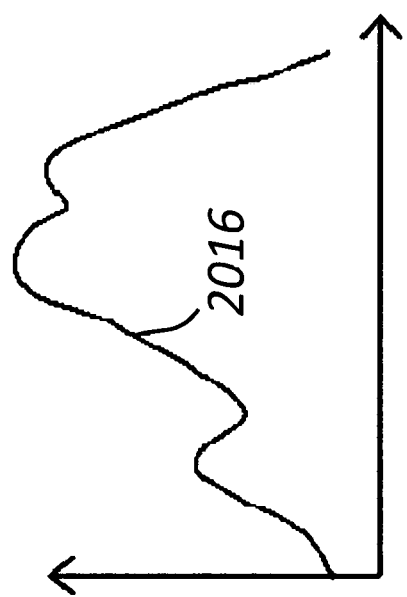
FIG. 20A
FIG. 20B
FIG. 20C
FIG. 20D

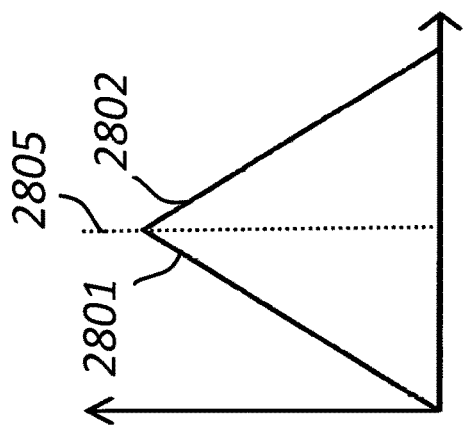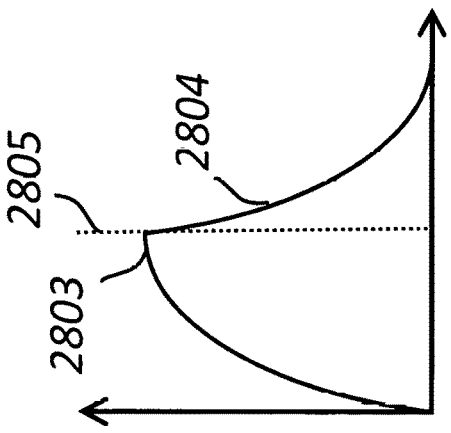
FIG. 28A
FIG. 28B

MEASURING ELECTROPHORETIC MOBILITY

This patent application is a continuation-in-part of PCT/US2018/019477 filed Feb. 23, 2018 which claims the benefit of priority from U.S. Provisional Application Ser. No. 62/574,292, filed Oct. 19, 2017 and U.S. Provisional Application Ser. No. 62/473,569 filed Mar. 20, 2017, the content of each of which is incorporated by reference herein in their entireties.

FIELD

The present invention is in the technical field of the measurement of physical properties of colloidal matter. More particularly, the present invention is in the technical field of the determination of electrophoretic mobility of dispersed phases of colloidal matter using electrophoretic light scattering.

BACKGROUND

Electrophoretic light scattering (ELS) is the most industrially important and widely used method to determine electrophoretic mobilities of colloidal dispersions that include, but are not limited to, pharmaceutical products, cosmetics, paints, and foodstuffs. However, prior implementations of ELS may not measure with necessary accuracy, precision, and reliability electrophoretic mobilities of some colloidal dispersions including, but not limited to, those with: high ionic strength; low polarity media; low surface charge; and contamination from unwanted particulate matter. The salient features of an apparatus for implementation of ELS are shown in FIG. 1. The salient features of another apparatus for implementation of ELS are shown in FIG. 2. Refer to the description of embodiments provided herein for a detailed explanation of FIG. 1 and FIG. 2. A method is sought that can accurately, precisely, and reliably measure the electrophoretic mobilities of colloidal dispersions that prior implementations of ELS cannot.

SUMMARY

In one general aspect, the present invention relates to an apparatus and method for measuring the electrophoretic mobility of particles dispersed in a liquid medium and to an apparatus and method using one of more data analysis methods including, but not limited to, the laser Doppler electrophoresis (LDE) analysis method and the phase analysis light scattering (PALS) analysis method. In general, an apparatus to implement ELS directs light from a laser source through a sample of a dilute dispersion of particles in a liquid. The sample is contained within a sample holder, for example, but not limited to, a spectrophotometric cuvette and a voltage applied across two parallel plate electrodes immersed in the sample generates an electric field between the electrodes within the sample. The field causes electrically charged particles to move thereby inducing a Doppler frequency shift of the order of a few tens of hertz on the laser light. A portion of the light scattered by the particles is directed to a detector, for example, but not limited to, a photosensitive detector, from which an electrical signal may be generated that contains information about the Doppler frequencies due to movement of the particles which may be analyzed via the analyzer of the apparatus. Two nonlimiting embodiments of apparatus of the present invention are described below that differ in their optical configurations but yield equivalent signals from the detector.

A nonlimiting embodiment of the present invention may include a reference beam configuration with at least one non-mechanical means to vary the intensity of one or more laser beams.

One nonlimiting embodiment of the reference beam configuration incorporates acousto-optic modulation to vary beam intensity by non-mechanical means. An advantage of using acousto-optic modulation is that it may be used to provide a means to generate a frequency shift between two or more laser beams and implement a reference beam configuration with no mechanical means of varying one or both of intensity and frequency of one or more laser beams.

An alternative nonlimiting embodiment of the present invention may include a crossed-beam configuration with a detector, for example, but not limited to, a photodetector positioned out-of-plane with respect to the plane of the intersecting laser beams.

An advantage of this embodiment compared to prior implementations of crossed-beam ELS is that scattered light received by the detector is substantially free of stray light originating within the sample. Another advantage compared to prior embodiments of crossed-beam ELS is easier alignment of the active region of the detector and the intersecting region of the crossed beams.

In another general aspect, the methods and apparatus of the present invention afford measurement of one or more electrochemical phenomena including, but not limited to, electrode polarization and electrolysis, where said electrochemical phenomena arise due to flow of an electric current through a liquid medium. In one nonlimiting embodiment, a current sensing means measures one or more electrochemical phenomena arising due to flow of an electric current through a liquid medium.

In yet another general aspect, one or more analyses of temporally ordered data may be performed using one or more temporal orderings of the temporally ordered data.

In another general aspect, the present invention may classify data according to one or more descriptors. Nonlimiting examples of the one or more descriptors include amplitude mean, amplitude standard deviation, amplitude maximum, and amplitude coefficient of variance and apply a preferred data analysis method to each class of data. In one nonlimiting embodiment, data that do not meet one or more predefined criteria may be omitted from one or both of the PALS analysis method and the LDE analysis method. In one nonlimiting embodiment, data whose amplitudes exceed a predefined value may be omitted. In one nonlimiting embodiment, data whose amplitudes are below a predefined value may be omitted.

In another general aspect, the present invention may create a temporal representation of the scattered light intensity arriving at a detector and apply both the PALS analysis method and the LDE analysis method to the same temporal representation.

In yet another general aspect, the present invention may apply one or both of the PALS analysis method and the LDE analysis method to data stored in one or more of volatile and non-volatile digital data memories at a time not contemporaneous with the time at which the data were acquired. Such memories may include, but are not limited to, random access memory (RAM), magnetic hard disks, solid state storage devices, optical media such as CD-ROM, and magnetic tape.

One or more of the aspects of this invention may be used to measure the electrophoretic mobility of particles dispersed in a liquid with improvements to one or more of accuracy, precision and reliability. A nonlimiting example is measurement of particles dispersed in a liquid with ionic strength similar to or greater than the ionic strengths of physiological liquids. Another nonlimiting example is measurement of particles dispersed in a liquid containing particulate contaminants by which light is scattered with greater intensity than by the particles intended for measurement. Yet another nonlimiting example is measurement of particles dispersed in a liquid containing gaseous bubbles. Another nonlimiting example is measurement of particles with low surface charge. A further nonlimiting example is measurement of particles dispersed in non-polar media.

BRIEF DESCRIPTION OF DRAWINGS

Nonlimiting and non-exhaustive embodiments of the present invention are described with reference to the following FIGURES, wherein like reference numerals refer to like parts throughout the various views unless otherwise specified.

FIG. 7A illustrates a nonlimiting embodiment where the detector is positioned out of the geometrical plane defined by the plane of the two intersecting beams in an ELS apparatus using a crossed-beam optical configuration, in accordance with one or more implementations.

FIG. 7B illustrates the focusing of an image on the detector of the cross of laser light formed by the scattering of light from two intersecting beams within the sample in an ELS apparatus using a crossed-beam optical configuration, in accordance with one or more implementations.

FIG. 9A, FIG. 9B, FIG. 9C and FIG. 9D show schematically the change of current as a function of time over 1.5 periods of the electric field when the applied electrode voltage waveform is square, in accordance with one or more implementations.

FIG. 11A and FIG. 11B show the optical phase as a function of time for four cycles of a square waveform electric field for zircon particles dispersed in 1 mM KCl (aq) (FIG. 11A) and, separately, for zircon particles dispersed in 10 mM KCl (aq) (FIG. 11B), in accordance with one or more implementations.

FIG. 12A, FIG. 12B, FIG. 12C and FIG. 12D illustrate that the curvature observed for the optical phase for zircon particles dispersed in 10 mM KCl (aq) can be related to temporal changes in current, in accordance with one or more implementations. FIG. 12A shows the current vs. time profile for one cycle of a square electric field in the absence of electrode polarization. The corresponding integral over time is depicted in FIG. 12B and resembles one cycle of FIG. 11A. FIG. 12C shows the current vs. time profile for one cycle of a square electric field in the presence of electrode polarization. The corresponding integral over time is depicted in FIG. 12D and resembles one cycle of FIG. 11B.

FIG. 13A, FIG. 13B, FIG. 13C and FIG. 13D show how the width of the electrophoretic mobility distribution may be increased in the presence of electrode polarization, in accordance with one or more implementations.

FIG. 14A, FIG. 14B, FIG. 14C, FIG. 14D, FIG. 14E, FIG. 14F and FIG. 14G show schematically current as a function of time in response to a sinusoidal waveform voltage applied to the electrodes. FIGS. 14A, 14B, 14C, 14D, 14E, 14F and 14G further show the effect of the degree of polarization on the amount of deviation of the current vs. voltage response from the ideal linear case, in accordance with one or more implementations.

FIG. 18 illustrates the limited resolution of the frequency distributions due to the use of an alternating electric field, in accordance with the present invention.

FIG. 19 illustrates the significant increase of the resolution of the frequency distributions when using asynchronous temporal analysis, in accordance with the present invention.

FIG. 20A, FIG. 20B, FIG. 20C and FIG. 20D illustrate the use of asynchronous temporal analysis to remove unwanted scattering from contaminants in the sample in order to improve the fidelity of the resultant electrophoretic mobility spectrum, in accordance with one or more implementations.

FIG. 28A shows the ideal phase function for one cycle of a square wave alternating electric field.

FIG. 28B represents a non-ideal phase function for one cycle of a square wave alternating electric field generated across a sample where one or more significant electrochemical phenomena cause a reduction in the strength of the electric field and particle electrophoretic velocity within the sample.

Figure 1:
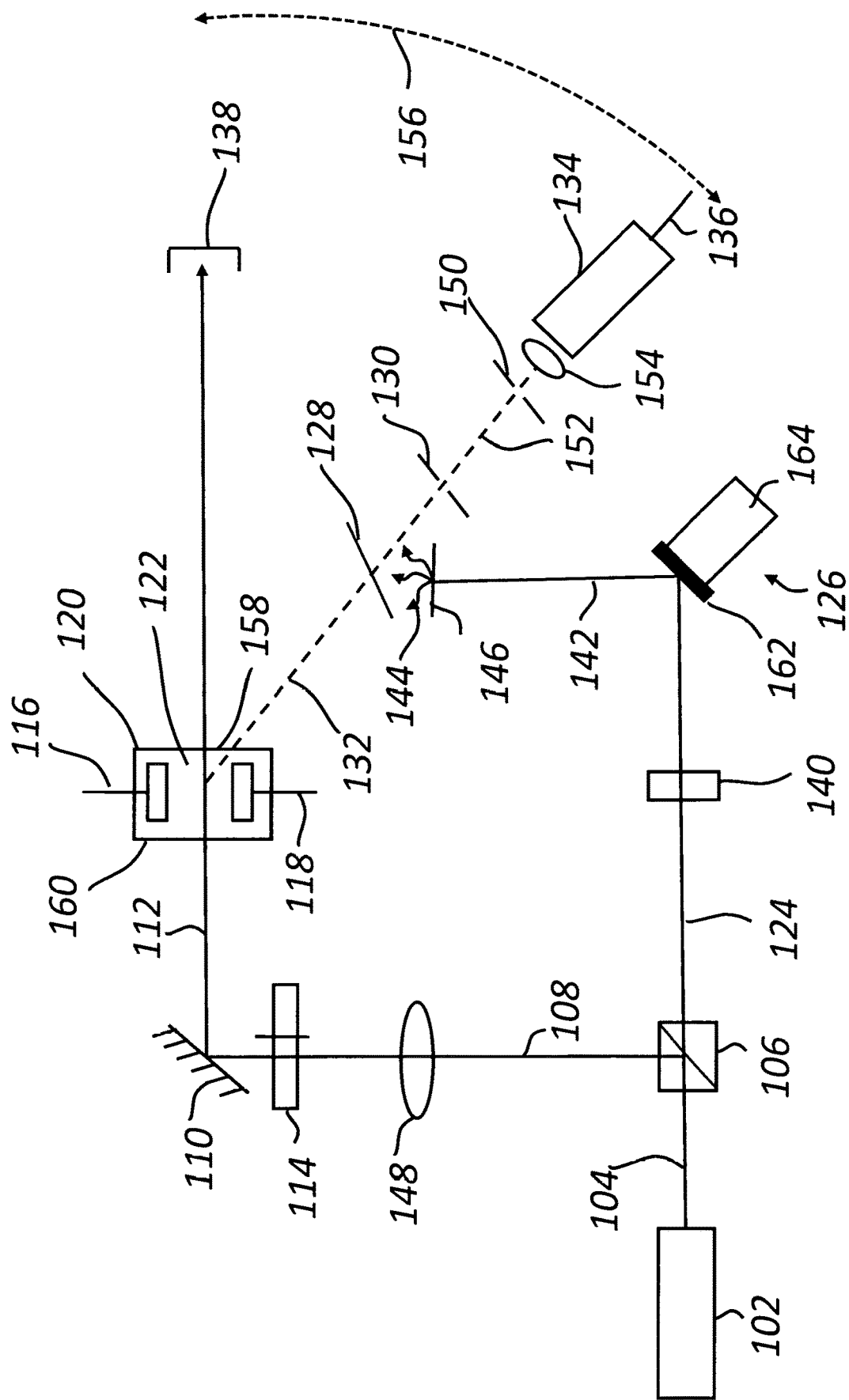
FIG. 1 depicts a prior art ELS apparatus implemented using a reference beam optical configuration and mechanical means for controlling laser light intensity.

Corresponding reference characters indicate corresponding components throughout the several views of the drawings. Skilled artisans will appreciate that elements in the FIGURES are illustrated for simplicity and clarity and have not necessarily been drawn to scale. Also, common but well-understood elements that are useful or necessary in a commercially feasible embodiment are often not depicted in order to facilitate a less obstructed view of these various embodiments.

DESCRIPTION OF EMBODIMENTS

In the following description, numerous specific details are set forth in order to provide a thorough understanding of the present embodiments. It will be apparent, however, to one having ordinary skill in the art that the specific detail need not be employed to practice the present embodiments. In other instances, well-known means or methods have not been described in detail in order to avoid obscuring the present embodiments.

As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," and "in one embodiment."

The theory and practice of electrophoretic light scattering have been taught extensively in the non-patent publication literature and are incorporated herein by reference. Some of the aforesaid teachings are repeated herein to aid description of some aspects of the present invention.

Electrophoretic mobility $\mu_e$ of a particle in a liquid is determined by measuring the particle's velocity when the particle is subjected to a time t dependent electric field E(t). This velocity is termed the electrophoretic velocity $v_e(t)$ and the proportionality constant between the electrophoretic velocity and the electric field E(t) is termed the electrophoretic mobility. Hence, $$v_e(t) = \mu_e E(t) \qquad [1]$$

Within this description of the invention, reference to electrophoretic mobility implies that it is determined from electrophoretic velocity. A preferred method to measure electrophoretic velocity is to analyze the temporal variation of light scattered by a dispersion of particles in a liquid subject to an externally applied electric field. A fundamental principle underlying the use of light scattering to measure particle velocity is that at a fixed point in space the phase of the light scattered by a single particle relative to the phase at the same spatial location of unscattered light from the same light source is dependent on the position of the particle relative to the same spatial location. The source of such radiation at optical wavelengths is typically a laser. The location of the fixed point in space is determined by the design of the apparatus. Movement of the particle results in a temporal change of the phase difference between the scattered and unscattered light. To detect the phase information within the light using a suitable photosensitive detector positioned at a fixed point in space means that the detector must be able to detect both the real and imaginary components of the electric field of the light at the location of the detector to determine the phase of the detected light. However, such detectors do not exist whereas photosensitive detectors sensitive to the intensity of the electric field of the light do exist and ordinarily generate electric signals whose voltages are proportional to the intensity of the electric field of the light. This means that the phase of the detected light cannot be obtained. The rate of the phase change with time equates to a frequency difference between the scattered light relative to the unscattered light and is commonly referred to as the Doppler frequency. However, whereas the frequency of visible light is of the order of $10^{14}$ Hz, Doppler frequencies due to the scattering of light from moving particles are typically no more than a few hundred hertz. Direct measurement of the frequency of light arriving at a detector from a single source of light (commonly referred to as "homodyne detection") is not possible. "Heterodyne detection" allows measurement of small frequency shifts about a large "carrier" or "center" frequency and is commonly used in radio receivers to recover audio frequency information modulated by a radio frequency carrier signal. For example, frequency-modulated radio broadcasts are demodulated by mixing the received signal with a signal whose frequency is the center frequency of the transmitted signal. The detected signal and a signal equal to the original carrier signal are mixed at a suitable electronic component such as a diode. The response of the diode is non-linear with respect to the two signals being mixed. Consequently, a new signal is created by the diode that contains a first frequency equal to the sum of the frequencies of the two signals being mixed and a second frequency equal to the difference between the frequencies of the two signals being mixed. By analogy, if the scattered light from a moving particle were to be mixed at the active region of a non-linear response detector with light from the same source that had not been scattered, the output from the detector would be of a frequency equal to the Doppler frequency. The intensity of the scattered light at the detector is the sum of the intensities of light scattered from all the particles interacting with the laser beam. Variation the intensity of the scattered light in the time domain can be represented in the frequency domain as a frequency spectrum comprising the Doppler frequencies for all the particles interacting with the light. A Doppler frequency for a particle is linearly proportional to the velocity of the particle, therefore an electrophoretic velocity distribution can be calculated from the Doppler frequency spectrum and an electrophoretic mobility distribution can be calculated from the electrophoretic velocity distribution. This method of analyzing the scattered light signal generated by the detector is the LDE analysis method. Whereas analysis of the scattered light signal using the LDE analysis method occurs in the frequency domain, the same signal may also be analyzed in the time domain using the PALS analysis method. In a general sense, the PALS analysis method averages the phase change of the signal and yields a single value for the average electrophoretic mobility of the particles. Each analysis method has advantages and disadvantages compared to the other. One aspect of the apparatus and methods of the present invention is that both the LDE analysis method and the PALS analysis methods may be applied to a given instance of the scattered light signal.

An important aspect of the ELS method is the nature of the electric field applied to the dispersion. Most implementations of ELS use the narrow gap electrode arrangement whereby two parallel plate electrodes separated by a distance usually in the range of 1 to 5 millimeters are immersed in the dispersion. A known voltage is generated across the electrodes thereby generating the necessary electric field to cause the particles in the dispersion to move due to electrophoresis. A direct current (DC) electric field may be used. However, the use of DC fields can adversely affect the measurement of the electrophoretic mobility of the particles in the electric field. The undesirable effects include heating of the liquid and gas bubble formation at the electrode-liquid interface due to electrolysis. To minimize the undesirable effects, alternating current (AC) electric fields are ordinarily used. For the LDE analysis method the voltage applied to the electrodes ("electrode signal") is most commonly a square wave voltage with zero bias and a frequency no more than a few hertz. Broadly, Doppler frequencies generated by an ELS apparatus do not exceed a hundred hertz. In accordance with the Nyquist theorem, the resolution of the Doppler frequency spectrum is limited to twice the frequency of the electrode signal and results in harmonic-like peaks in the Doppler frequency spectrum. To minimize the formation of such peaks in the Doppler frequency spectrum, it is preferable to limit the frequency of electrode signal to less than one hertz. An aspect of the apparatus and methods of the present invention allows electrode signals of sufficiently high frequency to be used to avoid the undesirable effects and obtain Doppler frequency spectra with frequency resolutions typically more than an order of magnitude higher than the frequency of the electrode signal. Most commonly, the PALS analysis method uses electrode signals with frequencies at least an order of magnitude higher than for the LDE analysis method and typically avoids the aforesaid undesirable effects. Apparatuses for ELS that use the LDE analysis method for the data analysis method can be the same as those used for analysis using the PALS analysis method.

Referring now to the invention in more detail, shown in FIG. 1 is a schematic representation of the basic features of an exemplary light scattering apparatus for the measurement of electrophoretic mobility of particles dispersed in a liquid medium. A laser beam 104 emitted from a laser source 102 is directed at a beam splitter 106 creating a second beam 108 and a third beam 124 such that the intensity of beam 108 is substantially equal to 50% of the intensity of beam 104. Propagation of beam 124 may be fully blocked by a beam blocking means 140. The frequency of beam 124 is shifted by a frequency $\Delta f_s$ using a frequency shifter 126 to create a reference beam 142 which is directed at a diffuser 146 to give a diffuse reference light 144. The second beam 108 is directed at a beam steering mirror 110 via a focusing lens 148 and an attenuator 114. Beam steering mirror 110 reflects beam 108 to give an incident beam 112. The incident beam 112 passes through rear window 160 of sample cell 120 and into a dilute colloidal dispersion sample 122 contained within sample cell 120 wherein some of beam 112 is scattered by the particles in sample 122. The portions of the incident beam 112 that are not scattered by the particles continue to exit the sample cell 120 through front window 158 to a beam stop 138. A detector 134 is positioned at a defined scattering angle 156 relative to the direction of the incident beam 112. Pin holes 130 and 150 define a narrow trajectory of scattered light 132 that is directed toward the detector 134. The scattered light 132 and the diffuse reference light 144 are mixed on a coherent mixer 128 to yield mixed light 152 that is focused by a lens 154 onto the detector 134. The detector 134 generates an electric detector signal 136 proportional to the intensity of the mixed light 152 at the detector. An electric field is generated between two parallel plate electrodes 116 and 118 by presentation of an electrical potential difference between the electrodes 116 and 118. In some embodiments, the functions of frequency shifter 126, beam blocking means 140, and attenuator 114 are implemented using mechanical means. Commonly, a configuration of an apparatus that incorporates a reference beam 142 is called a reference beam configuration and the apparatus is called a reference beam apparatus. To achieve maximum signal-to-noise ratio of the intensity of the detected mixed light 152, there exists an optimum ratio of the intensity of diffuse reference light 144 and scattered light 132. Whereas the intensity of beam 142, and hence diffuse reference light 144, is constant, the average intensity of scattered light 132 will depend on the scattering properties of the particles in sample 122. Therefore, it is necessary to be able to vary the intensity of scattered light 132 to achieve the optimum ratio of the intensity of diffuse reference light 144 and scattered light 132. Commonly, this is achieved by varying the intensity of beam 108 by an optical attenuator 114. A nonlimiting example of attenuator 114 is a circular variable neutral density (ND) filter attached to a motor such that the circular filter may be rotated. A nonlimiting example of beam block 140 is a flat plate attached to a solenoid such that the plate can be positioned to block the beam and such that the plate can be positioned to not block the beam according to the energized state of the solenoid. The ordinary sequence of events to optimize the intensity of scattered light 132 is: apply the appropriate voltage to the solenoid attached to beam block 140 such that beam 124 cannot propagate to frequency shifter 126 and no laser radiation is present at coherent mixer 128; apply the appropriate voltage to the electrical motor component of attenuator 114 to rotate the ND filter to a known position; measure the intensity of scattered light 132 arriving at detector 134 and compare it to the optimum value required to maximize the signal-to-noise ratio of detector signal 136; repeat the sequence as many times as required to obtain a signal-to-noise ratio of detector signal 136 with an intensity closest to the optimum value. The mechanical nature of the exemplary means of attenuation of the intensity of beam 108 by attenuator 114 and the blocking of beam 124 by beam block 140 means that both attenuator 114 and beam block 140 are prone to mechanical malfunction, and that a delay of a few seconds will exist between the start of an experiment and the initial collection of data. Someone of ordinary skill in the art will understand that the temporal representation of the fluctuation of scattered light intensity at detector 134 may be obtained by more than one means. It may be preferable to directly convert detector signal 136 into a digital representation via an analog-to-digital converter in the time domain since the PALS analysis method requires a representation of detector signal 136 in the time domain. The same representation of detector signal 136 in the time domain may be transformed into the frequency domain via Fourier transformation for application of the LDE analysis method. Both the PALS analysis method and the LDE analysis method are computationally intensive. The required computing capabilities and the required electronics capabilities were not available when early prior embodiments of an ELS apparatus were developed. Autocorrelation of detector signal 136 provides an alternative means to obtain the time domain representation of detector signal 136 required for the PALS analysis method and the frequency domain representation of detector signal 136 required for the LDE analysis. Both aforesaid means for obtaining the required temporal representation of detector signal 136 are mathematically equivalent. For clarity of the description of the present invention, only the method of analog-to-digital conversion of detector signal 136 is discussed. It will be recognized by someone skilled in the art that such discussion is not intended to limit the scope of the present invention and that other embodiments of an ELS apparatus may exist that can implement one or both of the PALS analysis method and the LDE analysis method.

Figure 2:
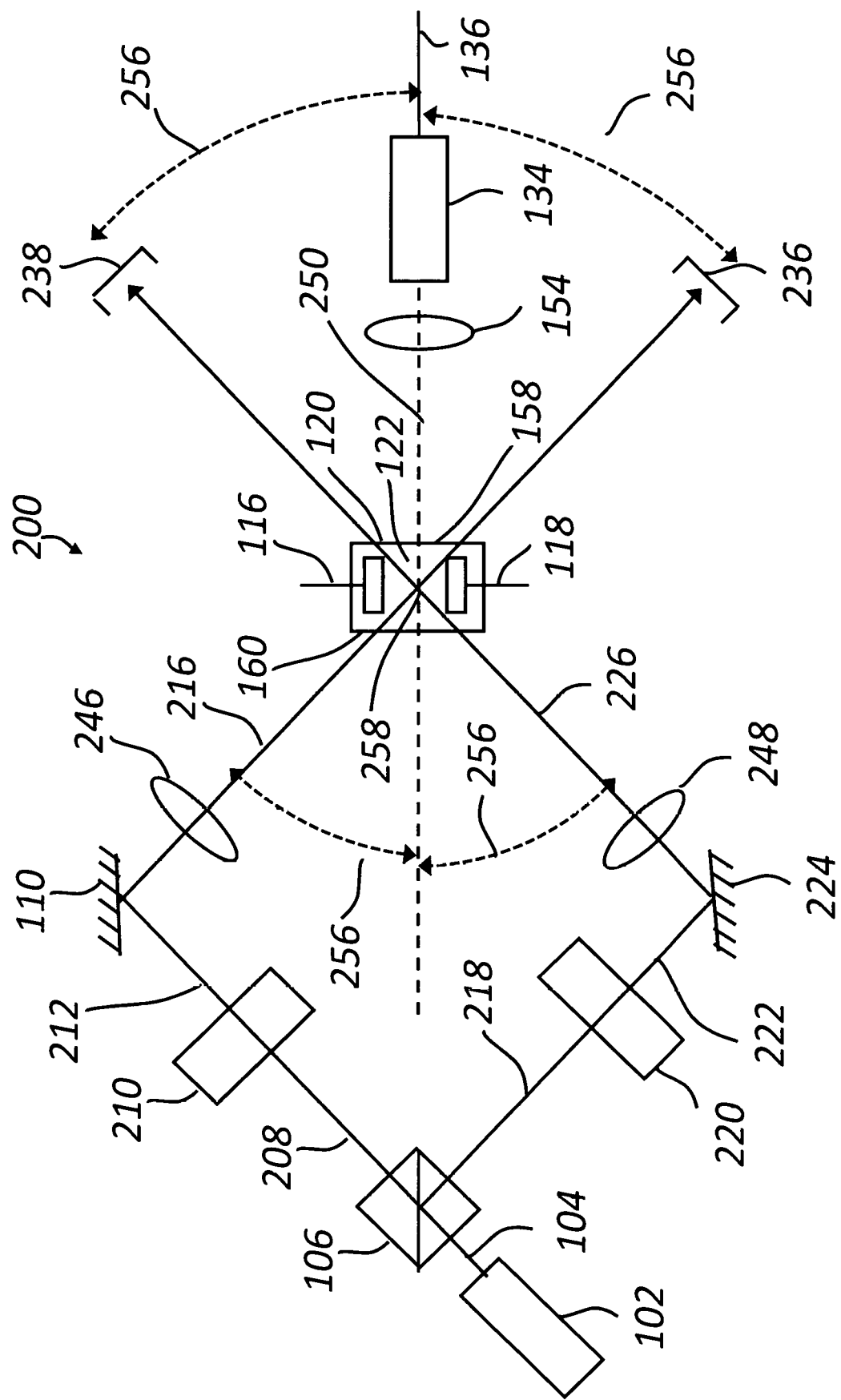
FIG. 2 depicts a prior art ELS apparatus implemented using a crossed-beam configuration.

Shown in FIG. 2 is a schematic representation of the basic features of another exemplary light scattering apparatus for the measurement of electrophoretic mobility of particles dispersed in a liquid medium. It shares many common features of the exemplary reference beam apparatus depicted in FIG. 1. The most significant difference is that whereas the reference beam configuration features an incident beam 112 passing through the sample 122 and a reference beam 142 that does not pass through the sample 122, the configuration shown in FIG. 2 features a first beam 216 passing through the sample 122 and a second beam 226 passing through the sample such that both beam 216 and beam 226 cross each other within the sample. Commonly, a configuration of an apparatus that incorporates two beams intersecting within the sample 122 is called a crossed-beam configuration and the apparatus is called a crossed-beam apparatus. In FIG. 2, a laser beam 104 emitted from a laser source 102 is directed at a beam splitter 106 creating a second beam 208 and a third beam 218 such that the intensities of beam 208 and beam 218 are substantially equal to 50% of the intensity of beam 104. Beam 208 passes through a first acousto-optic modulator 210 and a first first-order diffraction beam 212 emerging from modulator 210 is directed at a first beam steering mirror 110. Beam steering mirror 110 reflects beam 212 to give a first incident beam 216 that is directed through a focusing lens 246 into sample 122 at an incident angle 256 normal to the planar surface of rear window 160. Beam 216 traverses sample 122 and exits through front window 158 toward a first beam stop 236. Beam 218 passes through a second acousto-optic modulator 220 and a second first-order diffraction beam 222 exiting modulator 220 is directed at a second beam steering mirror 224. Beam steering mirror 224 reflects beam 222 to give an incident beam 226 that is directed through a focusing lens 248 and into sample 122 at an incident angle 256 normal to the planar surface of rear window 160. Beam 226 traverses sample 122 and exits through front window 158 toward a beam stop 238. Beam 216 and beam 226 intersect at the center of sample cell 120 and between electrode 116 and electrode 118 to form scattering volume 258. Interference of beam 216 and beam 226 within the scattering volume 258 creates interference fringes that are traversed by particles moving in the electric field. The phase of light scattered by a particle is determined by the particle's position within an interference fringe. A frequency shift of the scattered light relative to the incident light occurs that is the same as for the reference beam configuration. Scattered light 250 exiting sample cell 120 via front window 158 is focused by lens 154 onto detector 134. Detector 134 generates electric detector signal 136 proportional to the intensity of mixed light 250 at the detector 134. ELS theory states that the reference beam configuration and the crossed-beam configuration are mathematically equivalent and that detector signal 136 can be analyzed with a common set of equations when scattering angle 156 and scattering angle 256 are the same and the following parameters for both configurations are the same: laser wavelength; $\Delta f_s$; and refractive index of the liquid phase. i.e., the LDE analysis method and the PALS analysis method are independent of the apparatus configuration.

Figure 3:
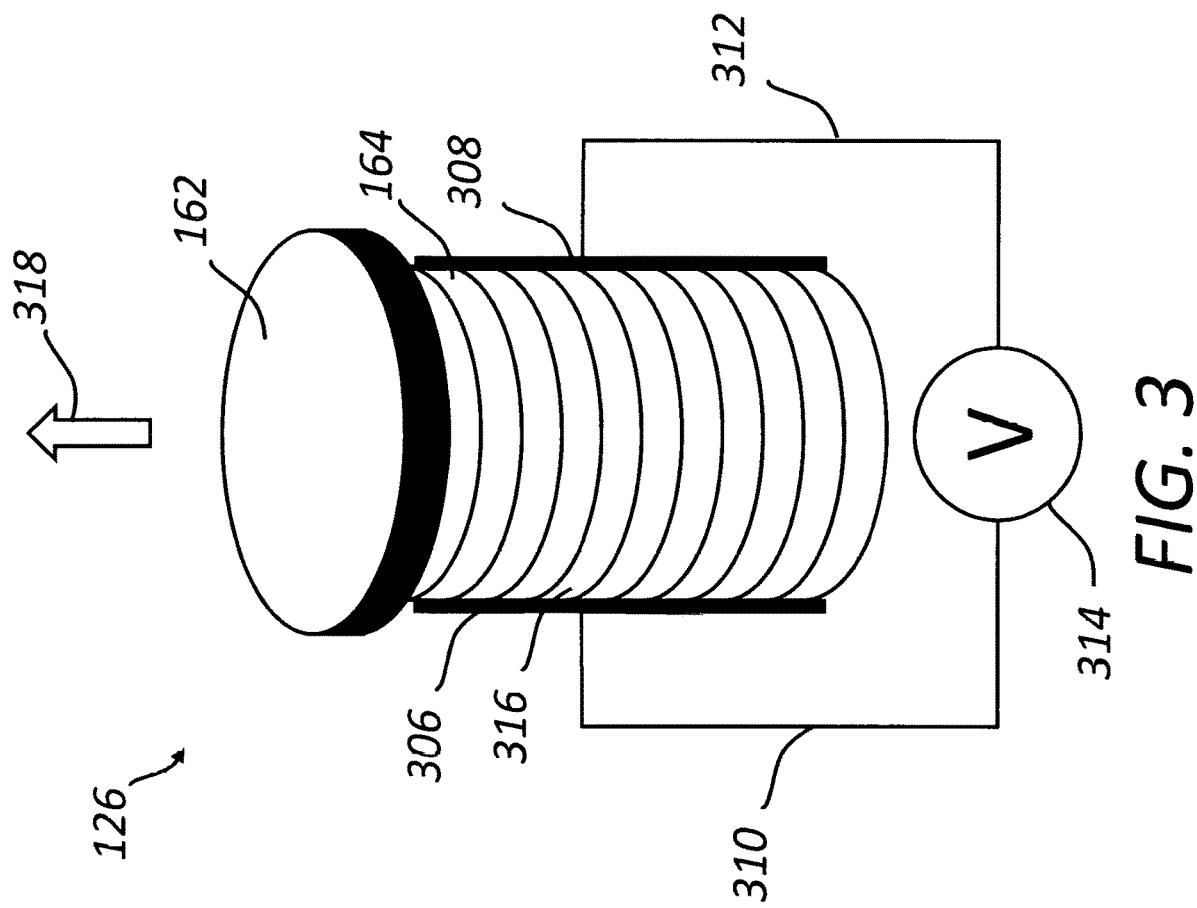
FIG. 3 illustrates a piezo-electric actuator and mirror used to shift the frequency of the reference beam in a reference beam ELS apparatus, in accordance with one or more implementations.

The exemplary apparatus shown in FIG. 1 uses frequency shifter 126 to establish a frequency difference $\Delta f_s$ between the frequency of beam 112 and the frequency of diffuse reference light 144. Ordinarily, frequency shifter 126 is a mirror 162 attached to a piezo-electric actuator 164 as illustrated in FIG. 3. A piezo-electric actuator 164 consists of contacted ceramic discs 316. A first electrode 306 is positioned on one side of the stack of discs and a second electrode 308 is positioned on the side of the stack of discs diametrically opposed to the location of first electrode 306. A voltage source 314 is connected to first electrode 306 via connection 310 and to second electrode 308 via connection 312. Application of a voltage between first electrode 306 and second electrode 308 causes discs 316 to expand in a direction perpendicular to the direction of the electric field generated between first electrode 306 and second electrode 308. Expansion of discs 316 causes displacement of mirror 162 in direction 318 perpendicular to the direction of the electric field generated between first electrode 306 and second electrode 308. The position of the reflecting surface of mirror 162 with respect to beam 124 determines the optical phase of the instant light at the surface of mirror 162. The displacement of mirror 162 causes a change in the phase between beam 124 and beam 142. Beam 112 originates from the same laser source 102 as beam 124 and so changes in phase between beam 124 and beam 142 are the same as those between beam 112 and diffuse reference light 144. Moving mirror 162 with a constant velocity creates a constant rate of change of the phase difference between beam 124 and beam 142. The rate of change of phase with time is defined as frequency such that one hertz is equal to 360° per second. Hence, $\Delta f_s$ is proportional to the velocity of mirror 162. Ideally, the displacement of mirror 162 should be of constant velocity. This ideal characteristic is not achievable in practice. Displacement of the piezo-electric material within piezo-electric actuator 164 occurs by application of a driving voltage. The maximum displacement of the piezo-electric material within piezo-electric actuator 164 and attached mirror 162 depends on many factors. Piezo-electric actuator 164 can only move mirror 162 a small distance before piezo-electric actuator 164 has to return to its non-actuated state. The inherent properties of the piezo-electric material within piezo-electric actuator 164 mean that the displacement is not truly linear with respect to the applied voltage. There is also a finite time that is required for the piezo-electric material within piezo-electric actuator 164 to relax back to its non-actuated state when the voltage is removed prior to the next cycle. Therefore, there will be a finite time during which the generation of target frequency shift $\Delta f_s$ is interrupted and detector signal 136 must be omitted from analysis. This requires careful synchronization between the operation of piezo-electric actuator 164 and omission of data.

Figure 4:
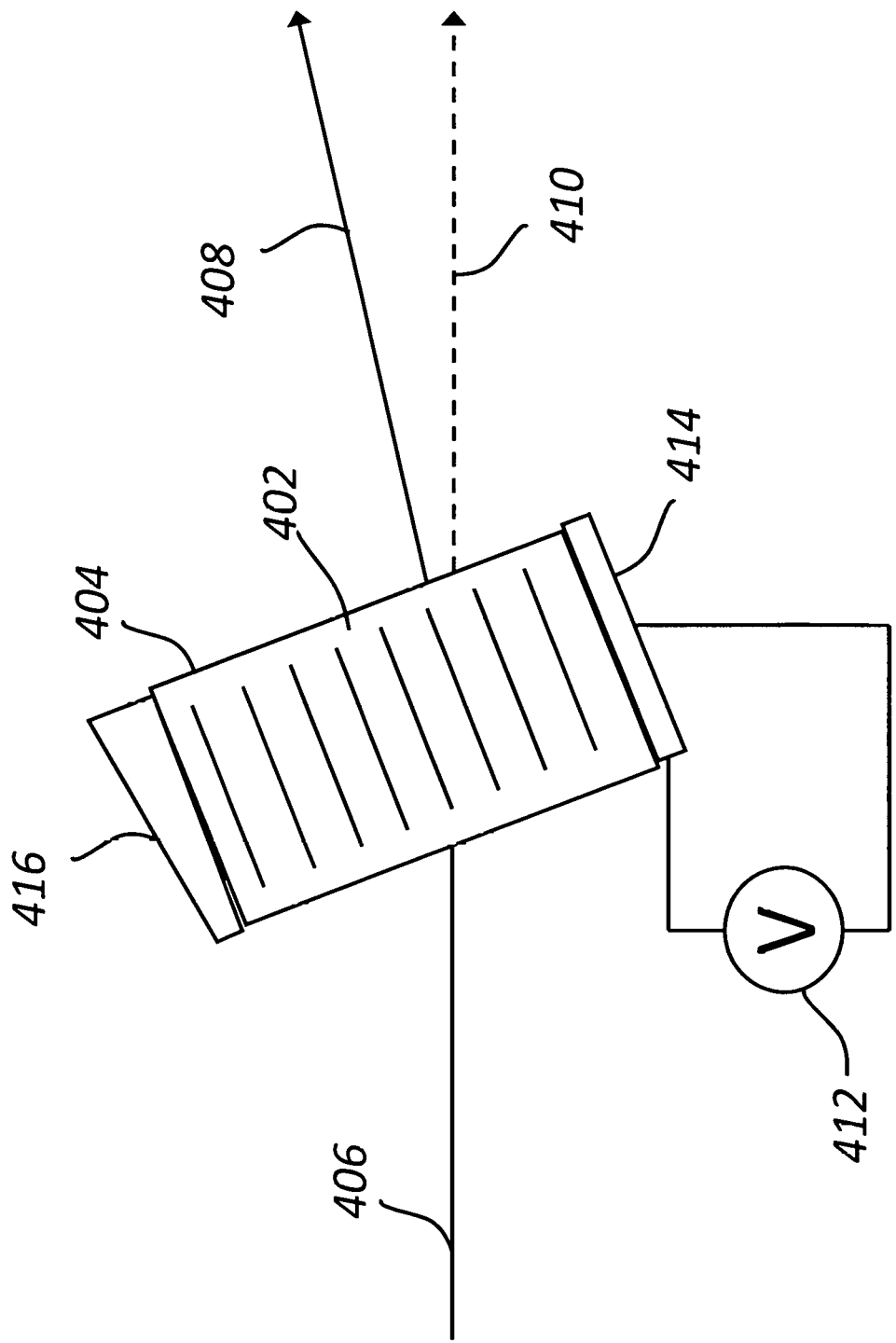
FIG. 4 is a schematic representation of an acousto-optic modulator, in accordance with one or more implementations.

The exemplary apparatus shown in FIG. 2 uses modulator 210 and modulator 220 to establish a frequency difference $\Delta f_s$ between the frequency of beam 216 and the frequency of beam 226. To understand operation wherein the modulator is an acousto-optic modulator, consider FIG. 4. Acoustic waves 402 propagating in a crystal 404 cause periodic changes in the density of the crystal and, thereby, the refractive index of the crystal 404. If a laser beam 406 passes through crystal 404, then a portion of beam 406 will be diffracted to yield beam 408 because of the change in the refractive index of crystal 404. The non-diffracted portion of beam 406 exits crystal 404 as beam 410. The laws of the conservation of energy and momentum require that the frequency of diffracted beam 408 must be different than that of non-diffracted beam 410. Acoustic waves 402 may be generated by the application of an alternating voltage 412 to a suitable transducer 414 in contact with a face of crystal 404. An acoustic absorber 416 at the face of crystal 404 opposite to the face in contact with transducer 414 minimizes reflection of acoustic waves 402 within crystal 404. The frequency of beam 406 is shifted by the frequency of alternating voltage 412, $f_0$, commonly in the range 10 MHz to 100 MHz. For ELS, the required frequency difference $\Delta f_s$ between beam 212 and beam 222 is generally less than 10 kHz and can be attained by operating modulator 210 at $f_0$ and modulator 220 at $f_0 + \Delta f_s$ (or vice versa.) The voltage signals required to operate modulator 210 and modulator 220 are generated from a common signal. This may be achieved, for example, in the analog domain using single sideband modulation or in the digital domain using direct digital synthesis (DDS.) In contrast to the frequency shifting method used for the exemplary reference beam apparatus shown in FIG. 1, the frequency difference between the two laser beams using the acousto-optic modulation method is exactly equal to that between the two signals used to operate modulator 210 and modulator 220. Whereas operation of frequency shifter 126 creates discontinuities in the temporal phase change of the reference beam 142 relative to beam 124, the acousto-optic modulation method creates an uninterrupted temporal phase change allowing all detector signal 136 to be utilized for subsequent analysis by, for example, one or both of the LDE analysis method and the PALS analysis method.

One aspect of the present invention is using acousto-optic modulation to replace one or both of mechanical beam blocking means 140 and mechanical attenuator 114 with a solid-state electrical means for implementing one or both of attenuating the intensity of beam 108 and blocking beam 124. The use of acousto-optic modulation to create the necessary frequency difference between beam 112 and beam 142 instead of by frequency shifter 126 offers advantages including, but not limited to: replacement of a mechanical means with a solid state electronic means; simpler implementation to generate the necessary frequency difference between beam 112 and beam 142; ability to analyze detector signal 136 without temporal discontinuities; and improved reliability of the apparatus. Prior implementations of a reference beam apparatus use mechanical means to create the necessary frequency difference between beam 112 and beam 142.

Figure 5:
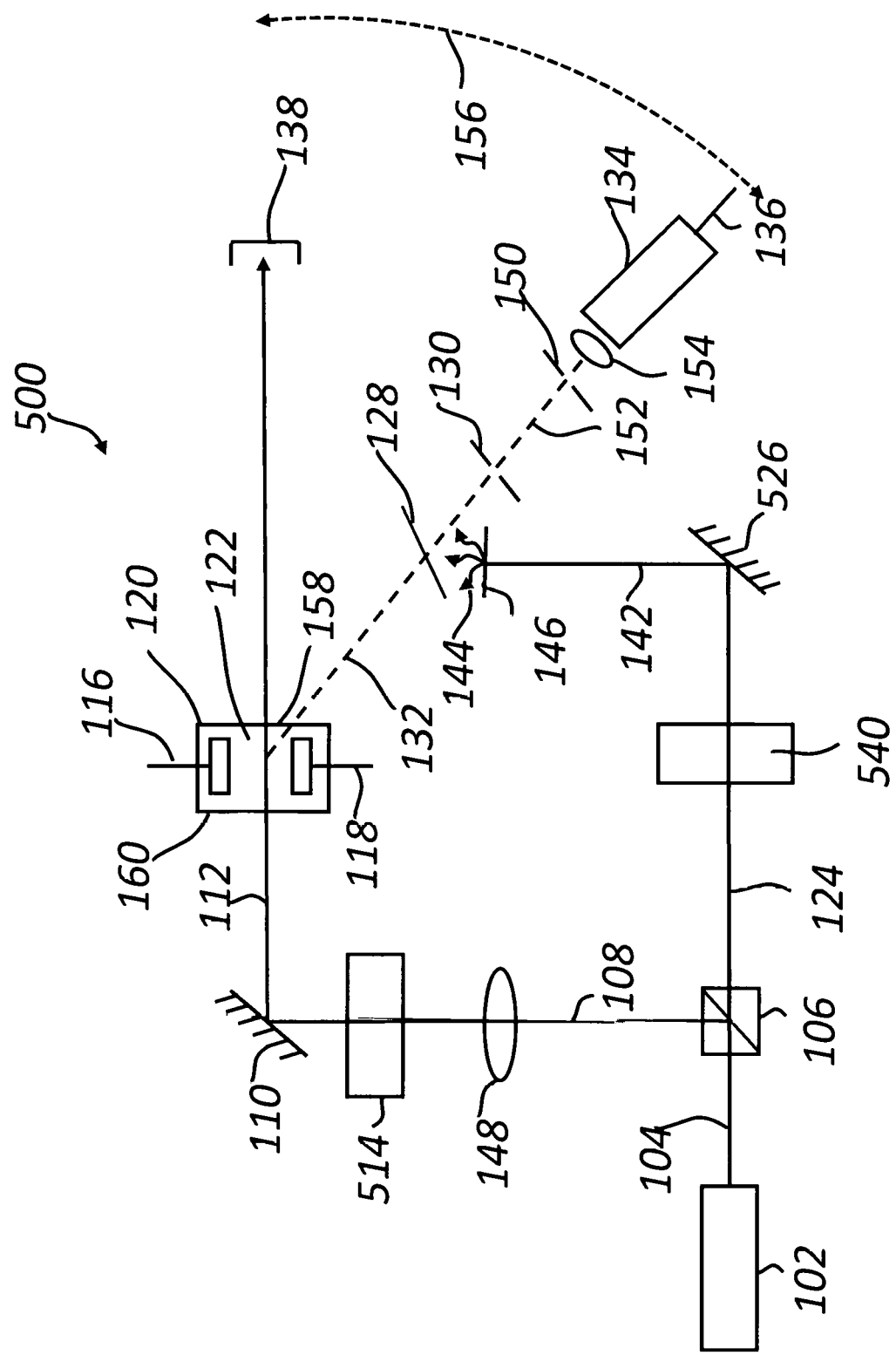
FIG. 5 shows a nonlimiting embodiment of an ELS apparatus using a reference beam optical configuration and incorporating acousto-optic modulators for controlling laser light intensity and shifting the frequency of the reference beam, in accordance with one or more implementations.

FIG. 5 shows a nonlimiting embodiment of an apparatus incorporating this aspect of the present invention. Comparison of FIG. 5 with FIG. 1 shows that beam blocking means 140, attenuator 114, and frequency shifter 126 are replaced by acousto-optic modulators 540 and 514, and beam steering mirror 526, respectively. The intensity of a diffracted beam emerging from an acousto-optic modulator depends upon the amplitude of the operating signal. Therefore, a modulator can function as a variable attenuator. The maximum attenuation possible is 100% and so a modulator can function as a beam block. An advantageous consequence of this aspect of the present invention is that acousto-optic modulators 514 and 540 can be used to generate the necessary frequency difference between beam 112 and beam 142, thereby allowing frequency shifter 126 to be replaced by beam steering mirror 526.

Figure 6A:
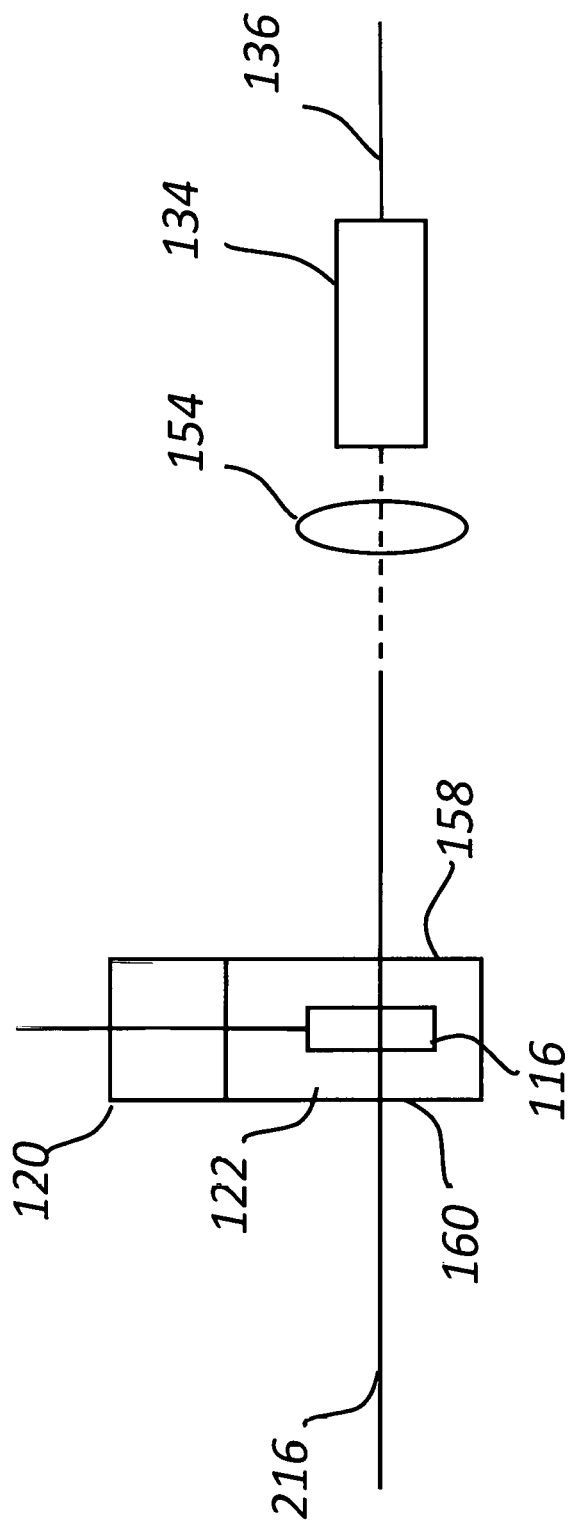
FIG. 6A illustrates a nonlimiting embodiment where the detector is positioned in the same geometrical plane defined by the plane of the two intersecting beams in an ELS apparatus using a crossed-beam optical configuration, in accordance with one or more implementations.
Figure 6B:
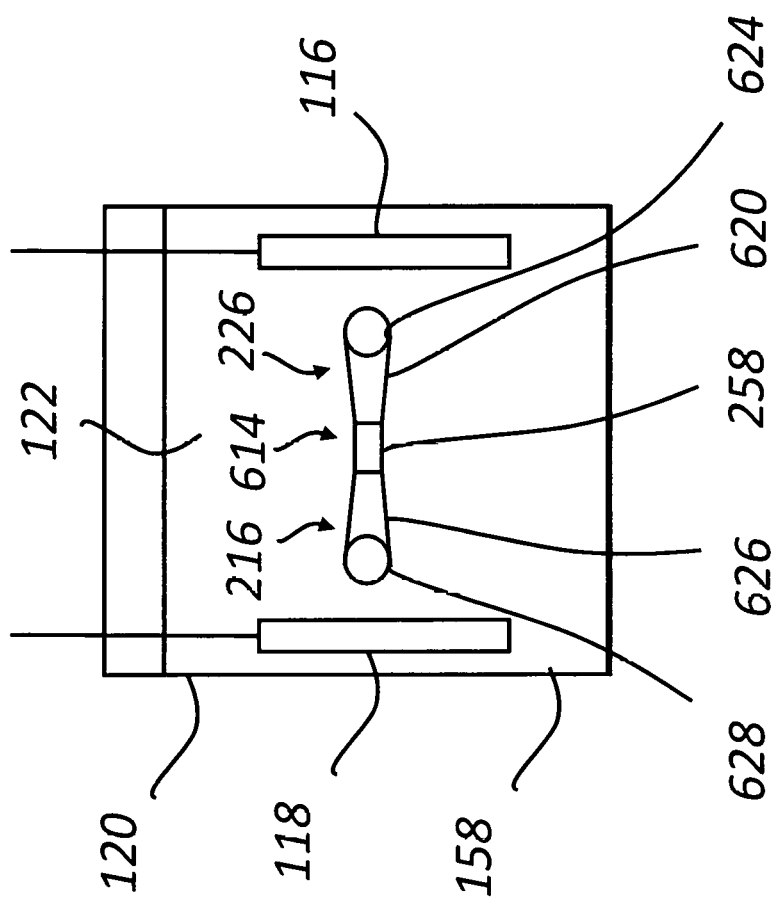
FIG. 6B illustrates the view of the two intersecting beams within the sample from the perspective of the detector positioned in the same geometrical plane defined by the plane of the two intersecting beams in an ELS apparatus using a crossed-beam optical configuration, in accordance with one or more implementations.
Figure 6C:
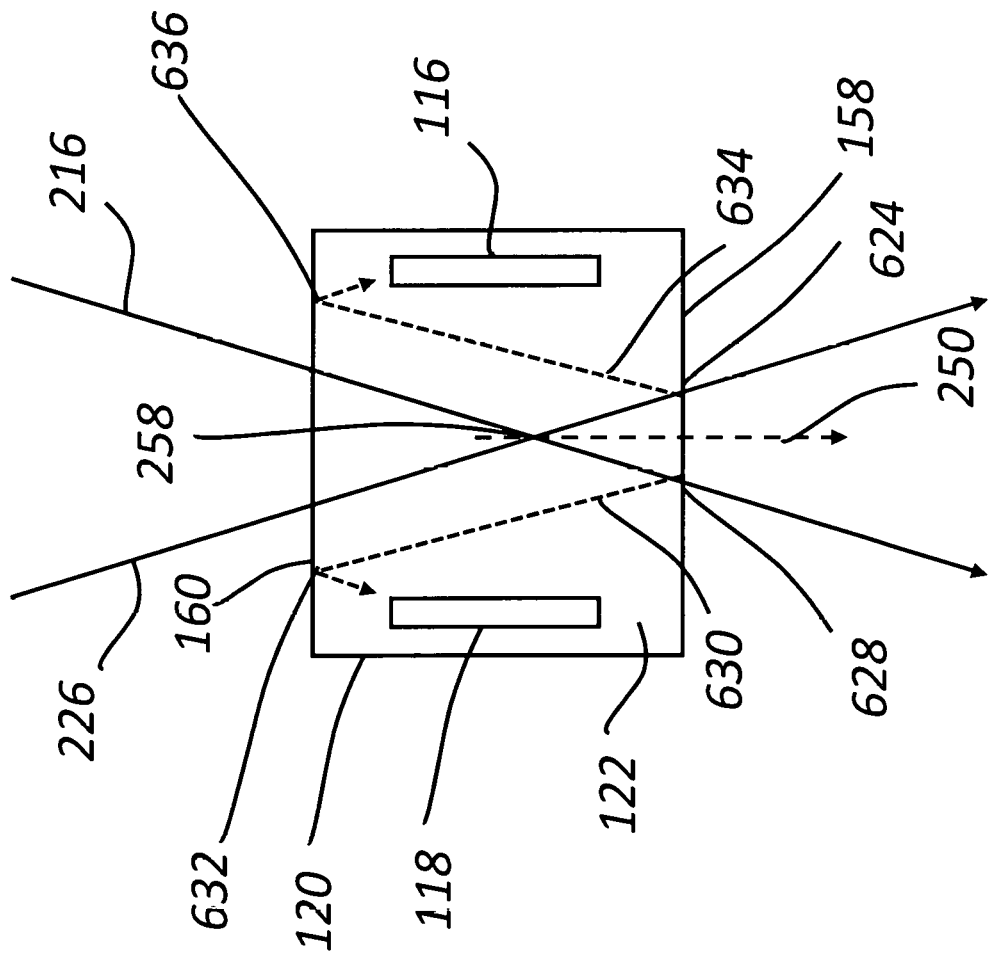
FIG. 6C illustrates reflections off the internal surfaces of the sample cell of the two intersecting beams within the sample in an ELS apparatus using a crossed-beam optical configuration, in accordance with one or more implementations.

Another aspect of the present invention increases the ease of alignment of detector 134 for the cross-beam configuration and reduces the presence of unwanted "stray" light at detector 134 for the cross-beam configuration. For prior implementations of the reference beam configuration, detector 134 is positioned in the same geometrical plane as defined by beam 112 and beam 142. For prior implementations of the crossed-beam configuration, detector 134 is positioned in the same geometrical plane defined by beam 216 and beam 226 as shown in FIG. 6A. Detector 134 is positioned along an axis normal to front window 158 and receives light scattered from the scattering volume 258 defined by the volume where beam 216 and beam 226 coincide. Focusing lens 154 is placed between sample cell 120 and detector 134. FIG. 6B represents the view from the perspective of the detector of the sample cell 120, sample 122, electrode 116, electrode 118, beam 216 and beam 226. FIG. 6C represents the view from above of the sample cell 120, sample 122, electrode 116, electrode 118, beam 216 and beam 226. In FIG. 6B, the light from beam 216 and beam 226 appears as a narrow band of light 614 with uniform intensity that can be generally described by the following regions: region 628 is the scattering from beam 216 at the interface between the liquid in sample 122 and front window 158; region 624 is the scattering from beam 226 at the interface between the liquid in sample 122 and front window 158; region 626 is light scattered from the part of beam 216 within sample 122; region 620 is light scattered from the part of beam 226 within sample 122; and scattering volume 258. It is important to limit the scattered light received by detector 134 to that originating from scattering volume 258. The uniform appearance of the band of light 614 can make necessary alignment difficult. Stray light can occur due to one or both of beam 216 and beam 226 reflecting on the internal surfaces of the sample cell 120. Referring to FIG. 6C, beam 216 reflects off the internal surface of window 158 at region 628 and beam 226 reflects off the internal surface of window 158 at region 624. Particles in sample 122 scatter a portion of reflected beam 630 and a portion of reflected beam 634 and the scattered light may interfere with the desired scattered light 250. Additional reflection and scattering may occur depending on, but not limited to: the optical properties of sample 122; the optical properties of the materials of construction of sample cell 120 including electrode 116 and electrode 118; the geometry of sample cell 120 including electrode 116 and electrode 118; and scattering angle 256. An example of additional reflection is reflection of reflected beams 630 and 634 at the interior surface of rear window 160 of sample cell 120 at 632 and 636, respectively. FIGS. 7A and 7B illustrate the modification in the present invention to the crossed-beam configuration that can significantly reduce the amount of stray light received at detector 134 and simplify the alignment of detector 134 with scattering volume 258. Referring to FIG. 7A, detector 134 is located out of the plane defined by beam 216 and beam 226. Detector 134 and lens 154 are positioned such that scattered light 704 originating from beam 216 and beam 226 is focused onto detector 134 as an image of a cross 710 that is shown in greater detail in FIG. 7B. Intersection 708 of crossmembers 712 and 714 is the image of scattering volume 258. By using a detector with an active area no larger than the area of the image of scattering volume 258, the amount of scattered light received by detector 134 is significantly reduced. It is not necessary to know the value of angle 706 because the intensity fluctuations of the scattered light originate in scattering volume 258 in contrast to the reference beam configuration.

Figure 8:
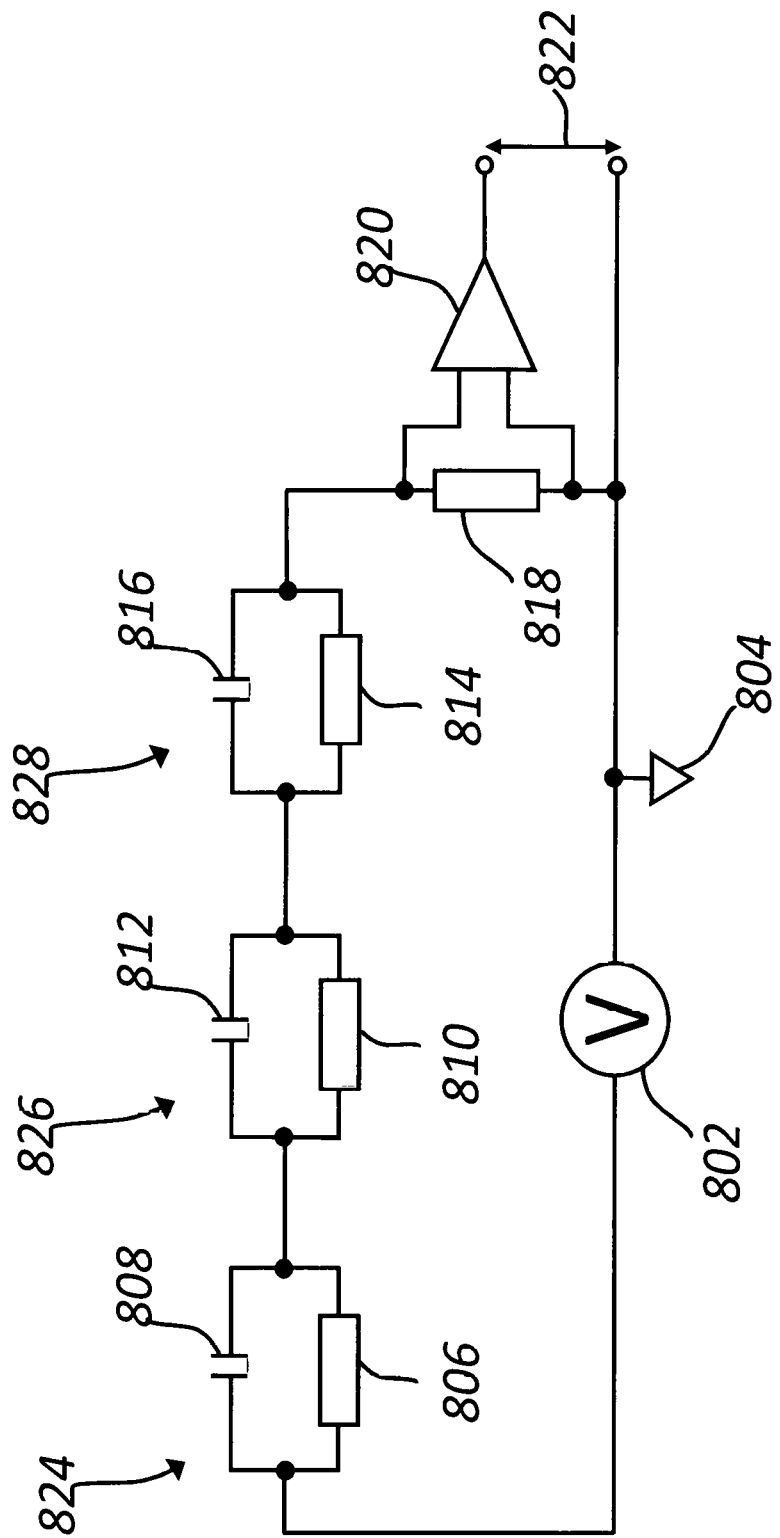
FIG. 8 is a schematic drawing of an electrical circuit for generating a voltage applied across the electrodes in contact with the sample and for measuring the resulting current, in accordance with one or more implementations.
Figure 10:
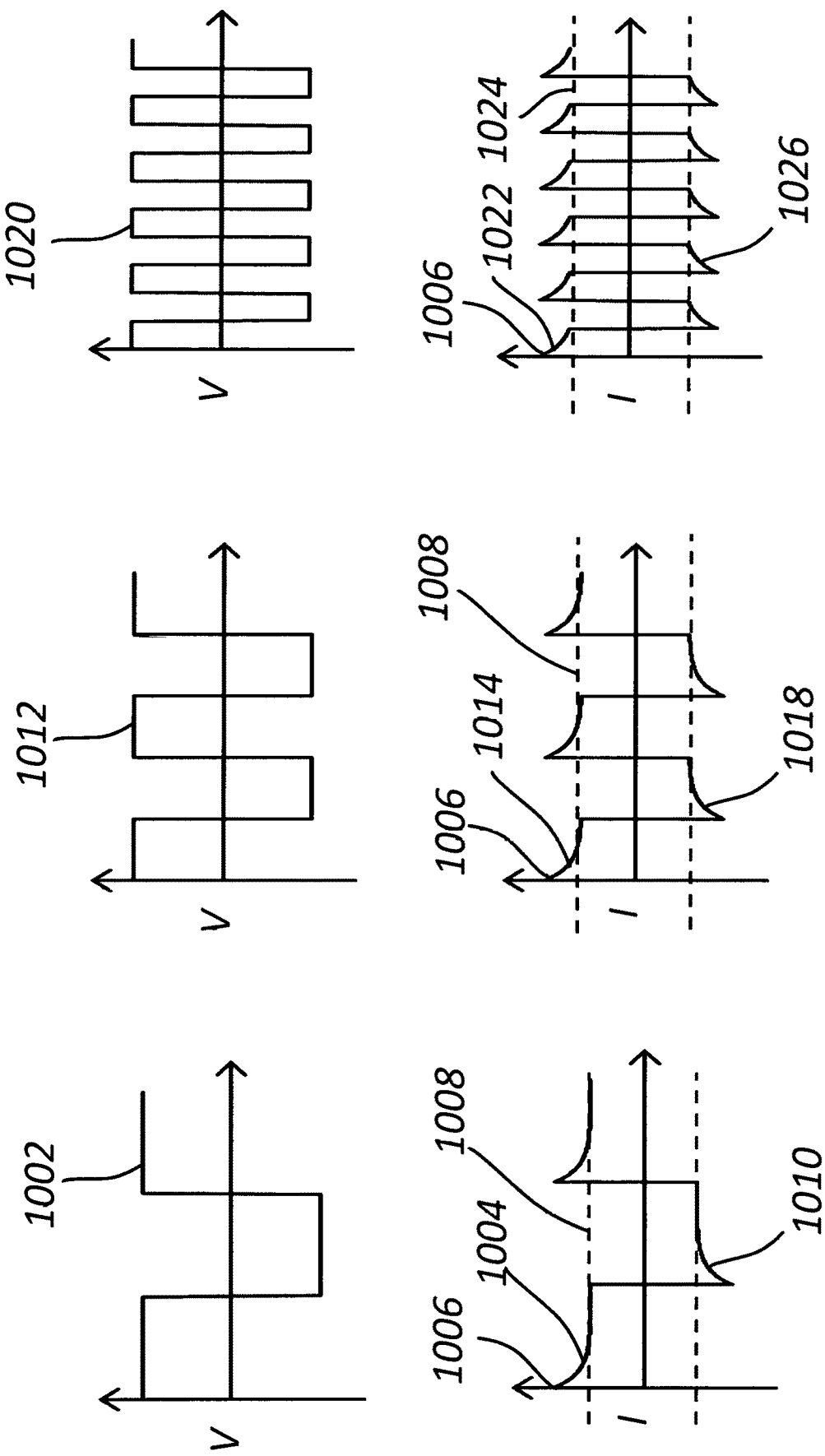
FIG. 10 generalizes how the frequency of the applied electrode voltage with a square waveform determines how far the magnitude of the current declines before the polarity of electric field reverses, in accordance with one or more implementations.

For ease of discussion, the following description assumes an alternating electric field. Prior implementations of ELS tacitly assume that [1] is independent of the electrical properties of a sample whereas such assumptions may not be valid for many samples including those of significant industrial importance whose dispersion liquids possess high ionic strength. One assumption of the electrical properties of a sample is that it obeys Ohm's law such that:

$$V(t)=I(t)Z \qquad [2]$$

and $$E(t)=V(t)K_{cell}=I(t)ZK_{cell} \qquad [3]$$

where I(t) is the current flowing through the sample, Z is the complex impedance of the sample, V(t) is the voltage applied to the electrodes, and $K_{cell}$ is a cell constant that is the proportionality constant for an assumed linear relationship between V(t) and E(t). Electrical phenomena such as electrode polarization and electrolysis are dependent on V(t) rather than E(t). Therefore, there is an unmet need to measure I(t) to detect and quantify electrical phenomena occurring within a sample when I(t) is not zero. The present invention meets this need. Although the method of the present invention describes current I(t) flowing due to generation of V(t) by a voltage source, one having ordinary skill in the art will appreciate that it is also possible to generate I(t) by a current source and create V(t) as a result. For exemplification purposes only, the method of the present invention is described in terms of measuring I(t) in response to V(t). Similar description of the method that measures V(t) in response to I(t) is implied. FIG. 8 is a schematic drawing of an electrical circuit for generating V(t) with generator 802 and measuring I(t) by using a high precision amplifier 820 to measure the voltage generated across shunt resistor 818 due to I(t) flowing to electrical ground 804. The output voltage 822 from the amplifier is directly proportional to the voltage across shunt resistor 818 and therefore directly proportional to I(t). If the gain of amplifier 820 is known then I(t) can be quantified accurately. A resistor-capacitor (RC) network approximates the complex impedance of electrode 116, electrode 118 and sample 122 in which said electrodes are immersed. Parallel RC network 824 comprised of resistor 806 and capacitor 808 models the complex impedance $Z_1$ at the interface between sample 122 and electrode 116. Similarly, parallel RC network 828 comprised of resistor 814 and capacitor 816 models the complex impedance $Z_2$ at the interface between sample 122 and electrode 118. The complex impedance $Z_3$ of sample 122 is modeled by parallel RC network 826 formed by resistor 810 and capacitor 812. When electrode 116 and electrode 118 are of the same material $Z_1=Z_2$. The primary factor that determines the complex impedance of each RC network is the ionic strength of sample 122. Increasing ionic strength reduces the resistance of each network thereby increasing I(t) for a given V(t). The presence of electrolyte in sample 122 results in the formation of a capacitive electrical double layer (EDL) at the interface between sample 122 and the surface of electrode 116 and the interface between sample 122 the surface of electrode 118. Increasing ionic strength reduces the thickness of the EDL which increases its capacitance. Schematically, FIGS. 9A-9D show the change of current as a function of time over 1.5 periods when V(t) is square waveform as depicted in FIG. 9A. Current response as depicted in FIG. 9B illustrates a response with insignificant electrode polarization that may be obtained for a liquid with low ionic strength (nominally less than 1 mM.) The response depicted in FIG. 9C shows the effect of moderate electrode polarization at ionic strengths in the nominal range 1 to 10 mM, and the response depicted in FIG. 9D illustrates the effect of high electrode polarization at ionic strengths in the nominal range 10 to 100 mM. FIG. 9C and FIG. 9D show the typical gradual reduction in current due to the charging of the EDL following change of polarity of V(t). The capacitance of the EDL increases with increasing ionic strength and the resistance of the EDL decreases. The decrease in resistance occurs to a greater degree than the increase in capacitance resulting in a decrease in the time constant for the charging of the EDL. Therefore, the decay part of the current response becomes faster with increasing ionic strength. FIG. 10 generalizes how the frequency of V(t) with a square waveform determines how far 40 declines before the polarity of V(t) reverses. For V(t) with the lowest frequency 1002, decay 1004 of I(t) starts at maximum current 1006 and reaches limiting value 1008 at nominally one quarter period of one cycle of V(t) after the start of decay 1004. Decay 1010 of I(t) is of equal magnitude to and the opposite sign of decay 1004. For V(t) with frequency 1012, equal to twice that for 1002, decay 1014 of I(t) starts at maximum current 1006 and reaches limiting value 1008 at nominally half a period of one cycle of V(t) after the start of decay 1014. Decay 1018 of I(t) is of equal magnitude to and opposite sign of decay 1014. For V(t) with frequency 1020, equal to four times that for 1002, decay 1022 of I(t) starts at maximum current 1006 and reaches 1024 which is higher in magnitude than limiting value 1008. Decay 1026 of I(t) is of equal magnitude to and the opposite sign of decay 1022. Therefore, the magnitude of the drop in I(t) during a half cycle of V(t) may be dependent on the frequency of V(t). In one nonlimiting embodiment, a quantitative descriptor is defined as follows:

$$I_{drop} = I_{min}/I_{max} \quad [4]$$

where $I_{max}$ is the maximum current (e.g., 1006) following polarity reversal of V(t) and $I_{min}$ is the minimum current (e.g., 1008) preceding the next polarity reversal of V(t). In the absence of electrode polarization $I_{drop}$ is 1. In the presence of an EDL, there is a potential drop between the electrode surface and the bulk liquid. The electric field strength in the bulk liquid is less than calculated based on the external field E(t). Accordingly, the force acting on particles will be less resulting in a lower electrophoretic velocity and electrophoretic mobility. Unexpectedly, the inventor herein has found that the effects of electrode polarization may be observed in the phase of detector signal 136. FIG. 11A shows the phase as a function of time for four cycles of a square electric field for zircon particles dispersed in 1 mM KCl (aq). The substantially symmetric triangle waveform indicates that the magnitude of electrophoretic velocity is constant. In contrast, FIG. 11B shows the phase as a function of time for four cycles of a square electric field for zircon particles dispersed in 10 mM KCl (aq). The curved nature of the phase between successive polarity reversals indicates that electrophoretic velocity decelerates between reversals in polarity such as between 1106 and 1108 and also between 1108 and 1110. FIGS. 12A through 12D illustrate that the curvature observed in FIG. 11B can be related to temporal changes in current. Generally, since I(t) is proportional to the electric field within the sample, then changes in I(t) indicate changes in electrophoretic velocity and the integral of I(t) over time will be proportional to the average displacement of the particles. FIG. 12A shows the current vs. time profile for one cycle of a square electric field in the absence of electrode polarization. The corresponding integral over time shown in FIG. 12B resembles one cycle of FIG. 11A. FIG. 12C shows the current vs. time profile for one cycle of a square electric field in the presence of electrode polarization. The corresponding integral over time depicted in FIG. 12D resembles one cycle of FIG. 11B. A significant consequence of the aforesaid current vs. time behavior is that electrophoretic mobilities measured using the PALS analysis method will be an average value between that expected for the electric field when the current is $I_{max}$ and that expected for the electric field when the current is $I_{min}$. Hence, electrophoretic mobility measured using the PALS analysis method may be subject to error that is dependent on V(t) and the frequency thereof and the ionic strength of the liquid. Electrophoretic mobility using the LDE analysis method is affected in the same way as for the PALS analysis method. In addition, the width of the electrophoretic mobility distribution is increased as shown schematically in FIGS. 13A through 13D. FIG. 13A shows I(t) in response to a square electric field in the absence of electrode polarization. The magnitude 1306 of I(t) remains constant. For a sample with a single mode of electrophoretic mobilities, the corresponding distribution of $\mu_e$ as depicted in FIG. 13B has a single peak 1310 centered at 1312. The width of peak 1310 may represent properties of the sample including, but not limited to, random diffusion of the particles and a distribution of electrophoretic mobilities. In contrast, FIG. 13C shows I(t) in response to square electric field in the presence of electrode polarization. The magnitude 1316 of I(t) decreases to a value indicated by 1318 during each half-period of the electric field. For a sample with a single mode of electrophoretic mobilities, the corresponding distribution of $\mu_e$ as depicted in FIG. 13D has a single peak 1322 centered about $\mu_e < 1312$. The width of peak 1322 will have contributions the same as for peak 1310 and, significantly, due to the decrease of I(t) during each half-period of the electric field. In the presence of electrode polarization, estimates of the width of the electrophoretic mobility distribution may be subject to overestimation that is dependent on V(t) and the frequency thereof and the ionic strength of the liquid.

Application of V(t) having a sinusoidal waveform is depicted in FIGS. 14A through 14G. FIGS. 14B, 14C and 14D show schematically current I(t) profiles in response to voltage V(t) with sinusoidal waveform as depicted in FIG. 14A. Broken vertical line 1406 represents the midpoint of single cycle 1404. 1410 of FIG. 14B shows current I(t) response in the absence of electrode polarization and electrolysis. FIG. 14E is a plot of I(t) vs V(t). Straight line 1422 indicates a purely resistive relationship between I and V. In the presence of electrode polarization and negligible electrolysis, a sinusoidal response 1414 as depicted in FIG. 14C for I vs V is obtained. The presence of EDL capacitance causes a phase lag of I with respect to the phase of V. Ellipse 1426 in the I vs V plot depicted in FIG. 14F visualizes the phase lag due to the EDL capacitance. FIG. 14D illustrates the effect of the presence of electrode polarization and electrolysis on response 1418 for I vs V. Larger phase lag compared to 1414 in FIG. 14C and significant distortion of the sinusoidal response occur. The highly distorted appearance of 1430 in the I vs V plot depicted in FIG. 14G suggests the presence of redox reactions occurring at the interface between the electrodes and the liquid. It is advantageous to plot the I vs V response in order to provide a visual assessment of the extent of electrode polarization and electrolysis. It is also advantageous to perform a complex impedance analysis of use the numerical values for I(t) and V(t). The theory of complex impedance analysis is widely taught elsewhere and incorporated herein by reference. Numerous impedance characteristics of the sample can be estimated including, but not limited to: impedance, resistance, conductance, capacitance, admittance, and phase lag of I with respect to V.

Figure 15:
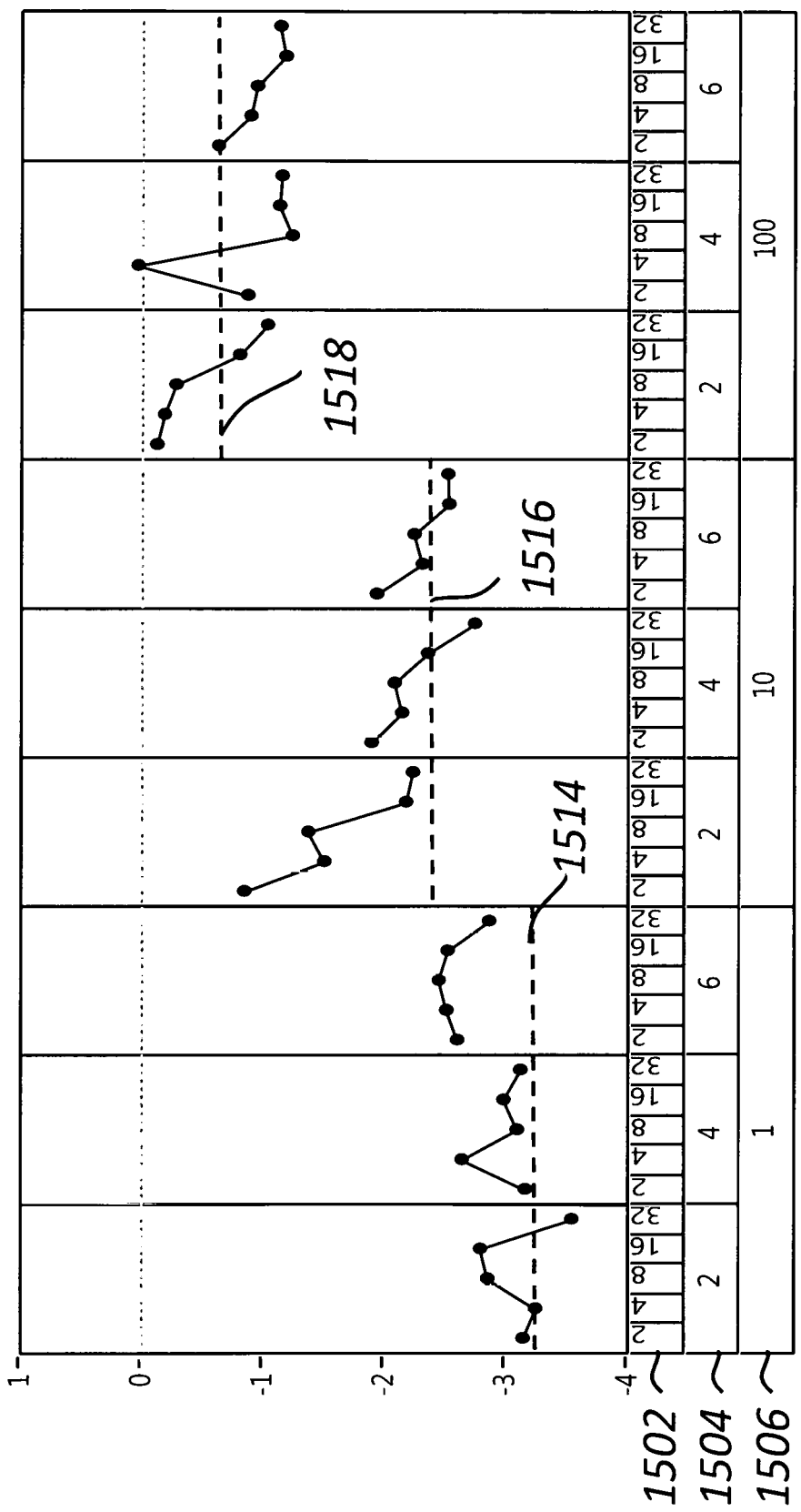
FIG. 15 shows experimental electrophoretic mobility data for zircon particles dispersed in three concentrations of aqueous potassium chloride solution, in accordance with one or more implementations.

FIG. 15 shows experimental electrophoretic mobility data for zircon particles dispersed in aqueous potassium chloride solution. A square waveform voltage was applied across the electrodes and the data were determined using the LDE analysis method. Three experimental factors were investigated using a full factorial design. The three factors were: concentration of electrolyte 1506 expressed as millimolar (mM); magnitude of applied voltage waveform 1504 expressed as volts; and frequency of applied voltage waveform 1502 expressed as hertz. The graph is presented as a variability plot that allows for straightforward visualization of the magnitude of effect of each factor. At 1 mM electrolyte concentration there is insignificant variation in electrophoretic mobility on both magnitude and frequency of the applied waveform. At 10 mM electrolyte concentration there is significant variation in electrophoretic mobility according to both magnitude and frequency of the applied waveform. At 100 mM electrolyte concentration there is significant variation in electrophoretic mobility according to both magnitude and frequency of the applied waveform. Generally, the electrophoretic mobility increases with increasing magnitude and frequency of the applied waveform, and the electrophoretic mobility values are significantly lower than for the samples with lower electrolyte concentrations. The data in FIG. 15 highlight an important limitation of prior implementations of ELS, namely measurements are ordinarily performed at a single magnitude of the applied voltage and a single frequency of the applied voltage. In the presence of significant dependency of electrophoretic mobility on one or both of magnitude of the applied voltage and frequency of the applied voltage, there is a high likelihood that a false value for electrophoretic mobility will be obtained. There is an unmet need to correct electrophoretic mobility data to account for dependency of electrophoretic mobility on one or both of magnitude of the applied voltage and frequency of the applied voltage.

Figure 16A:
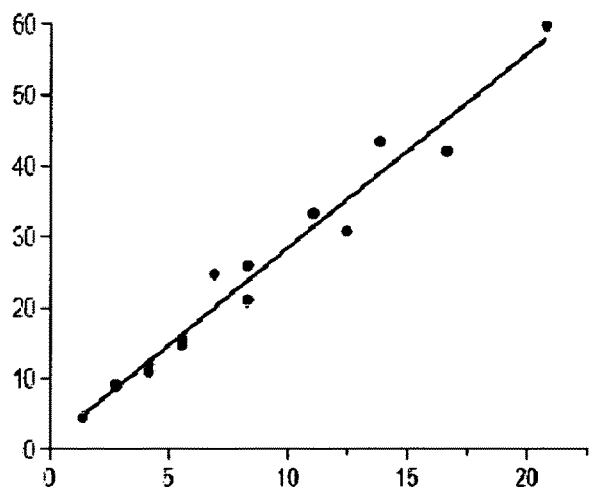
FIG. 16A, FIG. 16B and FIG. 16C illustrate application of mathematical transformations to the data shown in FIG. 15 and subsequent linear least squares analysis, in accordance with one or more implementations.
Figure 16B:
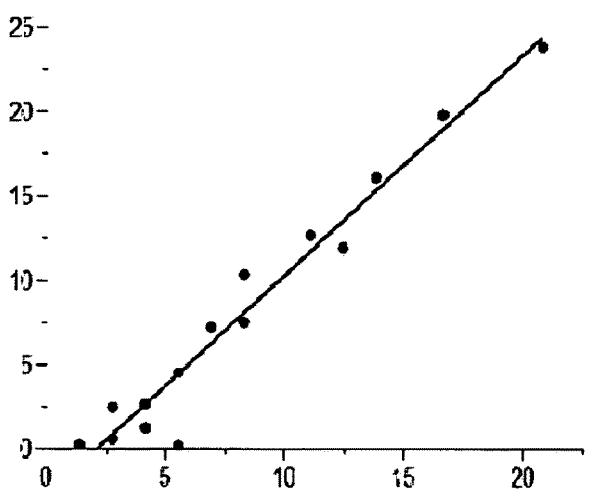
Figure 16C:
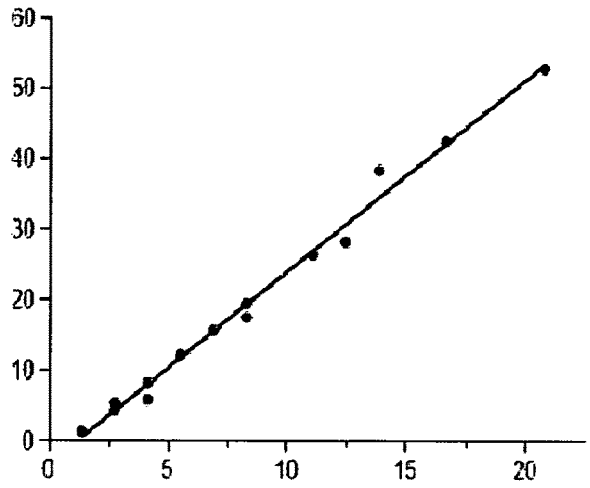

One aspect of the present invention fulfills the aforementioned need. This inventor has now found that a transformation can be applied to the experimental data that yields electrophoretic mobility values with improved accuracy. This is illustrated with the following example. Given $v_e(t) = \mu_e E(t)$, a field-dependent electrophoretic velocity $v_e(|E|)$ can be expressed in terms of the magnitude $|E|$ of electric field E(t) and true voltage-independent electrophoretic mobility $\mu_e^0$:

$$v_e(|E|) = \mu_e^0 |E| + \delta|E| \quad [5]$$

where $\delta|E|$ is an error term for $|E|$. Thus, $$\mu_e(|E|) \cdot |E| = \mu_e^0 \cdot |E| + \delta|E| \quad [6]$$

where $\mu_e(|E|)$ is the experimentally determined field- and voltage-dependent electrophoretic mobility. Since E(t) is linearly proportional to V(t), $$\mu_e(|V|) \cdot |V| = \mu_e^0 \cdot |V| + \delta|V| \quad [7]$$

Where |V| is the magnitude of V(t), $\mu_e(|V|) = \mu_e(|E|)$, and $\delta|V|$ is an error term for |C|. Therefore, linear least squares analysis of $\mu_e(|V|) \cdot |V|$ vs. |V| will yield a linear coefficient equal to $\mu_e^0$. A similar approach can compensate measured electrophoretic mobility data for both magnitude and frequency of V:

$$\mu_e(|V|) \cdot |V| \cdot \ln f = \mu_e^0 |V| \cdot \ln f + \delta|V| \quad [8]$$

where $f$ is the frequency of the applied voltage. FIGS. 16A through C illustrate applying transform [8] to the data shown in FIG. 15 and subsequent linear least squares analysis. The gradients of FIGS. 16A, 16B and 16C are equal to the values indicated by horizontal broken lines 1514, 1516 and 1518 in FIG. 15, respectively. The electrophoretic mobility values calculated via [8] are close to the experimentally determined electrophoretic mobility values at the highest magnitude and frequency of V.

Another aspect of the present invention provides for asynchronous temporal analysis (ATA) of detector signal 136 that offers significant advantages over conventional linear temporal analysis.

In a general and illustrative way, it is common, during measurement, to analyze detector signal 136 in blocks of small duration compared to the total measurement time. By way of a nonlimiting example, such blocks may be of one second duration whereas the total measurement time may be a few minutes. The data in each block are analyzed independently of other blocks and all of the blocks are analyzed in the same temporal order as they are received. The data within a block are discarded following analysis of said block. In the case of measurement using the LDE analysis method, the duration of the block may be equal to the period of the applied electric field such that the first data point in the block is synchronous with the start of the positive half of the electric field cycle. Fourier transformation of the first half of the data in the block yields a Doppler frequency spectrum for particle motion in the positive electric field. Fourier transformation of the second half of the data in the block yields a Doppler frequency spectrum for particle motion in the negative electric field and, in the absence of other collective motion of the particles, will closely resemble a mirror image in the frequency domain of the first spectrum. Both spectra may be combined to give a composite spectrum that is the sum of two individual spectra. The resolution of the Doppler frequency spectrum is inherently limited to twice the frequency of the applied electric field. The intensity of the data in the block may also be analyzed to determine if the intensity indicates the possibility of the strong light scattering due the presence of dust in sample at that moment and, if so, whether the block of data should be excluded from subsequent analysis. Following analysis of the block of data, the data are discarded. Analysis of detector signal 136 continues in chronological order in a block-by-block manner until measurement is complete. A frequency spectrum that is the summation of the frequency spectra for each half-period of the electric field cycle may be calculated, and an average electrophoretic mobility distribution for the duration of the measurement obtained. A significant disadvantage of linear temporal analysis is the inherent limitation of the resolution of the Doppler frequency spectrum and thus of the electrophoretic mobility distribution. As previously discussed, prior implementations of ELS using the LDE analysis method for samples with high ionic strength fail to provide electrophoretic mobility distributions with satisfactory accuracy, precision or reliability. There exists an important industrial need to be able to obtain satisfactory electrophoretic mobility distributions for samples that prior attempts fail to do.

Figure 17:
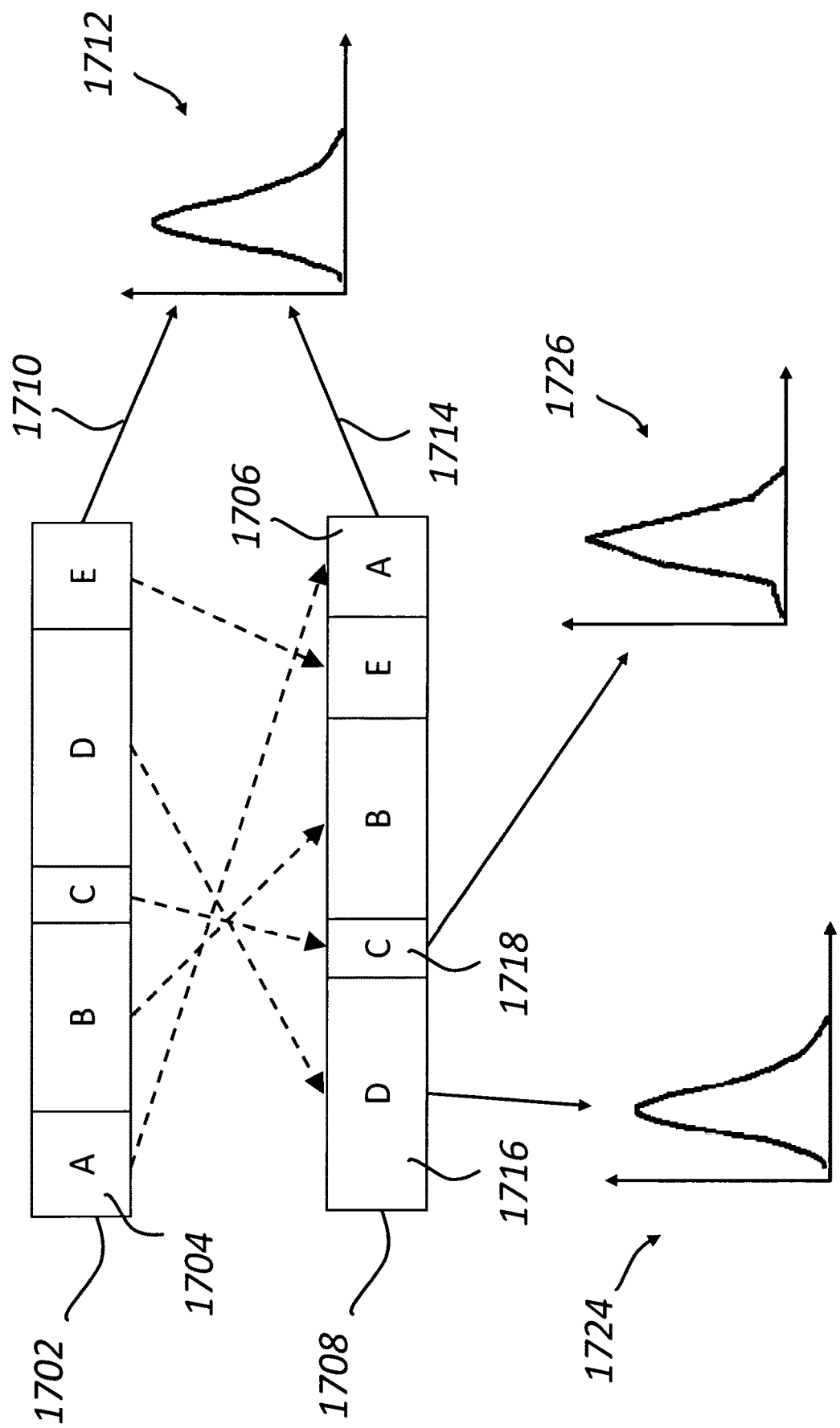
FIG. 17 illustrates a finite amount of the detector signal in the time domain divided into arbitrarily-sized blocks in chronologically ascending order. It shows the effect of the temporal duration of a block on the frequency resolution of the same data in the frequency domain. It further shows temporal reordering of the blocks, in accordance with the present invention.

Use of the ATA method in accordance with the present invention enables this need to be met. Generally, the temporal characteristics of the intensity of light scattered by particles during an ELS measurement are such that in the presence of only random particle motion, the temporal fluctuation of scattered light intensity will be a stationary stochastic process. Parameters such as mean and variance that characterize the process will not change over time. With the additional presence of linear motion due to electrophoresis, the temporal fluctuation may be considered to be a noisy sinusoid with frequency equal to the Doppler frequency that is constant. The fluctuation can be considered quasi-stationary on timescales larger than the Doppler period. For an ELS experiment with a duration of many minutes and employing a DC applied electric field, analysis of a contiguous subset of detector signal 136 using the LDE analysis method will yield results independent of the temporal location of the subset within detector signal 136. Referring to FIG. 17, 1702 represents a finite amount of detector signal 136 in the time domain and divided into arbitrarily-sized blocks in chronologically ascending order A (1704), B, C, D, and E. The temporal order of the blocks may be changed, such as exemplified by 1708 wherein block A is repositioned to be the most chronologically recent 1706. The quasi-stationary property of the ELS signal when employing a DC electric field means that forward Fourier transformation 1710 of 1702 to yield Doppler frequency spectrum 1712 is equivalent to forward Fourier transformation 1714 of 1708. The resolution of the Doppler frequency spectrum is limited to the reciprocal of the duration of 1702 that is the same duration as 1708. The above-mentioned quasi-stationarity also permits forward Fourier transformation of each of the blocks A, B, C, D, and E to be calculated separately to yield five separate Doppler frequency spectra. Each block's Doppler frequency spectrum will have a frequency resolution equal to the reciprocal of the duration of the block. Therefore, Doppler frequency spectra from shorter blocks will have fewer data points in the spectrum compared to longer blocks. For example, the resolution of Doppler frequency spectrum 1724 obtained from block 1716 is greater than the resolution of Doppler frequency spectrum 1726 obtained from block 1718.

Figure 18:
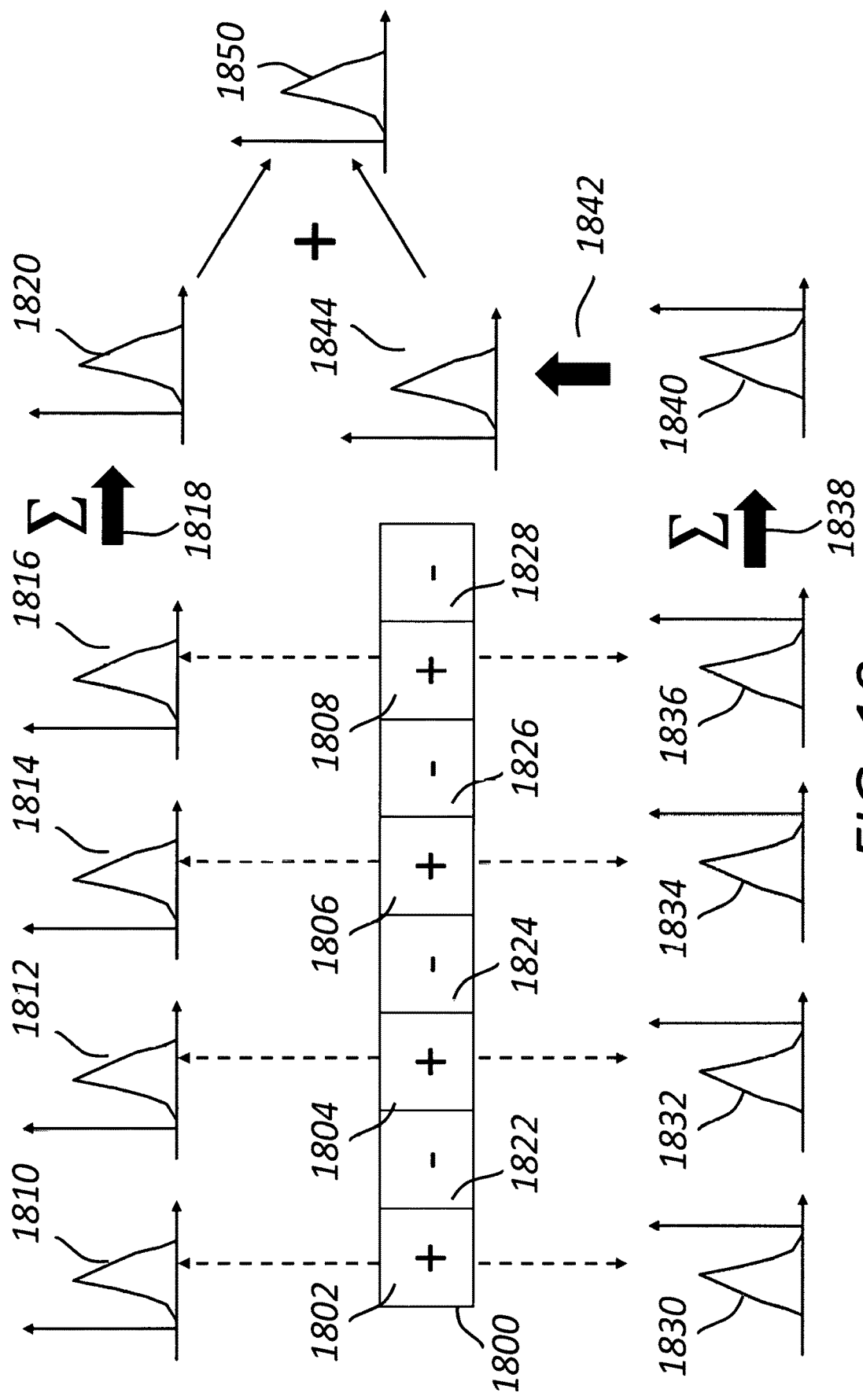
FIG. 18 represents a sequence of 8 contiguous blocks of temporal detector signal that are transformed into the frequency domain using a prior method.

Use of the ATA method in accordance with the present invention allows electrophoretic mobility distributions to be determined using the LDE analysis method without the resolution limit imposed by the frequency of the applied electric field with prior implementations of ELS. For example, in FIG. 18, 1800 represents a sequence of 8 blocks of temporal detector signal 136. Each block is of equal duration and is the same as the half-period of an alternating applied electric field. The start of each block coincides with a polarity reversal of the field. Blocks 1802, 1804, 1806, and 1808 represent data obtained when the polarity of the field is positive as indicated by "+" and blocks 1822, 1824, 1826, and 1828 represent data obtained when the polarity of the field is negative as indicated by "−". Forward Fourier transformation of 1802, 1804, 1806, and 1808 gives Doppler frequency spectra 1810, 1812, 1814, and 1816 whose frequency resolutions are twice the applied electric field frequency. Summation 1818 of 1810, 1812, 1814, and 1816 yields Doppler frequency spectrum 1820. Forward Fourier transformation of 1822, 1824, 1826, and 1828 gives Doppler frequency spectra 1830, 1832, 1834, and 1836 whose frequency resolutions are twice the applied electric field frequency. Summation 1838 of 1830, 1832, 1834, and 1836 yields Doppler frequency spectrum 1840 that is the summation of data obtained during the negative half of the applied electric field cycle and therefore a mirror image of 1820 in the frequency domain. 1842 indicates the transformation of 1840 to its mirror image 1844. Summation of 1820 and 1844 creates Doppler frequency spectrum 1850 that is the sum of 8 Doppler frequency spectra. The frequency resolution of 1850 is twice the applied electric field frequency. The process described for FIG. 18 represents the linear temporal analysis used by prior implementations of ELS.

FIG. 19 illustrates the significant advantage of using the ATA method in accordance with the present invention with sequence of blocks 1800 for which the data are ordered chronologically. The blocks are re-ordered to give a sequence of blocks 1902 such that the data are not ordered chronologically. The order of the blocks in 1902 is such that all the data collected during occurrence of positive portions of the applied electric field as indicated by "+" are positioned in the first half of 1902 and all the data collected during occurrence of negative portions as indicated by "−" of the applied electric field are positioned in the second half of 1902. Block sequence 1904 has the same duration as 1800 and can be treated as a sequence of two blocks where the first block 1906 is the linear combination of blocks 1802, 1804, 1806, and 1808, and the second block 1908 is the linear combination of blocks 1822, 1824, 1826, and 1828. Forward Fourier transformation of 1906 gives Doppler frequency spectrum 1910. Forward Fourier transformation of 1908 gives Doppler frequency spectrum 1912. 1914 indicates the transformation of 1912 to its mirror image 1916. Summation of 1910 and 1916 creates Doppler frequency spectrum 1922 that is the sum of two Doppler frequency spectra. In FIG. 19, there are four cycles of the applied electric field across the duration of 1800. Analysis using the ATA method yields Doppler frequency spectra with a frequency resolution equivalent to that that would be obtained from one cycle of an applied electric field with a period equal to the duration of 1800. The frequency resolution of Doppler frequency spectrum 1922 calculated using the ATA method is limited by the duration of the measurement. Assuming the duration is an exact number of cycles of the applied electric field then the detector signal 136 can be temporally re-ordered such that all the data collected during occurrence of positive portions of the applied electric field are positioned in the first half of the measurement period and all the data collected during occurrence of negative portions of the applied electric field are positioned in the second half of the measurement period. The frequency resolution of a Doppler frequency spectrum calculated from the two halves of the re-ordered data is the reciprocal of half the duration of the measurement and it is independent of the electric field frequency used for the measurement. By way of a nonlimiting example, consider an electric field frequency of 20 Hz used for a measurement of duration 60 s. With prior linear temporal analysis, the frequency resolution of the Doppler frequency spectrum would be 40 Hz, whereas with the ATA method the resolution of the Doppler frequency spectrum would be 1/30 Hz.

Someone of ordinary skill in the art of ELS will know that the presence of particulate contaminants can interfere with measurements of electrophoretic mobility using ELS. Particles with greater scattering power, such as dust, may spuriously scatter light with sufficiently high intensity so as to dominate the detector signal. This can introduce significant inaccuracy and variability regarding the measured electrophoretic mobility. It is another aspect of this invention to significantly increase the ability to reject spurious scattering events compared to prior methods. This spurious signal rejection (SSR) may be performed without user intervention according to one or more predefined heuristics or with user intervention or combination of both. The causes of spurious signals include, but are not limited to, dust particles, gas or vapor bubbles such as due to electrolysis, electronic malfunction, significant loss of the scattered light signal due to sample evaporation or displacement or a reduction in optical transmission by the formation of dark electrolysis byproducts, particle sedimentation, and particle aggregation. For nonlimiting illustration, consider FIGS. 20A through 20D wherein FIG. 20A shows a 10 second contiguous segment detector signal 136 amplitude obtained from measurement of a sample with high ionic strength and subjected to an applied electric field with frequency 10 Hz. Region of dark data points 2004 represents part of the signal where the light was scattered by the particles of interest in the sample. The same is true for the other regions of dark data points. Region of less dark data points 2006 represents part of the signal where the light was scattered by unwanted material in the sample. The same is true for the other regions of less dark data points. Applying the LDE analysis method to all the data 2014 will yield an electrophoretic mobility distribution depicted in FIG. 20C that is of poor quality. It is highly desirable to remove the regions of less dark data points from the signal data prior to analysis.

The ATA method provides a means to achieve this. In the nonlimiting example illustrated in FIGS. 20A through 20D, the detector signal 136 contains 1000 data points per second. The data are divided into contiguous blocks each with 50 samples. This number of samples per block is chosen to be the same as the half-period of the applied electric field. For each block one or more suitable descriptors may be calculated including, but not limited to, amplitude mean, amplitude standard deviation, amplitude maximum, and amplitude coefficient of variance. Consider amplitude maximum as a simple and nonlimiting case. All blocks of data with an amplitude maximum exceeding a defined limit are excluded from analysis. In FIG. 20A, the regions of dark data points are those within blocks where the amplitude maximum does not exceed the predefined limit whereas the regions of less dark data points are those within blocks where the amplitude maximum does exceed the predefined limit. The experimental data can be sorted temporally on a block-wise basis according to the amplitude maximum. FIG. 20B shows the original data shown in FIG. 20A re-ordered in ascending order of the amplitude maxima for each block. The re-ordered data of FIG. 20B contain a group of blocks 2010 and a group of blocks 2012. The data in group of blocks 2010 likely result from scattering from the particles of interest in the sample and the data in group of blocks 2012 likely result from scattering from unwanted material in the sample. Applying the LDE analysis method to the data in group of blocks 2010 will yield an electrophoretic mobility distribution as depicted in FIG. 20D of 2020 that is of superior quality to that depicted in FIG. 20C of 2016. The LDE analysis method may be applied to the data in group of blocks 2012. The data in group of blocks 2012 may be omitted from analysis. The ATA method may also be applied to the PALS analysis method whereby the accuracy and precision of the calculated mean electrophoretic mobility may be improved compared to the accuracy and precision of the calculated mean electrophoretic mobility using prior linear temporal analysis.

Figure 21:
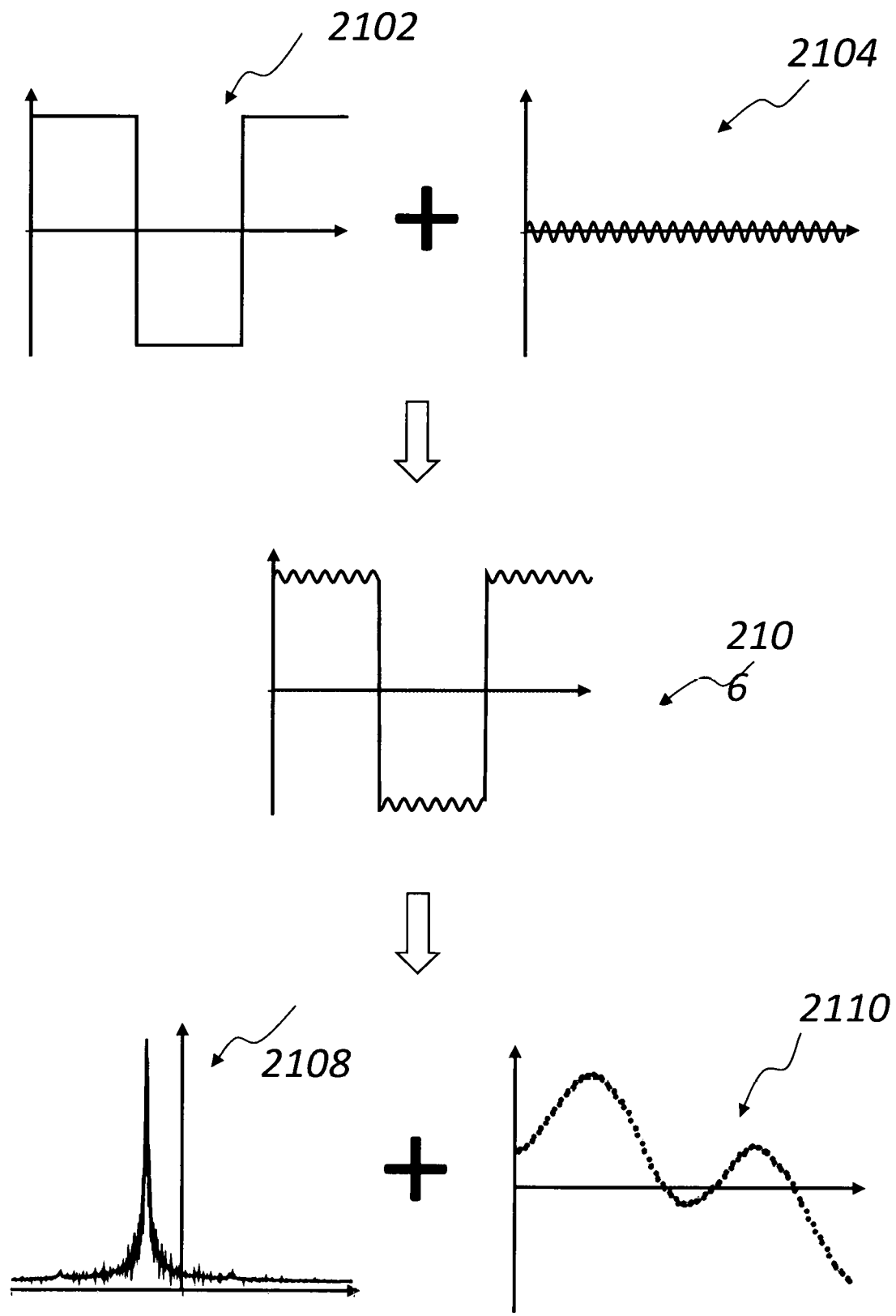
FIG. 21 illustrates the use of composite electrode signal waveforms to enable determination of electrophoretic mobility using the LDE analysis method and the PALS analysis method simultaneously, in accordance with one or more implementations.
Figure 22A:
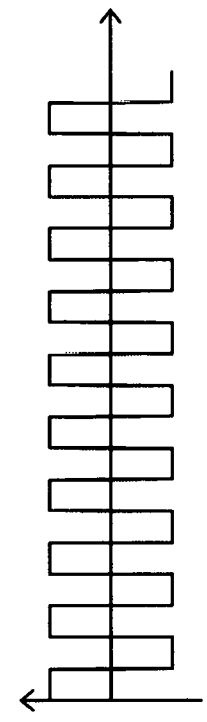
FIG. 22A, FIG. 22B, FIG. 22C, FIG. 22D, FIG. 22E and FIG. 22F show one cycle each of an applied electric field with square waveform (FIG. 22A) and an applied electric field with sinusoidal waveform (FIG. 22B), the corresponding expected phase difference functions (FIGS. 22C and 22D), and the effect of the shape of the waveforms on the measured electrophoretic mobility distributions (FIGS. 22E and 22F), in accordance with one or more implementations.
Figure 22B:
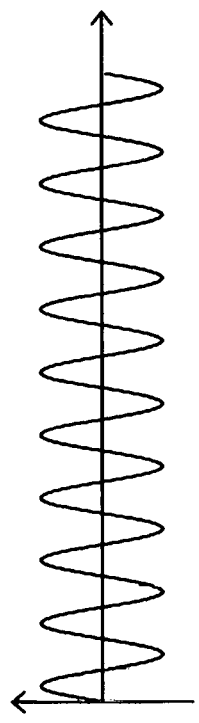
Figure 22C:
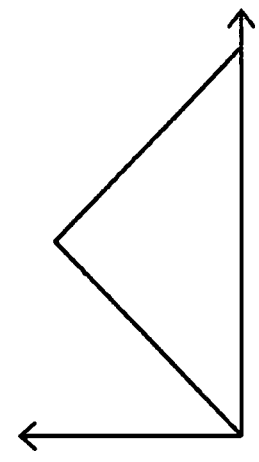
Figure 22D:
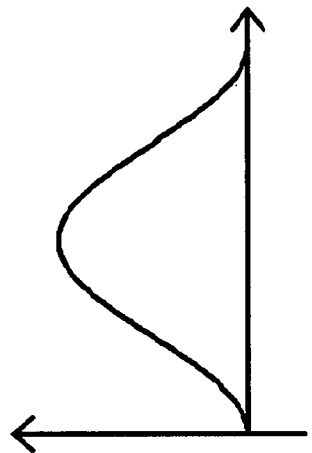
Figure 22E:
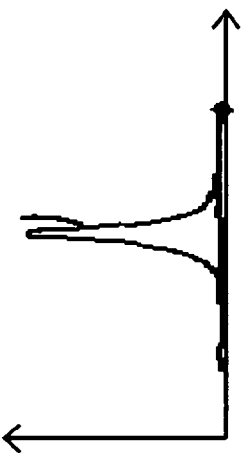
Figure 22F:
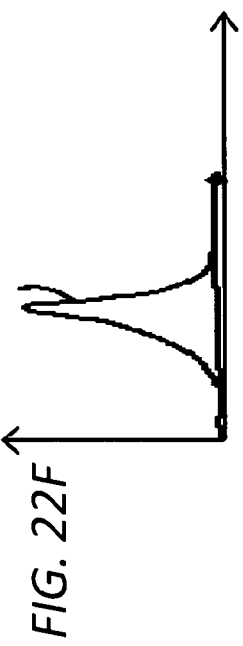

Yet another aspect of the present invention is simultaneous measurement of electrophoretic mobility using both the LDE analysis method and the PALS analysis method. Some prior implementations of ELS embody both the LDE analysis method and the PALS analysis method but they do not afford simultaneous measurement of electrophoretic mobility using both methods. At a specific moment in time when there is an electric field applied to the sample, the electric field is either only that required for the LDE analysis method or only that for the PALS analysis method. It is preferred to use both analysis methods for a given sample. Commonly, the measurement duration used in the prior art for each method is between one and five minutes. For the situation that a sample is not at equilibrium due to, for example, such phenomena as particle-particle aggregation, chemical reaction, and phase separation, or unwanted strong scattering of light due to material such as dust particles, then consecutive measurement of the sample using one of the two methods followed by the other may result in inconsistent electrophoretic mobility information between the two methods. This aspect of this invention affords measurement of electrophoretic mobility using the LDE analysis method and the PALS analysis method simultaneously. Advantages include, but are not limited to, reduction in total sample measurement duration, and increased consistency between electrophoretic mobility data obtained by both the LDE analysis method and the PALS analysis method. See FIG. 21. Whereas the prior implementations of ELS utilize an electric field equal to that required for one, but not both, of the LDE analysis method and the PALS analysis method, the present invention utilizes an electric field 2106 that is the linear sum of electric field 2102 required for the LDE analysis method and the electric field 2104 required for the PALS analysis method. The LDE analysis method operates by transforming detector signal 136 data into the frequency domain whereas the PALS analysis method operates in the time domain. Therefore, detector signal 136 data can be analyzed using the LDE analysis method with 2102 as the applied electric field waveform to give electrophoretic mobility distribution 2108 and the same detector signal 136 data can be analyzed using the PALS analysis method with 2104 as the applied electric field waveform to give phase difference plot 2110 from which an average electrophoretic mobility can be calculated. Although the waveform parameters magnitude, frequency and shape for 2102 may be independent from the waveform parameters magnitude, frequency and shape for 2014, there is an advantageous situation for which the waveform parameters magnitude, frequency and shape for 2102 are identical to the waveform parameters magnitude, frequency and shape for 2014. FIGS. 22A through F show an applied electric field square waveform (FIG. 22A) and an applied electric field sinusoidal waveform (FIG. 22B). In both cases the frequency is chosen to be that commonly used for ELS with the PALS analysis method. Application of the PALS analysis method to a detector signal 136 generated by particles moving in an electric field described by FIG. 22A will yield phase difference function as depicted in FIG. 22C. Application of the PALS analysis method to a detector signal 136 generated by particles moving in an electric field described by FIG. 22B will yield phase difference function as depicted in FIG. 22D. The use of the LDE analysis method with the ATA method of a detector signal 136 generated by particles moving in an electric field described by FIG. 22A will yield electrophoretic mobility distribution as depicted in FIG. 22E. LDE analysis with the ATA method of a detector signal 136 generated by particles moving in an electric field described by FIG. 22B will yield electrophoretic mobility distribution as depicted in FIG. 22F.

Another aspect of the present invention is a method to correct measured electrophoretic mobilities that are reduced in magnitude due to the lowering of the strength of E(t), arising from electrochemical phenomena such as electrode polarization and/or electrolysis. The method uses the temporal variation of the optical phase of 136 to determine particle motion that deviates from an assumption that E(t) is not reduced within the sample under test due to electrochemical phenomena including but not limited to electrode polarization and/or electrolysis. The assumption represents an ideal case. A non-limiting example of the method uses mathematical regression of the measured phase function with an appropriate mathematical model where "phase function" is synonymous with "phase as a function of time". FIG. 28A shows the ideal phase function for one cycle of a square wave alternating electric field. 2805 indicates the point at which the polarity of the electric field changes. The gradients of the straight lines 2801 and 2802 are equal to the temporal change in optical phase due to electrophoretic motion in one cycle of the electric field. The optical phase is proportional to the collective position of all the particles contributing to 136 therefore the gradients of 2801 and 2802 are proportional to the electrophoretic velocity from which the electrophoretic mobility can be calculated in accordance with equation [4]. FIG. 28B represents a non-ideal phase function for one cycle of a square wave alternating electric field generated across a sample where one or more significant electrochemical phenomena cause a reduction in the strength of the electric field and particle electrophoretic velocity within the sample. Whereas 2801 and 2802 are equal to the linear temporal changes in optical phase due to electrophoretic motion in the first half-cycle and the second half-cycle respectively of the electric field. The gradients of the curved lines 2803 and 2804 are equal to the non-linear temporal changes in optical phase due to electrophoretic motion in the first half-cycle and the second half-cycle respectively of the electric field the ideal phase function represented by FIG. 28A is a specific case where there is no curvature in the phase function shown in FIG. 28B. Prior methods that analyze phase functions generated from the use of square wave alternating electric fields use mathematical linear regression to fit a straight line to the optical phase data for one or more half-cycles of the electric field. The corresponding linear terms of the one or more regressions are used to calculate one or more of electrophoretic velocity, electrophoretic mobility and zeta potential. Prior methods ignore the presence of curvature in the phase function. Where curvature is present the calculated values for one or more of Doppler shift frequency, electrophoretic velocity, electrophoretic mobility and zeta potential are underestimated. This can be avoided by performing the linear regression as a polynomial regression of a degree n such that for each half-cycle of the phase function $$\varphi(t)=a_n t^n + a_{n-1} t^{n-1} + \ldots + a_1 t + a_0 \quad [9]$$

and the first derivative of [9] is $$\varphi(t)=n a_n t^{n-1} + (n-1) a_{n-1} t^{n-2} + \ldots + a_1 \quad [10]$$

$\varphi(0)$ is the maximum optical phase change during one half-cycle of the electric field and is proportional to the maximum electrophoretic velocity during one half-cycle of the electric field. At t=0 the strength of the electric field within the sample is equal to the electric field strength assumed by previous methods. The ratio of $\varphi(0)$ for n=1 to $\varphi(0)$ for n>1 is equal to the ratio of the electric field strength within the sample under test to the electric field strength that is assumed by prior methods. The ratio represents a compensation factor for situations that invalidate said assumption. The distribution of one or more of Doppler shift frequency, electrophoretic velocity, electrophoretic mobility and zeta potential can be compensated in the same manner as for the phase function. Someone of ordinary skill in the art will understand that similar compensation may be applied to electric field waveforms of arbitrary shape.

Another aspect of the present invention provides a method of modified Fourier transformation (MFT) of 136 and/or other representations of 136 that offers significant advantages over prior methods of Fourier transformation of 136 and/or other representations of 136.

In a general and illustrative way, it is common, during measurement, to analyze 136 in blocks of small duration compared to the total measurement time. By way of a nonlimiting example, such blocks may be of one second duration whereas the total measurement time may be a few minutes. In the case of measurement using the LDE analysis method, the duration of the block may be equal to the period of the applied electric field such that the first data point in the block is synchronous with the start of the positive half of the electric field cycle. Fourier transformation of the first half of the data in the block yields a Doppler shift frequency distribution for particle motion in the positive electric field. Fourier transformation of the second half of the data in the block yields a Doppler shift frequency distribution for particle motion in the negative electric field and, in the absence of other collective motion of the particles, will closely resemble a mirror image in the frequency domain of the first distribution. Both distributions may be combined to give a composite distribution that is the sum of two individual distributions. The resolution of the Doppler shift frequency distribution is inherently limited to twice the frequency of the applied electric field. Analysis of detector signal 136 continues in chronological order in a block-by-block manner until measurement is complete. A frequency distribution that is the summation of the frequency distributions for each half-period of the electric field cycle may be calculated and an average electrophoretic mobility distribution for the duration of the measurement obtained. A significant disadvantage of prior methods of Fourier transformation is the inherent limitation of the resolution of the Doppler shift frequency distribution and thus of the electrophoretic mobility distribution. Prior implementations of ELS using the LDE analysis method for samples with high ionic strength fail to provide electrophoretic mobility distributions with satisfactory accuracy, precision or reliability. There exists an important industrial need to be able to obtain satisfactory electrophoretic mobility distributions for samples that prior attempts fail to do.

Figure 29:
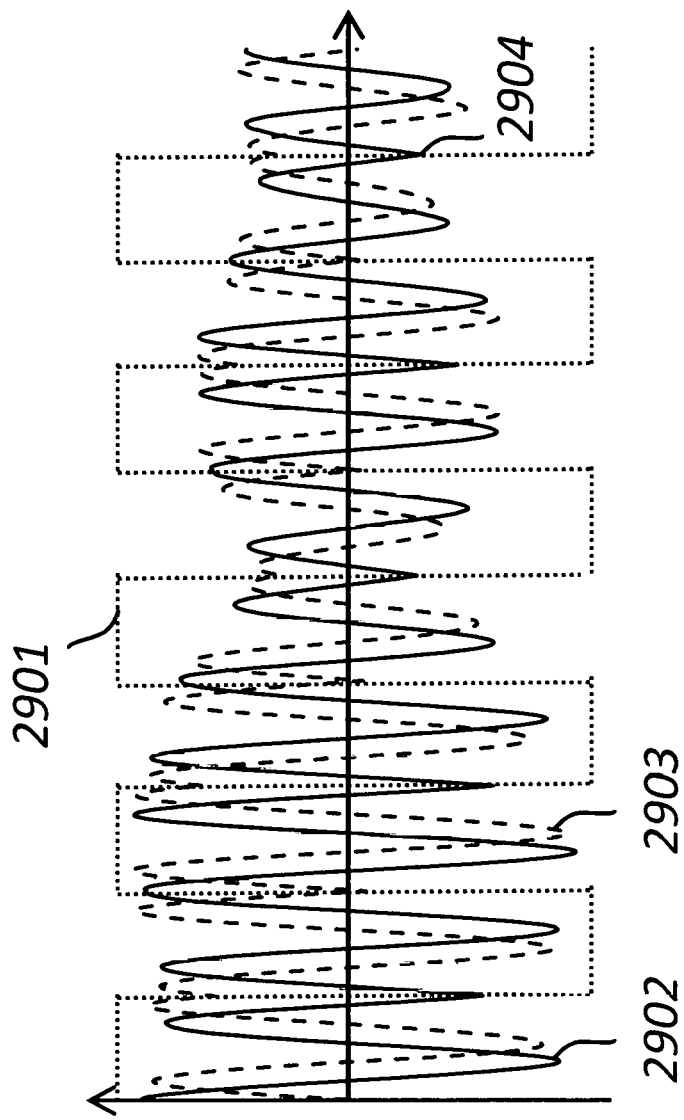
FIG. 29 shows the real component 2902 (solid line) and the imaginary component 2903 (dashed line) for an illustrative example of s(t) arising from the scattering of light due to collective linear electrophoretic motion of particles during five periods of an alternating square wave electric field 2901.
Figure 30:
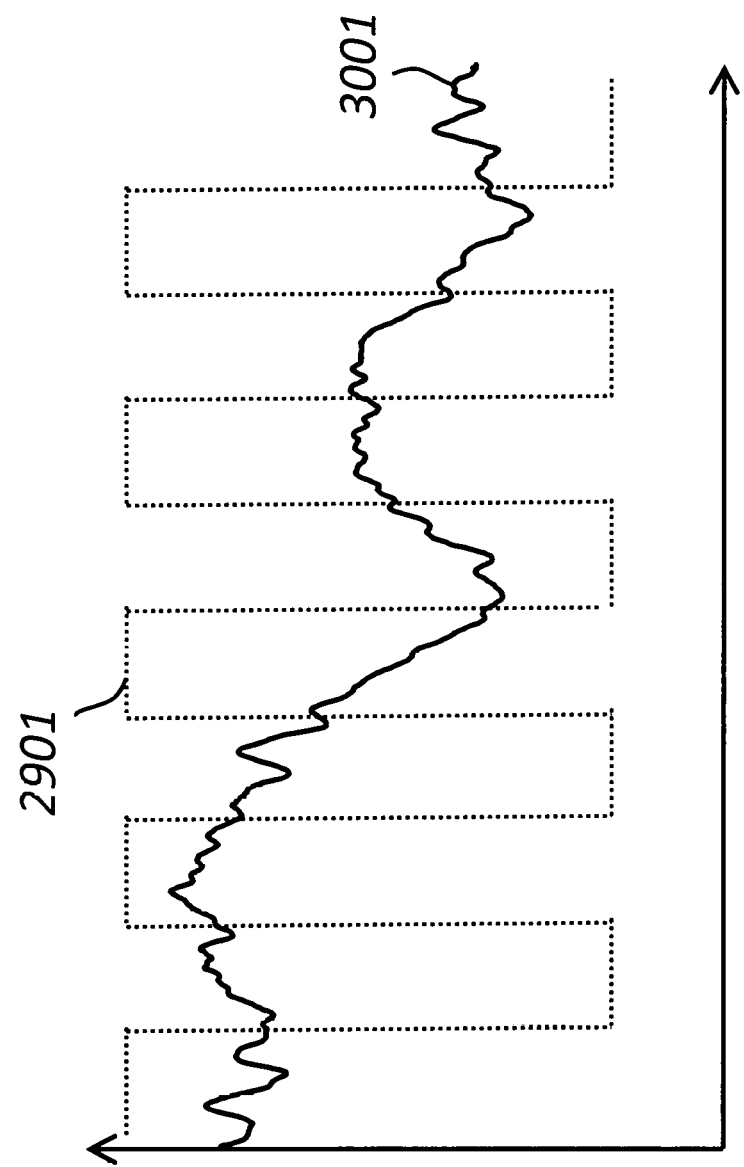
FIG. 30 shows A(t) for the illustrative example of s(t) in FIG. 29.
Figure 31:
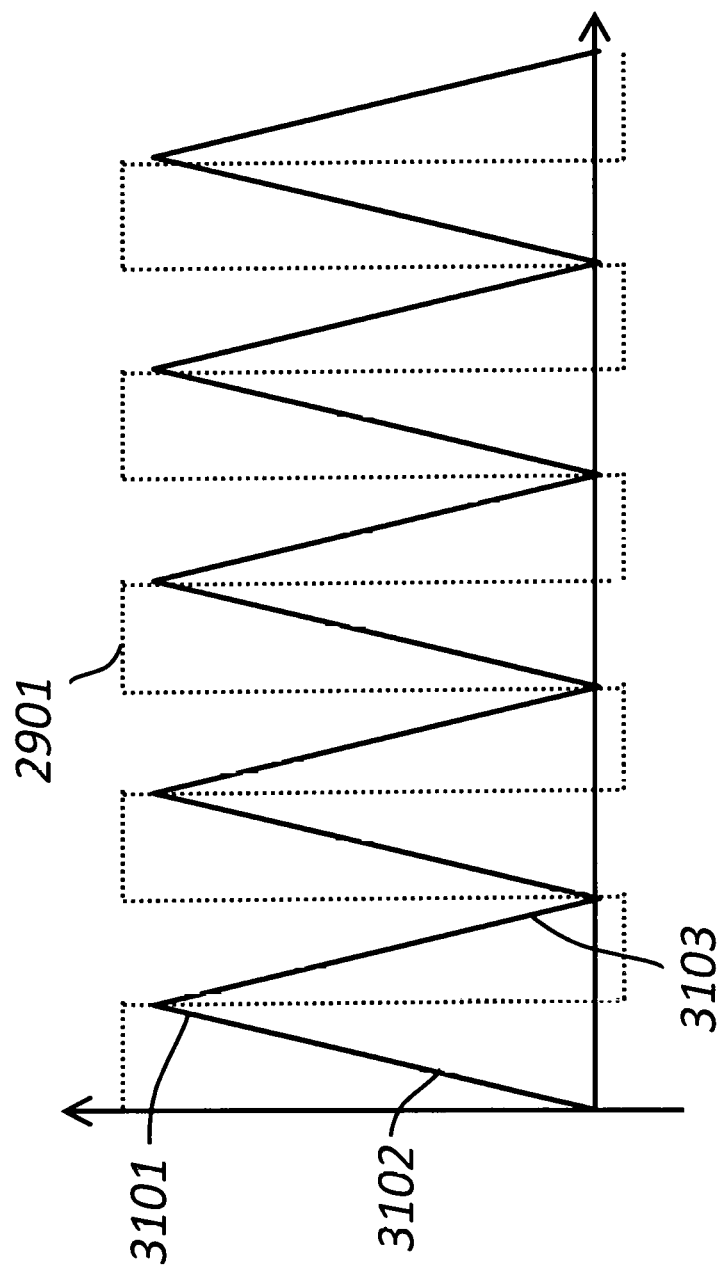
FIG. 31 shows φ(t) for the illustrative example of s(t) in FIG. 29.
Figure 32:
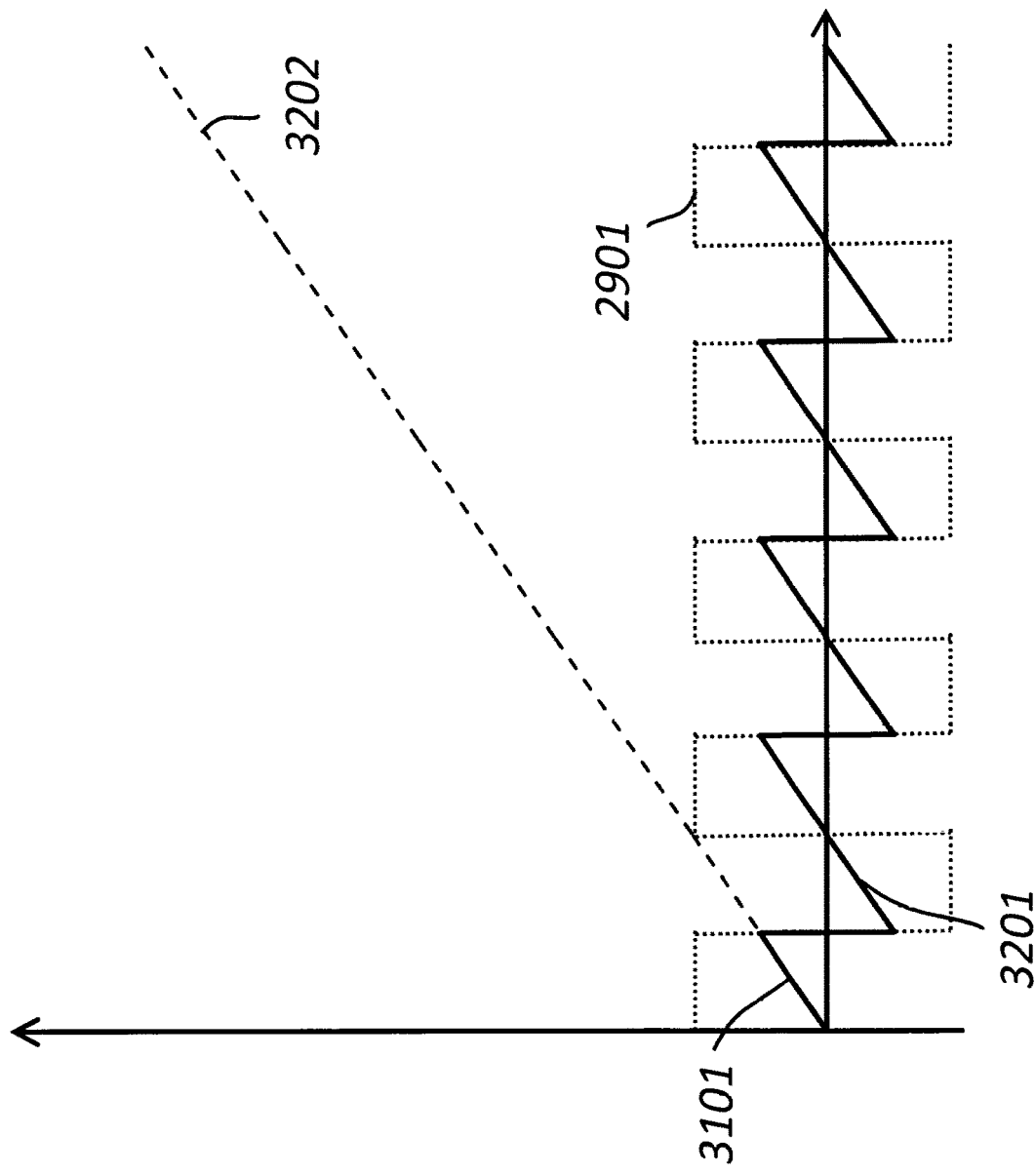
FIG. 32 shows the signs of φ(t) for each second half-cycle of 2901 inverted (3201) as compared to the signs of φ(t) for each first half-cycle of 2901 which are not inverted (3101).
Figure 33:
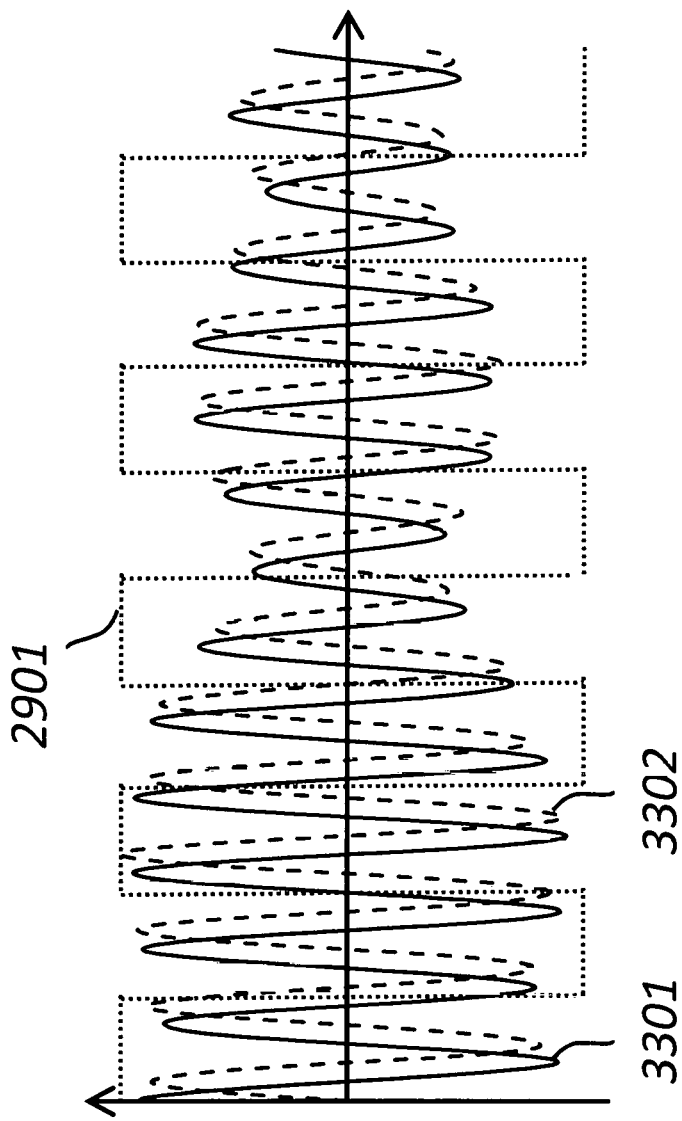
FIG. 33 shows 3202 and corresponding amplitude data expressed in complex cartesian form according to [11].
Figure 34:
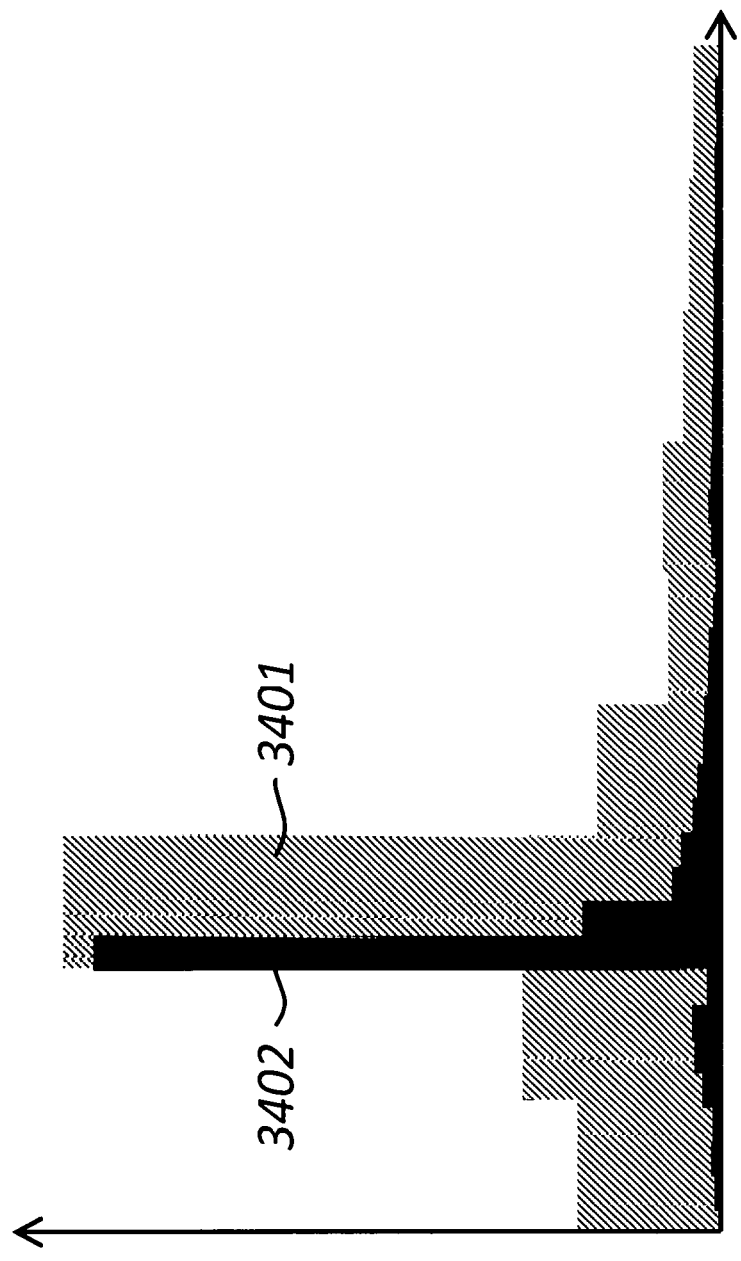
FIG. 34 shows a frequency distribution 3401 for data calculated using a prior method and the frequency distribution 3402 obtained for the same data using the modified Fourier transformation (MFT) method.

Use of the MFT method in accordance with the present invention allows electrophoretic mobility distributions to be determined using the LDE analysis method without the resolution limit imposed by the frequency of the applied electric field with prior implementations of ELS. Consider the complex cartesian representation of the demodulated form of 136:

$$s(t)=A(t) \cos \varphi(t) + iA(t) \sin \varphi(t) \quad [11]$$

where s(t) is the demodulated form of 136, A(t) is the amplitude of s(t), $\varphi(t)$ is the phase of s(t) and i is the imaginary unit such that $i=\sqrt{-1}$. FIG. 29 shows the real component 2902 (solid line) and the imaginary component 2903 (dashed line) for an illustrative example of s(t) arising from the scattering of light due to collective linear electrophoretic motion of particles during five periods of an alternating square wave electric field 2901. Gradient reversals 2904 of 2902 and 2903 occur when 2901 changes polarity. FIG. 30 and FIG. 31 show A(t) and $\varphi(t)$ respectively for the illustrative example of s(t) in FIG. 29. Plot 3001 of A(t) closely matches the magnitude of the envelope of s(t) as expected according to [11]. Plot 3101 of φ(t) comprises multiple segments of alternating linear temporal phase changes 3102 and 3103 for the positive and negative half-cycles of 2901 respectively. It is the periodic nature of 3101 that imposes the limitation of the resolution of the Doppler shift frequency distribution to twice the frequency of the applied electric field. The MFT method removes this limitation by inverting the sign of the phase data of only each positive half-cycle or of only each negative half-cycle of 2901 such that φ(t)→−φ(t). In FIG. 32 the signs of φ(t) for each second half-cycle of 2901 are inverted (3201) whereas the signs of φ(t) for each first half-cycle of 2901 are not inverted (3101). Discontinuities occurring at the start of each second half-cycle of 2901 are removed to yield 3202 which does not possess the periodic nature of 3101. 3202 and corresponding amplitude data are expressed in complex cartesian form according to [11] as shown in FIG. 33 which closely resembles FIG. 29 but does not exhibit gradient reversals 2904. Whereas the frequency resolution of the Fourier transform of the complex pair 2902 and 2903 is limited to the reciprocal of the duration of one half-cycle of 2901 the frequency resolution of the Fourier transform of the complex pair 3301 and 3302 is limited to the reciprocal of the duration of the complex pair data. FIG. 33 illustrates that the duration of the complex pair data is ten times the duration of one half-cycle of 2901 which increases the frequency resolution of the Doppler shift frequency distribution calculated by the MFT method by a factor of ten compared to prior methods of calculating the Doppler shift frequency distribution by Fourier transformation. FIG. 34 shows a frequency distribution 3401 for data calculated using a prior method and the frequency distribution 3402 obtained for the same data using the MFT method. The resolution of 3402 is approximately four times greater than for 3401. Someone of ordinary skill in the art will know that other mathematically equivalent calculations may be performed that yield 3402. For example, whereas the above description refers to complex pair representations of a demodulated temporal representation of 136 it may be possible to perform the sign reversal of the phase using the modulated temporal representation of 136. It may further be possible to perform one or more calculations using a temporal correlation representation of 136. It may further be possible to perform one or more calculations using a frequency domain representation of 136.

Figure 35A:
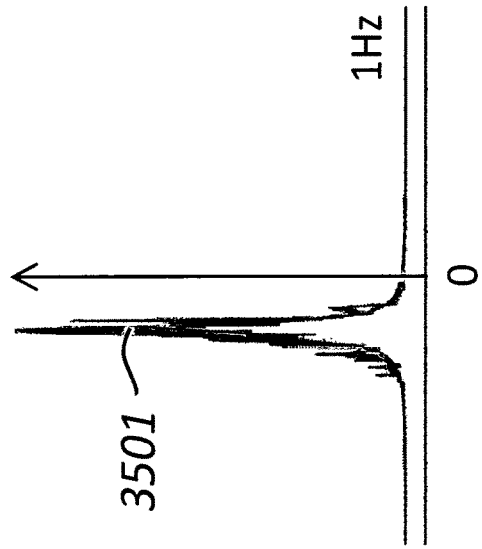
FIG. 35A and FIG. 35B provide an exemplary comparison of a Doppler shift frequency distribution obtained using an electric field with frequency 1 Hz (3501) and a Doppler shift frequency distribution obtained using an electric field with frequency 512 Hz (3502). Both 3501 and 3502 were each calculated using the MFT method.
Figure 35B:
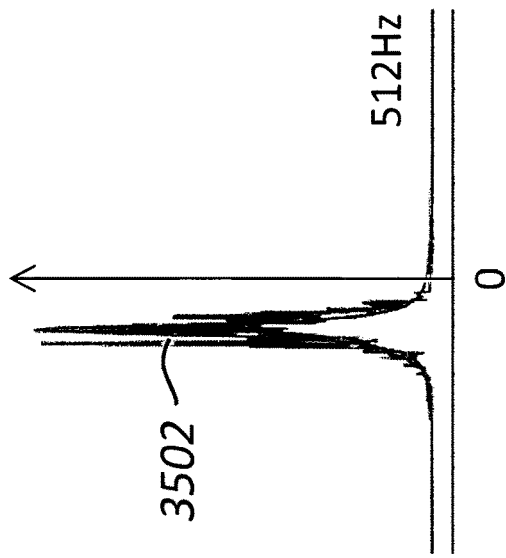

The practical utility of the MFT method and its advantages will now be discussed. Prior methods of determining the Doppler shift frequency distribution use alternating electric fields with frequency of the order of one hertz to create electrophoresis of particles. The frequency resolution of such distributions is of the order of one hertz. It is most common for the Doppler shift frequency due to particles moving in an electric field in a prior apparatus to be no greater than 100 Hz and more commonly no greater than a few tens of hertz. For samples with low ionic strength the effects of electrochemical phenomena are minimal and may typically be ignored. At medium and high ionic strengths the effects of electrochemical phenomena may adversely affect the measurement. The effects of electrode polarization are inversely proportional to the frequency of the alternating electric field and the effects of electrolysis increase with increasing electrical potential at the electrode-liquid interface. To minimize one or both effects it is necessary to use a high frequency for the electric field. At medium ionic strength this higher frequency may be a few tens of hertz. At high ionic strength this higher frequency may be many tens or a few hundreds of hertz. At even higher ionic strengths this frequency may be many hundreds of hertz or a few thousands of hertz. In an exemplary case where the higher frequency is 50 Hz the resolution of the Doppler shift frequency distribution is 100 Hz and exceeds the most common Doppler shift frequencies obtained with prior apparatuses and/or methods. Doppler shift frequency distributions of practical utility cannot be determined with prior apparatuses and/or methods. Phase Analysis Light Scattering (PALS) may commonly be used to obtained mean values for one or more of electrophoretic velocity, electrophoretic mobility and zeta potential. The resolution of Doppler shift frequency distributions obtained by MFT is not limited by the frequency of the electric field but by the duration of the data in the time domain. In an exemplary comparison shown in FIG. 35A and FIG. 35B, 3501 is a Doppler shift frequency distribution obtained using an electric field with frequency 1 Hz. 3502 is a Doppler shift frequency distribution obtained using an electric field with frequency 512 Hz and calculated using the MFT method. The use of electric field frequencies of many hundreds of hertz enables high resolution Doppler shift frequency distributions to be determined at super-molar ionic strengths. The innovative MFT method provides the ability to obtain electrophoretic mobility distributions with satisfactory accuracy, precision and reliability that prior methods fail to do.

Ordinarily, prior implementations of ELS retain detector signal 136 data. Calculated intermediate data required to determine electrophoretic mobility are temporarily retained in one or more volatile memories until the calculations are completed. The amount of data retained is typically of the order of one second. Upon completion of the ELS measurement, all data will have been discarded. To implement the ATA method aspect of the present invention, it is necessary to retain sufficient data collected during the measurement so that the ATA method can be applied. The data may be retained in one or more volatile memories such as RAM and the data may be retained in one or more non-volatile memories including, but not limited to, magnetic hard disks, solid state storage devices, optical media such as CD-ROM, and magnetic tape. Storage in one or more non-volatile memories allows for retention of experimental data for an indefinite period. The data may be retrieved at some arbitrary future time and analyzed using one or both of the LDE analysis method and the PALS analysis method. Said analyses may be performed using the analysis software integrated with the apparatus that generated the data and/or said analyses may be performed using analysis software independent of the apparatus that generated the data. This aspect of the present invention affords additional advantages over prior implementations including: ability to reanalyze experimental data with analysis methods not available at the time of measurement; aid with the investigation of out-of-specification results during quality control testing such as for release of batches of pharmaceutical products by identifying potential instrument malfunction; and analysis of experimental data at a physical location different to that of the apparatus.

Figure 23:
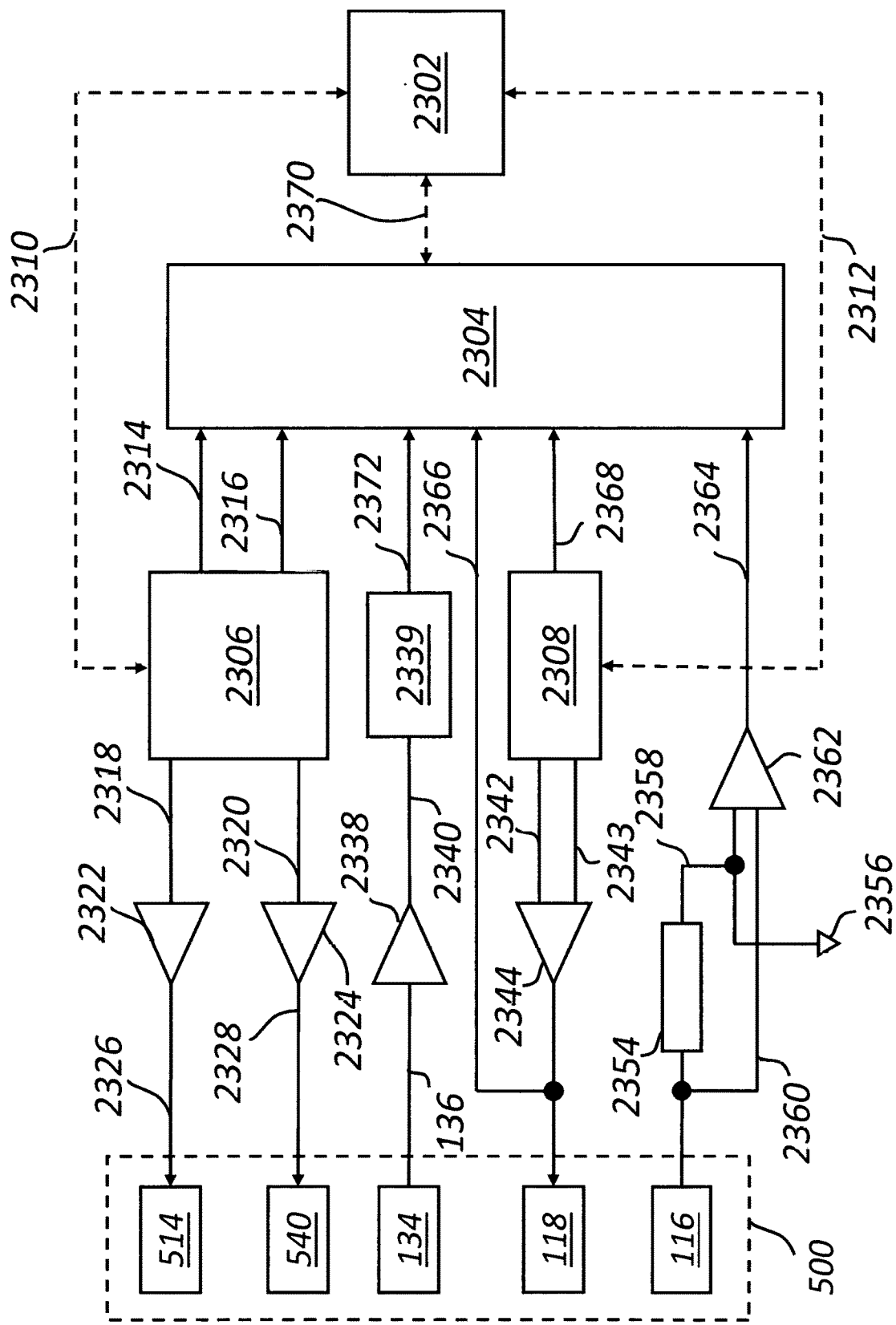
FIG. 23 is an illustration of a nonlimiting exemplary schematic of the present invention, in accordance with one or more implementations.
Figure 24:
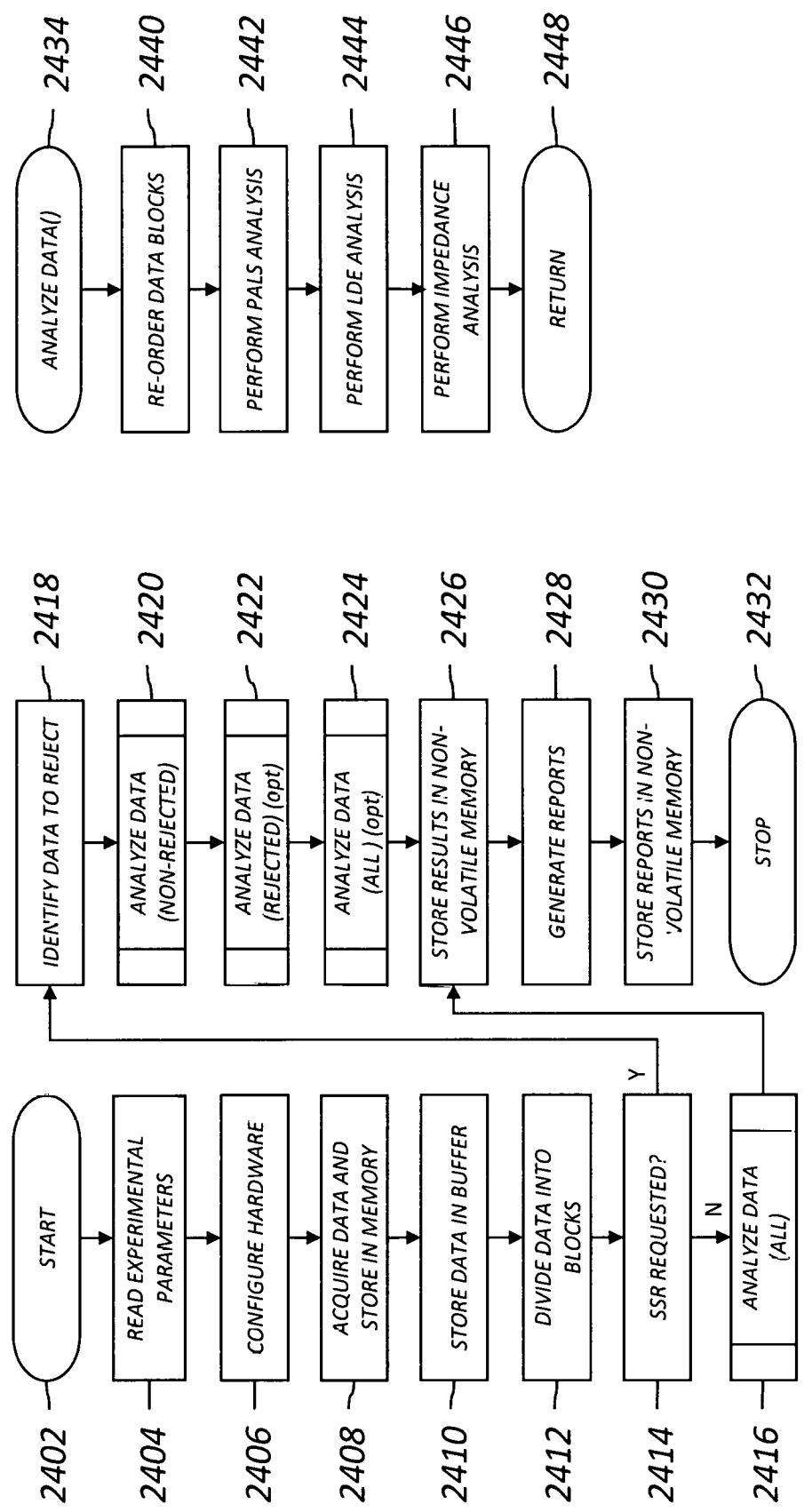
FIG. 24 is a flow diagram that shows the sequences of computational steps required to perform one measurement using the nonlimiting exemplary embodiment depicted in the schematic of FIG. 23, in accordance with one or more implementations.

Consider now a nonlimiting description of an exemplary embodiment of the invention illustrated schematically in FIG. 23. It uses reference beam configuration 500. An analyzer such as a microprocessor-based controller 2302 executes all the necessary computational steps of a measurement and communicates with various peripheral devices to send and receive necessary electrical signals to and from 500. As a nonlimiting example, the microprocessor-based controller 2302 may be a personal computer or laptop using the Microsoft Windows 10 operating system. Software to control the instrument may be written in one or more programming languages including, but not limited to, Python, C, C++, Visual C# .NET, Visual Basic .NET, and MATLAB. Aforesaid peripheral devices include, but are not limited to, multiple channel simultaneous sample-and-hold analog-to-digital convertor (ADC) 2304 that communicates with controller 2302 via a USB connection 2370; 4-channel direct digital synthesizer (DDS) 2306 that communicates with controller 2302 via a USB connection 2310; and 2-channel DDS 2308 that communicates with controller 2302 via a USB connection 2312. DDS 2306 provides the signals required for modulator 514 and modulator 540. Controller 2302 configures DDS 2306 to generate four sinusoidal analog voltage signals each with nominal amplitude 1V. 2318 has frequency $f_0$; 2320 has frequency $f_0+\Delta f_s$; 2314 has frequency $\Delta f_s$; and 2316 has frequency $\Delta f_s$ and is 90 degrees out-of-phase with respect to 2314. $f_0$ is typically in the range 10 MHz to 100 MHz. $\Delta f_s$ is typically 1 kHz. 2318 is amplified by RF power amplifier 2322 to provide a nominally 2 W signal 2326 that operates modulator 514. 2320 is amplified by RF power amplifier 2324 to provide a nominally 2 W signal 2328 that operates modulator 540. 2314 and 2316 connect to ADC 2304 to provide controller 2302 with in-phase and out-of-phase complex components of $\Delta f_s$ that are required for demodulation. A nonlimiting example of detector 134 is a temperature-compensated variable gain silicon avalanche photodetector. Detector signal 136 in this nonlimiting embodiment is typically a 1 to 10 mV AC signal with a DC bias up to 4V. Detector signal 136 may be AC-coupled to instrumentation amplifier 2338 with nominally gain of 10. The output of 2338 is connected via 2340 to two-pole bandpass filter 2339 with pass band nominally between 250 and 5000 Hz. The output from filter 2339 is connected to ADC 2304 via 2372. DDS 2308 generates two low frequency signals 2342 and 2343. 2342 is a square voltage waveform of nominal amplitude 0 to 10V and nominal frequency 0 to 100 Hz. 2343 is a sinusoidal voltage waveform of nominal amplitude 0 to 10V and nominal frequency 0 to 100 Hz. 2368 is TTL digital signal that is synchronous with 2342 and is connected to ADC 2304. It provides a suitable external trigger for 2304 to start acquiring data and ensures that acquisition starts at a positive-going edge of 2342. 2342 and 2343 are connected to a power amplifier with unit gain 2344 that fulfills two necessary functions: it sums 2342 and 2344 to create a composite waveform and it ensures that high ionic strength liquids do not draw too much current and cause the outputs of 2308 to drop. The output 2366 of 2344 connects to ADC 2304 and 2366 also connects to electrode 118. Other electrode 116 connects to first terminal of shunt resistor 2354 and to a first input of high precision amplifier 2362 via 2360. Second terminal of 2354 is connected via 2358 to both a second input of 2362 and electrical ground 2356. Output 2364 of 2362 is connected to ADC 2304. In this nonlimiting embodiment, electrode 116 and electrode 118 are each nominally 1 mm thick and the area of each electrode exposed to sample 122 is nominally 10 mm×4 mm. Electrode 116 and electrode 118 are fabricated from the same material that may include, but is not limited to, gold, palladium, platinum, platinum black and graphite. The flow diagram shown in FIG. 24 shows the sequences of computational steps need to perform one measurement. 2402 is the start of the flow diagram. The first step 2404 defines experimental parameters required to complete a measurement. The parameters may be obtained from one or more sources including, but not limited to, one or more of a user interface, an operating system registry, and file stored in non-volatile memory. Experimental parameters may include, but are not limited to, sample viscosity, sample refractive index, sample dielectric constant, electrode separation distance, scattering angle, laser wavelength, $f_0$, $\Delta f_s$, data acquisition rate, applied voltage amplitude, applied voltage frequency, applied voltage waveform, measurement duration, sample name, sample identity, operator name, date, and file name(s) for reports. Next step 2406 configures DDS 2306 to establish the electrical characteristics of 2326 and 2328 required to impart the necessary frequency shift $\Delta f_s$ between 112 and 144, configures 2308 to generate V(t), configures 2304 with necessary acquisition parameters, and instructs 2304 to start acquisition. Acquisition begins at 2408 on the first positive-going transition of 2368. Data are copied from 2304 to 2302 wherein step 2410 stores the data in volatile memory in a continuous manner until an amount of data equal to the measurement duration has been acquired. 2412 creates an array of indices of the locations in the data corresponding to positive-going edges and negative-going edges of TTL synchronization signal 2368. The array identifies the start of each half-cycle of voltage 2366 applied across electrode 118 and electrode 116. A contiguous block of data starting at one index and ending at the data point immediately prior to the next index contains data acquired during one half-cycle of 2366 and the start of the block is synchronous with the start of the half-cycle of 2366. Blocks starting at positive-going edges of 2368 correspond to data acquired for positive values of 2366 and blocks starting at negative-going edges of 2368 correspond to data acquired for negative values of 2366. 1800 illustrates the block structure of the data. At this stage no data have been modified. Conditional step 2414 determines if SSR should be performed. If so, execution passes to 2418 otherwise it continues to 2416. Steps 2416, 2420, 2422, 2424 each perform pre-defined procedure 2434 that analyzes some or all data. When SSR is not required, all of the data are analyzed, and execution continues from 2426. 2440 re-orders the blocks of data in the manner illustrated in FIG. 19 to yield an array with a structure typified by 1902. The PALS analysis method 2442 is performed using data typified by 1902. A phase difference function is calculated for each block and an average phase difference function calculated from the phase difference functions for each block. Data structure 1902 is transformed to 1904 and LDE analysis 2444 is performed using data represented by 1904. A generalized explanation of LDE analysis 2444 is provided in FIG. 19. Impedance analysis is performed at step 2446 and as described in FIGS. 8 to 14 inclusively. At step 2448 execution returns to the calling step. When SSR is required step 2418 identifies blocks of data to reject from analysis as discussed in FIG. 20 and the accompanying description for further information regarding SSR. Blocks of data not rejected are analyzed at 2420. Optionally, the rejected blocks data are analyzed at 2422, and optionally all the blocks of data are analyzed at 2424. Execution continues to step 2426 at which point the results of analyses are stored in a non-volatile memory. Examples of such memory including, but are not limited to, magnetic hard disks, solid state storage devices, optical media such as CD-ROM, and magnetic tape. Reports are generated at step 2428. Examples of report content include, but are not limited to, graphical plots of electrophoretic mobility distributions, phase difference functions, and current vs. voltage; and tabular summaries of calculated electrophoretic mobility and impedance analysis. The reports are stored in a non-volatile memory such as a hard disk drive at step 2430. Execution stops at 2432. Preferably, a square waveform electric field of single frequency is used for measurement of electrophoretic motion to permit simultaneous determination of phase difference functions using the PALS analysis method and electrophoretic mobility distributions using the LDE analysis method. This precludes the complex impedance analysis described previously which requires an electric field with a sinusoidal waveform. By way of a nonlimiting example, complex impedance analysis with an electric field with a sinusoidal waveform may be performed prior to collection of scattered light information for one or both of the PALS analysis method and the LDE analysis method.

Figure 25:
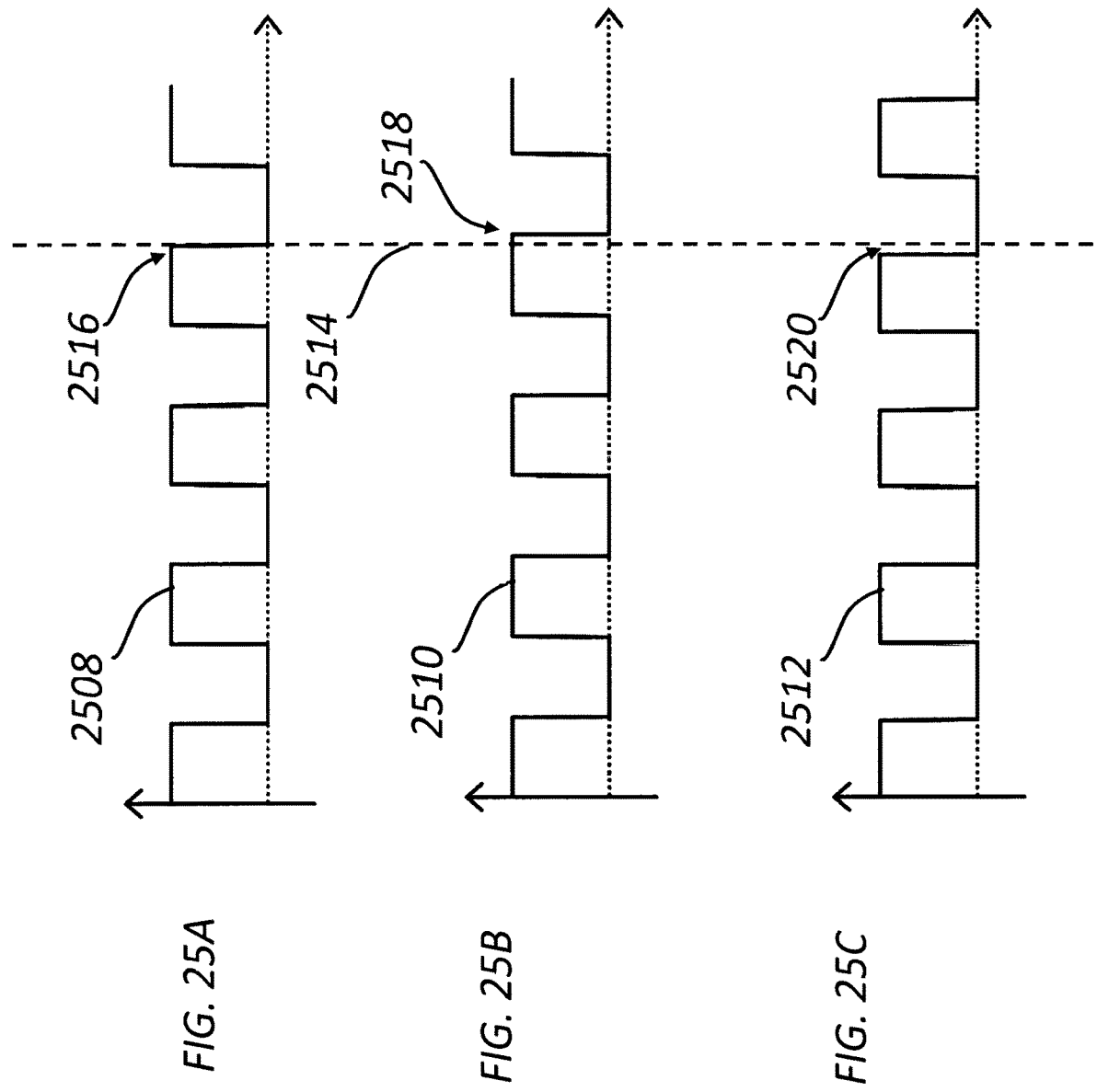
FIG. 25A, FIG. 25B and FIG. 25C exemplify the lack of synchronization of timing clocks between each of three electronic modules used in the exemplary embodiment, in accordance with one or more implementations.

Typically, electronic modules for DDS 2306, DDS 2308, and ADC 2304 are manufactured by different companies. Consequently, the timing signals generated by their respective clocks are unlikely to be synchronized. FIG. 25A through C exemplify this in a nonlimiting manner. Consider that FIG. 25A represents a sequence of five timing pulses, typified by 2508, generated by ADC 2304. Dashed vertical line 2514 intersects 2502 at exactly the end of the fourth pulse indicated as 2516. The frequency of the sequence of pulses is $f_0$ and is typically 32768 Hz. Now consider that FIG. 25B is a similar sequence of pulses, typified by 2510, generated by DDS 2308 with frequency $f_0$. There will be a small difference in the period of each pulse with respect to FIG. 25A. Line 2514 intersects FIG. 25B prior to the end of the fourth pulse indicating a delay 2518 of FIG. 25B with respect to FIG. 25A. Now consider that FIG. 25C is a similar sequence of pulses, typified by 2512, generated by DDS 2306 with frequency $f_0$. There will be a small difference in the period of each pulse with respect to FIG. 25A. Line 2514 intersects FIG. 25C after the end of the fourth pulse indicating an advance 2520 of FIG. 25C with respect to FIG. 25A. Commonly, the errors associated with the unsynchronized timing pulses may be of the order of 0.1%. Arbitrarily, the clock of ADC 2304 is considered the reference clock and the clocks for DDS 2306 and DDS 2308 are out of synchronization with the clock of ADC 2304. Although the errors associated with the unsynchronized timing pulses may be considered small, they can have a significant effect on the accuracy of both the PALS analysis and the LDE analysis method. Consider a measurement using the PALS analysis method where the frequency of the applied electric field is 30 Hz and the duration of the measurement is 60s as referenced to the clock of ADC 2304. During the experiment, 1800 cycles of the electric field are expected to have occurred but the 0.1% error between the clock of ADC 2304 and the clock of DDS 2308 results in only 1798.2 cycles being generated by DDS 2308. After approximately 19s, ADC 2304 observes the signal generated by DDS 2308 to be 180 degrees out of phase compared to the expected 0 degrees according to the clock of ADC 2304. If the analysis of the detector signal assumes that the timings between the clock of ADC 2304 and the clock of DDS 2308 are synchronized, then the electrophoretic motion will appear to reverse direction. After a further approximately 19s the signal generated by DDS 2308 will appear to ADC 2304 to be in phase. The phase difference function calculated by the PALS analysis method will be significantly underestimated. The LDE analysis method is affected in a comparable manner. The exemplary embodiment addresses this problem by connecting TTL synchronization signal 2368 of DDS 2308 to ADC 2304. Because 2368 is synchronous with the frequency of electrode signal 2366, the timing of the generation of electrode signal 2366 can be accurately determined by the analysis software with reference to the clock of ADC 2304. The analysis software can detect the start of each electrode cycle and avoid the phase error described above. Accurate demodulation of detector signal 136 requires knowledge of the modulation frequency, $\Delta f_s$, that is 1024 Hz for the exemplary embodiment. The 0.1% timing error between the clock of ADC 2304 and the clock of DDS 2306 results in an apparent Doppler frequency of 1.024 Hz that may adversely affect the accuracy of electrophoretic mobilities determined by the PALS analysis method. Two of the output channels of DDS 2306 are used to generate RF signals 2318 and 2320. The other two output channels of DDS 2306 are used to generate sinusoidal signal 2314 with frequency $\Delta f_s$ and a second sinusoidal signal 2316 with frequency $\Delta f_s$ that is 90 degrees out-of-phase with respect to 2314. Because all four signals are synthesized with reference to a common clock, 2314 and 2316 can be used for quadrature phase detection of detector signal 136. 2314 and 2316 are connected to ADC 2304 and the digitized representations of 2314 and 2316 are used by the analysis software to demodulate detector signal 136 with greater accuracy than if the analysis software assumed that the clock of ADC 2304 and the clock of 2306 were synchronized.

Figure 26:
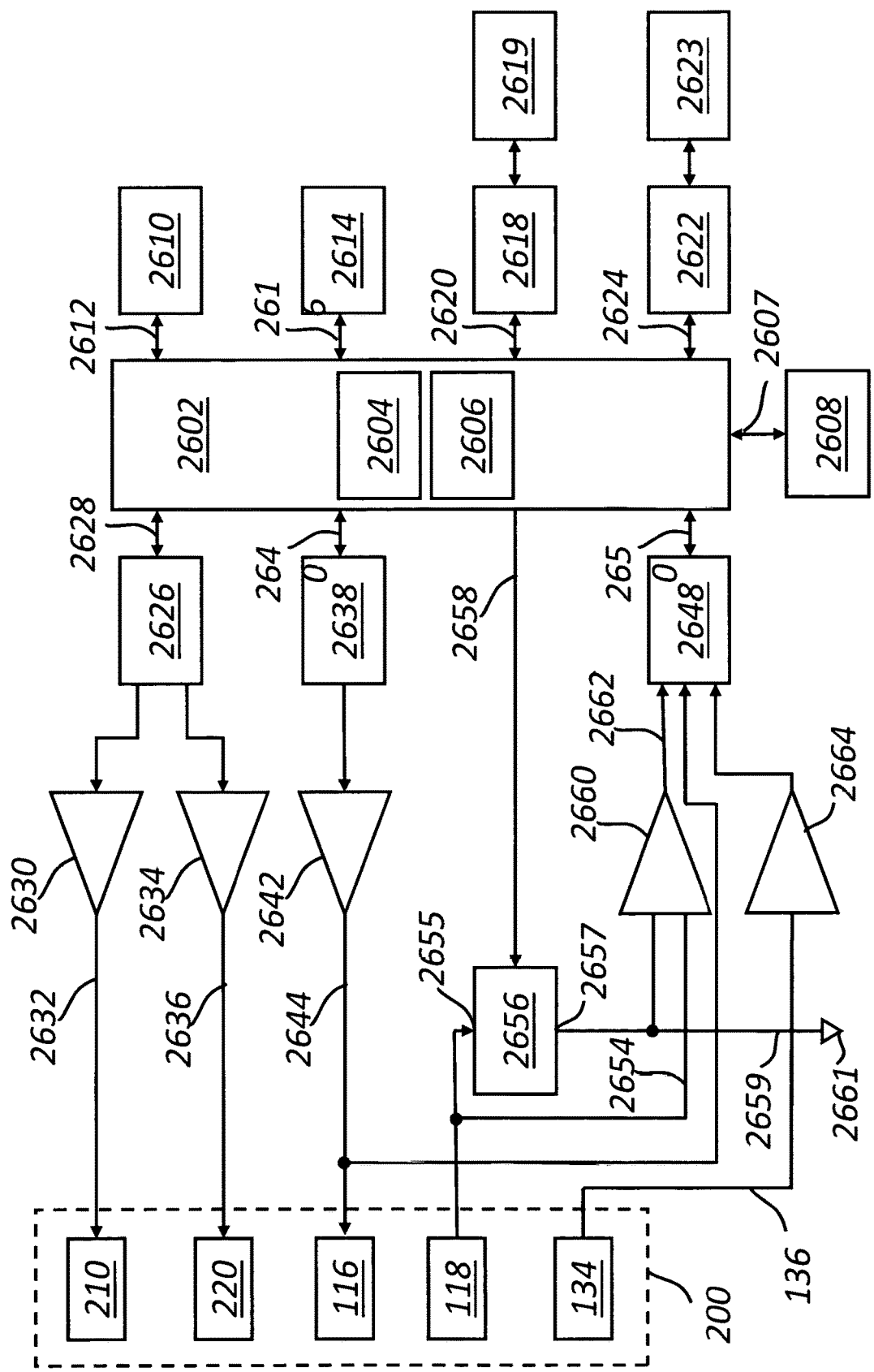
FIG. 26 is an illustration of a preferred nonlimiting schematic of the invention, in accordance with the present invention.
Figure 27:
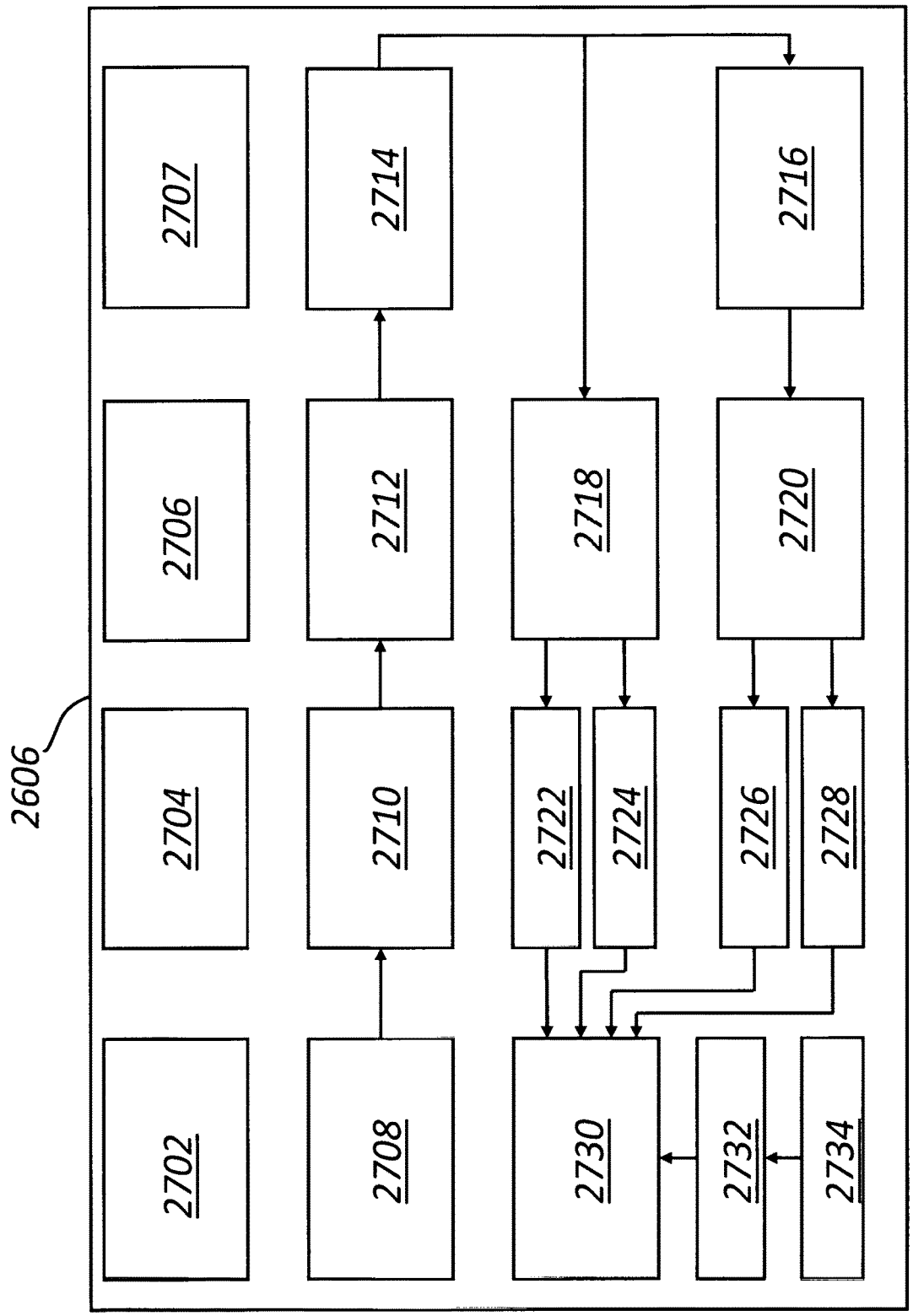
FIG. 27 is a schematic diagram of the key functions of a preferred embodiment of the invention, in accordance with the present invention.

A preferred exemplary embodiment of the invention is depicted in FIG. 26. It will be appreciated that examples of components presented are representative of the components required to achieve the desired functionality and are not intended to limit the scope of the embodiment. Where preferred parameter values are given they are not intended to limit the scope of the embodiment. Referring to FIG. 26, a preferred embodiment uses crossed-beam configuration 200 with the out-of-plane detector aspect of the invention described previously and illustrated in FIGS. 7A and 7B. Laser 102 is a 5 mW linearly polarized helium-neon laser. Detector 134 is a temperature-compensated variable gain silicon avalanche photodetector. Detector 134 is positioned at an angle of 30 degrees above the plane of incident beam 216 and incident beam 226. The distance between detector 134 and scattering volume 258 is 100 mm. Planar-convex focusing lens 154 of focal length 40 mm is positioned 40 mm from the detector. Both modulator 210 and modulator 220 are dense flint glass acousto-optic modulators operated at 40 MHz at a power of 1.8 W. Electrode 116 and electrode 118 are each nominally 1 mm thick and the area of each electrode exposed to sample 122 is nominally 10 mm×4 mm. Electrode 116 and electrode 118 are fabricated from the same material that includes gold, palladium, platinum, platinum black and graphite. 2602 is a Xilinx Zynq 7000 series system-on-a-chip (SoC.) 2604 is a dual-core microprocessor with 32-bit architecture and 800 MHz clock frequency. 2606 is a field programmable gate array (FPGA.) 2608 is 1 GB of DDR3 RAM. SoC 2602 provides the following digital connections to external devices including a USB interface that connects via 2612 to USB physical hardware layer 2610, an ethernet interface that connects via 2616 to ethernet physical hardware layer 2614; a digital communications interface that connects via 2620 to a first secure digital (SD) card physical hardware layer 2618; 2619 is a 4 GB SD memory card; a digital communications interface that connects via 2624 to a second SD card physical hardware layer 2622; 2623 is a 4 GB SD memory card; a bidirectional digital communications interface that connects via 2628 to dual-channel 125 mega-samples per second digital to analog converter (DAC) 2626; a bidirectional digital communications interface that connects via 2640 to single-channel 10 mega-samples per second high precision DAC 2638; a unidirectional digital output interface that connects via 2658 to resistor network 2656; a bidirectional digital communications interface that connects via 2650 to 8-channel 250 kilo-samples per second high precision simultaneous sample-and-hold analog-to-digital converter (ADC) 2648;

and an external memory interface that connects via 2607 to RAM 2608. 2606 uses DDS to generate digital representations of two RF sinusoidal waveforms with amplitude 0.25V. One waveform has frequency $f_0$. The other waveform has frequency $f_0+\Delta f_s$. DAC 2626 converts these into analog form. The sinusoidal waveform with frequency $f_0$ is amplified by RF power amplifier 2630. The output from 2630 is connected via 2632 to modulator 210. The sinusoidal waveform with frequency $f_0+\Delta f_s$ is amplified by RF power amplifier 2634. $f_0$ is 40 MHz and $\Delta f_s$ is 1024 Hz. The output from 2634 is connected via 2636 to modulator 220. 2606 uses DDS to generate a digital representation of the waveform required for connection to electrode 116 and electrode 118. DAC 2638 converts this waveform into analog form and this analog form is amplified by 2642 to give signal 2644 that connects to electrode 116. 2644 also connects to ADC 2648. The nominal amplitude range of 2644 is 0 to 10V and the nominal frequency range of 2644 is 0 to 100 Hz. Electrode 118 connects to terminal 2655 of resistor network 2656 via 2654 and to a first input of high precision amplifier 2660. Terminal 2657 of resistor network 2656 is connected via 2659 to both a second input of 2660 and electrical ground 2661. Output 2662 of 2660 is connected to ADC 2648. Resistor network 2656 contains plurality of high precision resistors including 0.01Ω, 0.15Ω, 1Ω, 10Ω, 100Ω and 1KΩ. Each resistor can be connected between 2655 and 2657. Each resistor can be switched in or out of circuit using a transistor switch. Each transistor is connected to a TTL signal supplied by 2658 whereby six TTL signals are provided such that one TTL signal is used to switch exactly one resistor and each resistor can be switched by exactly one TTL signal. Hence a shunt resistor can be selected electronically that is most appropriate for the impedance of sample 122. Detector signal 136 generated by detector 134 is connected via high precision amplifier 2664 to ADC 2648. SD card 2618 contains a Linux operating system with SoC vendor-provided customizations to control the functions SoC 2602 including operation of 2606. 2618 also contains programs written in C to provide low-level communication with SoC 2602, operation of 2606, and other functions including data transfer to and from RAM 2608. 2618 also contains programs written in Python to perform data analysis and graphical rendering of data and results. Web server software generates JavaScript web pages to provide a graphical user interface (GUI) to an operator using a suitable external device that has web browser software and is connected to 2614. SD card 2623 is used for non-volatile storage of data generated by the instrument. USB interface 2612 and connector 2610 allow for communication with a personal computer to configure the device such as when modifying the configuration of 2606, diagnosing hardware faults, and other functions typically performed by a service engineer. Communication is via a secure shell (SSH) command line program. The combination of 2618, 2604, and 2608 approximate the functionality of a traditional microprocessor-based computer. The exemplary embodiment illustrated in FIG. 23 uses traditional microprocessor-based computer 2302 for controlling most aspects of measurement including receiving data from ADC 2304, data analysis, data storage, report generation and operation of a GUI for an operator. In contrast, the best mode uses 2606 to fulfill many of the functions required for measurement. FIG. 27 is a schematic diagram of the key functions of 2606. These functions operate continuously and independently of microprocessor 2604. Software executed by microprocessor 2604 communicates with 2606 via control registers 2702. For example, software executed by microprocessor 2604 will instruct 2606 which amplitudes and frequencies DDS 2706 and DDS 2707 should use. Clock 2704 overcomes the aforementioned timing issues associated with the exemplary embodiment. All the functions performed by 2606 that require a clock signal use clock signals derived from 2704. 2707 is a DDS intellectual property (IP) core and generates the digital signals required for DAC 2638. The operating parameters for 2707 including amplitude and frequency are configured via control registers 2702. Clock 2704 determines the rate at which DDS 2707 generates the signal required for DAC 2638. Typically, the clock rate is 32768 Hz which is an integer power of two of $\Delta f_s$. 2706 is a DDS IP core that generates the digital signals required for 2628 and 2640. Clock 2704 determines the rate at which DDS 2706 generates the signals required for 2628 and 2640. The operating parameters for 2706 including amplitude and frequency for each signal are configured via control registers 2702. Clock 2704 is used to provide a suitable clock to obtain data from ADC 2648. Data representing detector signal 136 are input to IP core 2708 that is a finite impulse response bandpass filter with pass band nominally between 250 and 5000 Hz. Output from filter 2708 passes to the input of IP core 2710 which demodulates the data about $\Delta f_s$. Whereas the exemplary embodiment requires analog reference signals 2414 and 2416, the best mode does not require a reference for demodulation due to the use of clock 2704 to generate all timing signals required by 2606. The demodulated data in the form of complex real and imaginary components are sent to IP core 2712 that transforms the real and imaginary components into amplitude and phase pairs. The real and imaginary components, and the amplitude and the phase pairs pass into a buffer implemented by IP core 2714. The buffer capacity is sufficient to hold all data acquired from a measurement. The buffer is cleared at the start of a measurement and fills with data from 2712 until the end of the measurement. The data in buffer 2714 are stored in RAM 2608. Once measurement is complete IP core 2716 and IP core 2718 process the data in buffer 2714 stored in RAM 2608. 2718 changes the temporal order of the data in buffer 2712 as a precursor to subsequent analysis using the ATA method. The PALS analysis method is applied to the temporally reordered data by IP core 2722. The LDE analysis method is applied to the temporally reordered data by IP core 2724. 2722 and 2724 operate in parallel and their respective outputs are fed into an output buffer implemented by IP core 2730. A similar data analysis pipeline to that starting at 2718 starts at 2716 such that both pipelines operate in parallel. 2716 implements SSR and passes data that are not rejected to 2720 which changes the temporal order of the data as a precursor to subsequent analysis using the ATA method. The PALS analysis method is applied to the temporally reordered data by IP core 2726. The LDE analysis method is applied to the temporally reordered by IP core 2728. 2726 and 2728 operate in parallel and their respective outputs are fed into an output buffer implemented by IP core 2730. Synchronously and contemporaneously with input to 2708 of digital representation from ADC 2648 of output of 2664, the digital representations from ADC 2648 of 2644 and 2662 are input to IP core 2734 which is a buffer of sufficient capacity to store data for the duration of the measurement. The data in 2734 are stored in RAM 2608. 2644 is V(t) and 2662 is a voltage of known linear proportionality with I(t). IP core 2732 performs complex impedance analysis on the data stored in 2734. The results of the complex impedance analysis are stored in the output buffer implemented by 2730. It will be appreciated that additional information may be stored in 2730 including, but not limited to, statistical details of the SSR, and the temporal reordering performed by 2718 and by 2720. Upon completion of the measurement 2606 signals SoC 2602 that data are ready for further processing by software being executed by microprocessor 2604. Preferably, 2606 raises a hardware interrupt to signal completion of the measurement. 2606 is provided with the minimum parametric information to perform the data acquisition and analysis including: data acquisition sampling rate; DDS amplitudes and frequencies; electrode voltage amplitude, frequency and waveform; and measurement duration. Parameters relating to the optical properties of the apparatus and physical properties of the sample are not required by 2606. Software being executed by microprocessor 2604 rescales the output from 2606 accordingly using, for example, the optical properties of the apparatus and physical properties of the sample. Software being executed by microprocessor 2604 may copy data from 2714 and 2734 and store the copied data in a non-volatile memory such as SD card 2623. Software being executed by microprocessor 2604 may create measurement reports that may be presented to the operator via the web-based GUI and may be stored on SD card 2623. Software required to coordinate the measurement process may be executed by a first core of microprocessor 2604 whereas software required to generate reports and maintain the web-based GUI may be executed by a second core of microprocessor 2604. Some advantages offered by this preferred embodiment include, but are not limited to: the electronics being integrated into a physical component nominally no larger than 10 cm×10 cm×4 cm excluding the power supplies for laser 102, detector 134, amplifier 2630 and amplifier 2634; a dedicated computer is not required to operate the instrument as any suitable device with a compatible web browser may operate the instrument; the instrument may be operated remotely if a wireless ethernet connection is used; and the hardware functionality of 2606 can be readily modified enable future data analysis methods to be implemented.

CITATION LIST

U.S. Patent Documents

U.S. Pat. No. 3,708,402 1/1973 Bean . . . 204/299
U.S. Pat. No. 3,732,014 5/1973 Uzgiris . . . 356/102
U.S. Pat. No. 3,766,048 10/1973 Flygare et al . . . 204/299
U.S. Pat. No. 4,648,715 3/1987 Ford et al . . . 356/344
U.S. Pat. No. 7,295,311 11/2007 Nicoli et al . . . 356/344
U.S. Pat. No. 8,441,638 5/2013 Hsieh et al . . . 356/344
U.S. Pat. No. 8,705,040 4/2014 Trainer . . . 356/450
U.S. Pat. No. 9,341,564 5/2016 McNeil-Watson . . . G01N 21/253

OTHER PUBLICATIONS

Hanbury-Brown, R., and Twiss, R. Q. (1956). Correlation between photons in two coherent beams of light. Nature, 177, 27-29

Pecora, R. D. (1964). Doppler shifts in light scattering from pure liquids and polymer solutions. J. Chem. Phys., 40(6), 1604-1614

Chu, B. (1974). Laser Light Scattering, Academic Press, New York.

Pusey, P. N. (1979). The study of Brownian motion by intensity fluctuation spectroscopy. Phil. Trans. R. Soc. Lond. A, 293, 429-439

Durst, F., Melling, A., and Whitelaw, J. H., (1981). Principles and Practice of Laser-Doppler Anemometry, 2nd ed. Academic Press, London.

Schätzel, K. and Merz, J. (1984). Measurement of small electrophoretic mobilities by light scattering and analysis of the amplitude weighted phase structure function. J. Chem. Phys., 81, 2482-2488

Miller, J. F., Schätzel, K., and Vincent, B. (1991). The determination of very small electrophoretic mobilities in polar and nonpolar colloidal dispersions using phase analysis light scattering. J. Coll. Int. Sci, 143, 532-554.

Tscharnuter, W. W., McNeil-Watson, F., and Fairhurst, D. (1996). A new instrument for the measurement of very small electrophoretic mobilities using phase analysis light scattering. In T. Provder, Particle size distribution 3, assessment and characterization. ACS Symposium Series (pp. 327-340). 693. Washington, D.C.: ACS Press.

Vanapalli, S., Coupland, J. N. (2000). Characterization of food colloids by phase analysis light scattering. Food Hydrocolloids, 14, 315-317

Horowitz, P. and Hill, W. (1980). The Art of Electronics, 1st ed. Cambridge University Press, Cambridge.

Weiner, B. B. (2010) A Review of High Salt Zeta Potential Measurements with Brookhaven ZetaPALS: Red blood cells. Technical Information document. Brookhaven Instruments Corporation, Holtsville N.Y.

Mobius zeta potential detector product description. Retrieved from https://www.wyatt.com/products/instruments/mobiuζ-zeta-potential-detector.html 1 Feb. 2018. Wyatt Technology Corporation, Santa Barbara Calif.

EP2735870A1—Modulator monitoring during measuring electromobility (Noack, H., and Moitzi, C.)

The invention claimed is:

1. An apparatus for measuring electrophoretic mobility of particles dispersed in a liquid medium which implements ELS via directing light from a laser source through a sample of a dilute dispersion of particles in a liquid medium, said apparatus comprising:
   a sample holder;
   two or more laser beams in a crossed-beam configuration which produce scattered light dependent on position and velocity of particles in a certain direction in a sample in said holder;
   a detector of the scattered light positioned out-of-plane with respect to a plane of intersecting laser beams; and
   an analyzer of the detected scattered light.

2. A method for measuring electrophoretic mobility of particles dispersed in a liquid medium which implements electrophoretic light scattering (ELS) via directing light from a laser source through a sample of a dilute dispersion of particles in a liquid medium, said method comprising detecting electrophoretic mobility of particles dispersed in a liquid sample in the apparatus of claim 1.

3. A method for measuring electrophoretic mobility of particles dispersed in a liquid medium which implements electrophoretic light scattering (ELS) via directing light from a laser source through a sample of a dilute dispersion of particles in a liquid, said method comprising analyzing temporally ordered data using one or more temporal orderings of the temporally ordered data where said temporally orderings are different from the chronological temporal ordering of data representing signal generated by the detector.

4. The method of claim 3 further comprising classifying data according to one or more descriptors; and applying one or more selected data analysis methods to one or more classes of data.

5. A method for measuring electrophoretic mobility of particles dispersed in a liquid medium which implements electrophoretic light scattering (ELS) via directing light from a laser source through a sample of a dilute dispersion of particles in a liquid, said method comprising measuring one or more electrochemical phenomena arising due to an electric current in said liquid medium with a voltammetric means to correct measured electrophoretic mobilities for errors caused in measurements by the one or more electrochemical phenomena.

6. A method for measuring electrophoretic mobility of particles dispersed in a liquid medium which implements electrophoretic light scattering (ELS) via directing light from a laser source through a sample of a dilute dispersion of particles in a liquid, said method creating a temporal representation of the scattered light intensity arriving at a detector of an apparatus measuring electrophoretic mobility of particles dispersed in a liquid medium and applying both a PALS analysis method and a LDE analysis method to the same temporal representation.

7. A method for measuring electrophoretic mobility of particles dispersed in a liquid medium which implements electrophoretic light scattering (ELS) via directing light from a laser source through a sample of a dilute dispersion of particles in a liquid, said method comprising correcting measured electrophoretic mobilities which are reduced in magnitude due to lowering of strength of an electric field by determining temporal variation of an optical phase of scattered light to determine particle motion which deviates from an assumption that the strength of the electric field is not reduced due to electrochemical phenomena.

8. A method for measuring electrophoretic mobility of particles dispersed in a liquid medium which implements electrophoretic light scattering (ELS) via directing light from a laser source through a sample of a dilute dispersion of particles in a liquid, said method comprising calculating a Doppler shift frequency distribution of the scattered light using a modified Fourier transformation without a resolution limit imposed by frequency of an applied electric field with prior implementations of ELS.

* * * * *